US009954818B2

(12) United States Patent
Ptalis et al.

(10) Patent No.: US 9,954,818 B2
(45) Date of Patent: Apr. 24, 2018

(54) DOMAIN NAME HI-JACK PREVENTION

(71) Applicant: Go Daddy Operating Company, LLC, Scottsdale, AZ (US)

(72) Inventors: Sarah Ptalis, Boston, MA (US); Paul Nicks, Marion, IA (US); Frank Taylor, Mesa, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 295 days.

(21) Appl. No.: 14/824,804

(22) Filed: Aug. 12, 2015

(65) Prior Publication Data
US 2016/0119283 A1 Apr. 28, 2016

Related U.S. Application Data

(63) Continuation-in-part of application No. 14/805,374, filed on Jul. 21, 2015, which is a continuation-in-part of application No. 14/587,962, filed on Dec. 31, 2014, and a continuation-in-part of application No. 14/587,958, filed on Dec. 31, 2014, application No. (Continued)

(51) Int. Cl.
| H04L 29/12 | (2006.01) |
| H04L 29/08 | (2006.01) |
| H04L 9/32 | (2006.01) |
| G06Q 10/06 | (2012.01) |
| G06Q 50/10 | (2012.01) |
| G06Q 30/00 | (2012.01) |
| H04L 29/06 | (2006.01) |

(52) U.S. Cl.
CPC ......... *H04L 61/3025* (2013.01); *G06Q 10/06* (2013.01); *G06Q 30/016* (2013.01); *G06Q 50/10* (2013.01); *H04L 9/321* (2013.01); *H04L 61/302* (2013.01); *H04L 67/02* (2013.01); *H04L 67/20* (2013.01); *H04L 67/42* (2013.01)

(58) Field of Classification Search
CPC .............................. H04L 61/302; H04L 9/321
See application file for complete search history.

(56) References Cited

U.S. PATENT DOCUMENTS 6,880,007 B1 * 4/2005 Gardos ............. H04L 29/12594
709/224
7,130,878 B2 * 10/2006 Parsons ............... H04L 61/3015
709/202

(Continued)

*Primary Examiner* — Lashonda Jacobs
(74) *Attorney, Agent, or Firm* — Quarles and Brady

(57) ABSTRACT

A domain name hi-jack prevention service may be selected by a domain name registrant and enabled by a Registrar. In a first embodiment, the Registrar may send a confirmation request via a preferred contact method to the registrant and only move the domain name from a first account to a second account (both managed by the Registrar) when the registrant confirms the request. In a second embodiment, a third party platform that is independent from and/or not the Registrar confirms the identity of the registrant before the Registrar moves the domain name from the first account to the second account (again, both managed by the Registrar). In a third embodiment, a third party platform communicates an authorization code to a verified registrant so the registrant can enter the authorization code with a Gaining Registrar so the domain name may be transferred from a Losing Registrar to the Gaining Registrar.

20 Claims, 63 Drawing Sheets

Related U.S. Application Data

14/824,804, which is a continuation-in-part of application No. 14/805,378, filed on Jul. 21, 2015, which is a continuation-in-part of application No. 14/587,962, filed on Dec. 31, 2014, and a continuation-in-part of application No. 14/587,958, filed on Dec. 31, 2014, said application No. 14/587,962 is a continuation-in-part of application No. 14/528,622, filed on Oct. 30, 2014, and a continuation-in-part of application No. 14/528,657, filed on Oct. 30, 2014, and a continuation-in-part of application No. 14/528,790, filed on Oct. 30, 2014, said application No. 14/587,958 is a continuation-in-part of application No. 14/528,622, filed on Oct. 30, 2014, and a continuation-in-part of application No. 14/528,657, filed on Oct. 30, 2014, and a continuation-in-part of application No. 14/528,790, filed on Oct. 30, 2014, said application No. 14/528,622 is a continuation-in-part of application No. 14/522,426, filed on Oct. 23, 2014, and a continuation-in-part of application No. 14/522,432, filed on Oct. 23, 2014, and a continuation-in-part of application No. 14/522,435, filed on Oct. 23, 2014, and a continuation-in-part of application No. 14/522,440, filed on Oct. 23, 2014, said application No. 14/528,657 is a continuation-in-part of application No. 14/522,426, filed on Oct. 23, 2014, and a continuation-in-part of application No. 14/522,432, filed on Oct. 23, 2014, and a continuation-in-part of application No. 14/522,435, filed on Oct. 23, 2014, and a continuation-in-part of application No. 14/522,440, filed on Oct. 23, 2014, said application No. 14/528,790 is a continuation-in-part of application No. 14/522,426, filed on Oct. 23, 2014, and a continuation-in-part of application No. 14/522,432, filed on Oct. 23, 2014, and a continuation-in-part of application No. 14/522,435, filed on Oct. 23, 2014, and a continuation-in-part of application No. 14/522,440, filed on Oct. 23, 2014.

(56) References Cited

U.S. PATENT DOCUMENTS

| | | | | |
|---|---|---|---|---|
| 7,188,138 | B1* | 3/2007 | Schneider | G06Q 30/02 709/203 |
| 7,257,631 | B2* | 8/2007 | Gardos | H04L 29/12 707/999.202 |
| 8,949,982 | B2* | 2/2015 | Gould | H04L 61/1511 726/22 |
| 9,531,581 | B1* | 12/2016 | Adkins, III | H04L 29/06 |
| 9,817,979 | B2* | 11/2017 | Brennan, III | G06F 21/60 |
| 2002/0010795 | A1* | 1/2002 | Brown | G06F 21/33 709/245 |
| 2002/0091827 | A1* | 7/2002 | King | G06Q 40/04 709/226 |
| 2004/0199620 | A1* | 10/2004 | Ruiz | H04L 29/12009 709/223 |
| 2005/0102354 | A1* | 5/2005 | Hollenbeck | G06Q 10/02 709/203 |
| 2006/0004784 | A1* | 1/2006 | Ableman | G06Q 30/06 |
| 2006/0095586 | A1* | 5/2006 | Adelman | G06Q 10/107 709/245 |
| 2006/0168020 | A1* | 7/2006 | Brennan, III | H04L 29/12009 709/206 |
| 2008/0201258 | A1* | 8/2008 | D'Ambrosio | G06Q 10/10 705/39 |
| 2008/0307085 | A1* | 12/2008 | Curran | H04L 61/1511 709/223 |
| 2010/0088761 | A1* | 4/2010 | Podjarny | G06F 21/00 726/22 |
| 2012/0174198 | A1* | 7/2012 | Gould | H04L 63/0807 726/6 |
| 2012/0254386 | A1* | 10/2012 | Smith | H04L 29/12066 709/223 |
| 2014/0188651 | A1* | 7/2014 | Krueger | G06Q 30/0641 705/26.3 |
| 2016/0065533 | A1* | 3/2016 | Schilling | H04L 61/302 709/221 |

\* cited by examiner

Losing Registrar 210

A registrar function configured to:
i) register a domain name to a domain name registrant,
ii) transfer the domain name to a Gaining Registrar when:
A) the domain name is under management of the Losing Registrar,
B) the domain name has expired and is unencumbered by any rights of the domain name registrant, and
C) a Buyer has entered a highest bid on the domain name before the end of the auction;

— 3620

A communication system configured to:
i) communicate to an Aftermarket Platform a first list of a first plurality of domain names available for purchase, wherein each domain name in the first plurality of domain names:
A) is under management of the Losing Registrar, and
B) has expired and is unencumbered by any rights of a previous registrant, and
ii) receive from the Aftermarket Platform a second list of a second plurality of domain names available for purchase, wherein each domain name in the second plurality of domain names:
A) is under management by the Gaining Registrar or a registrar in a plurality of registrars, and
B) has expired and is unencumbered by any rights of a previous registrant

— 3630

A one or more servers configured to:
i) display the second plurality of domain names to a plurality of potential buyers on a website,
ii) receive one or more bids from the plurality of potential buyers, and
iii) transmit the one or more bids to the Aftermarket Platform

Gaining Registrar 220

A communication system, controlled by a Gaining Registrar, configured to:
i) communicate to an Aftermarket Platform a first list of a first plurality of domain names available for purchase that:
A) are under management of the Gaining Registrar,
B) have expired, and
C) are unencumbered by any rights of a previous registrant, and
ii) receive from the Aftermarket Platform a second list of a second plurality of domain names available for purchase that:
A) are under management by a Losing Registrar and a plurality of registrars,
B) have expired, and
C) are unencumbered by any rights of a previous registrant

— 3635

A one or more servers, controlled by the Gaining Registrar, configured to:
i) display the second plurality of domain names to a plurality of potential buyers on a website,
ii) receive one or more bids for one or more domain names in the second plurality of domain names from the plurality of potential buyers,
iii) receive a highest bid from a Buyer for a domain name in the second plurality of domain names,
iv) transmit the one or more bids and the highest bid to the Aftermarket Platform, and
v) collect funds for the purchase of the domain name from the Buyer

— 3645

A registrar function, controlled by the Gaining Registrar, configured to:
i) receive the domain name transferred from the Losing Registrar, and
ii) register the domain name to the Buyer

Aftermarket Platform 100

A communication system, comprising one or more servers, configured to:

i) receive one or more lists comprising a plurality of domain names available for purchase, wherein the plurality of domain names comprises one or more domain names from one or more registrars in a plurality of registrars, wherein each domain name, in the plurality of domain names,:

A) is under management by a registrar in the plurality of registrars and has expired, and B) is unencumbered by any rights of a previous registrant, ii) communicate the one or more lists comprising the plurality of domain names available for purchase to the plurality of registrars

— 3660

An auction system, comprising the one or more servers, configured to:

i) for each domain name in the plurality of domain names, receive one or more bids from a plurality of bidders, and ii) for each domain name in the plurality of domain names, determine:

A) a highest bidder in the plurality of bidders,

B) a Gaining Registrar in the plurality of registrars used by the highest bidder, and C) a Losing Registrar in the plurality of registrars that has the each domain name under management

— 3670

A notification system, comprising the one or more servers, configured to:

i) for each domain name in the plurality of domain names, notify the Losing Registrar to transfer the each domain name to the Gaining Registrar, and ii) for each domain name in the plurality of domain names, notify the Gaining Registrar to:

A) collect a funds from the highest bidder,

B) receive the each domain name transferred from the Losing Registrar, and

C) register the each domain name to the highest bidder

DOMAIN NAME HI-JACK PREVENTION

CROSS-REFERENCE TO RELATED PATENT APPLICATIONS

This application is a continuation-in-part of, and claims priority to, U.S. patent application Ser. No. 14/805,374 entitled Gaining Registrar Purchasing a Domain Name for a Buyer filed on Jul. 21, 2015 and U.S. patent application Ser. No. 14/805,378 entitled Losing Registrar Selling a Domain Name for a Seller filed on Jul. 21, 2015, which are continuation-in-parts of, and claims priority to, U.S. patent application Ser. No. 14/587,962 entitled Registering Previously-Unregistered Domain Names with the same Top-Level Domain at Variable Prices filed on Dec. 31, 2014 and U.S. patent application Ser. No. 14/587,958 entitled Registering Previously-Unregistered Domain Names with the Same Top-Level Domain at Variable Prices filed on Dec. 31, 2014 which are a continuation-in-part, and claim priority to, U.S. patent application Ser. No. 14/528,622 entitled Payment Methods for Domain Name Aftermarket filed on Oct. 30, 2014; U.S. patent application Ser. No. 14/528,657 entitled Auction Methods for Expired Domain Names filed on Oct. 30, 2014; and U.S. patent application Ser. No. 14/528,790 entitled Aftermarket Platform for Auctioning Expired Domain Names filed on Oct. 30, 2014 which are a continuation-in-part, and claim priority to, U.S. patent application Ser. No. 14/522,426 entitled Aftermarket Platform Processes in a Domain Name Aftermarket filed on Oct. 23, 2014; U.S. patent application Ser. No. 14/522,432 entitled Gaining Registrar Processes in a Domain Name Aftermarket filed on Oct. 23, 2014; U.S. patent application Ser. No. 14/522,435 entitled Losing Registrar Processes in a Domain Name Aftermarket filed on Oct. 23, 2014; and U.S. patent application Ser. No. 14/522,440 entitled Offer and Counteroffer Processes in a Domain Name Aftermarket filed on Oct. 23, 2014.

FIELD OF THE INVENTION

The present invention generally relates to preventing fraud when moving a domain name from a first account to a second account in the same Registrar or when transferring a domain name from a Losing Registrar to a Gaining Registrar. Some embodiments use a third party platform to assist in confirming the requester of the move or transfer is the actual domain name registrant before moving or transferring the domain name.

SUMMARY OF THE INVENTION

The present invention provides methods for an Aftermarket Platform to receive an agreement executed by a Seller. The agreement may permit a domain name registered to the Seller to be transferred, only after a Buyer has agreed to purchase the domain name and without further action from the Seller, from a Seller controlled account of a Losing Registrar to a Buyer controlled account of a Gaining Registrar. The agreement is preferably executed by the Seller prior to making the domain name available to the Buyer for purchase. The Aftermarket Platform may receive a communication from the Gaining Registrar that the Buyer desires to purchase the domain name. The Aftermarket Platform may facilitate the transfer of the domain name from the Seller controlled account of the Losing Registrar to the Buyer controlled account of the Gaining Registrar. In addition, the Aftermarket Platform may facilitate the collection of funds from the Buyer and the disbursement of funds to the Seller.

In another embodiment, an Aftermarket Platform may receive an agreement executed by a Seller. The agreement may permit a domain name registered to the Seller to be transferred, only after a Buyer has agreed to purchase the domain name and without further action from the Seller, from a Seller controlled account of the Losing Registrar to a Buyer controlled account of the Gaining Registrar. The agreement is preferably executed by the Seller prior to making the domain name available to the Buyer for purchase. The Aftermarket Platform may communicate a notification to a plurality of Registrars that triggers one or more Registrars in the plurality of Registrars to list the domain name on one or more websites as available for purchase to a plurality of potential Buyers. The Aftermarket Platform may receive a communication from the Gaining Registrar that the Buyer desires to purchase the domain name. The Aftermarket Platform may facilitate the transfer of the domain name from the Seller controlled account of the Losing Registrar to the Buyer controlled account of the Gaining Registrar. The Aftermarket Platform may also facilitate the collection of funds from the Buyer and the disbursement of funds to the Seller.

In another embodiment, an Aftermarket Platform may receive an agreement executed by a Seller that permits a domain name registered to the Seller to be transferred, only after a Buyer has agreed to purchase the domain name and without further action from the Seller, from a Seller controlled account of a Losing Registrar to a Buyer controlled account of a Gaining Registrar. In preferred embodiments the agreement is executed by the Seller prior to making the domain name available to the Buyer for purchase. The Aftermarket Platform may communicate a notification to a plurality of Registrars that triggers one or more Registrars in the plurality of Registrars to list the domain name on one or more website as available for purchase to a plurality of potential Buyers. The Aftermarket Platform may receive a notification from the Losing Registrar that the domain name is nontransferable from the Seller controlled account. Based on the notification, the Aftermarket Platform may prevent the Buyer from purchasing the domain name, possibly by sending a communication to the plurality of Registrars to stop listing the domain name as available for purchase to the plurality of potential Buyers.

In another embodiment, a Losing Registrar may register a domain name to a Seller. The Losing Registrar may manage the domain name in a Seller controlled account, wherein the Seller has executed an agreement that permits the domain name to be transferred, only after a Buyer has agreed to purchase the domain name and without further action from the Seller, from the Seller controlled account of the Losing Registrar to a Buyer controlled account of a Gaining Registrar. In a preferred embodiment, the agreement is executed prior to making the domain name available to the Buyer for purchase. The Losing Registrar may receive a communication from an Aftermarket Platform or a Gaining Registrar that a Buyer has purchased the domain name from the Seller. The Losing Registrar may facilitate the transfer of the domain name from the Seller controlled account of the Losing Registrar to the Buyer controlled account of the Gaining Registrar. The Losing Registrar may also facilitate the collection of funds from the Buyer (preferably via cooperation with the Gaining Registrar) and the disbursement of funds to the Seller.

In another embodiment, a Losing Registrar may register a domain name to a Seller. The Losing Registrar may manage the domain name in a Seller controlled account. In a preferred embodiment, the Seller executes an agreement that permits the domain name to be transferred, only after a Buyer has agreed to purchase the domain name and without further action from the Seller, from the Seller controlled account of the Losing Registrar to a Buyer controlled account of a Gaining Registrar. The agreement may be executed prior to making the domain name available to the Buyer for purchase. The Losing Registrar may communicate the agreement to an Aftermarket Platform that triggers the Aftermarket Platform to communicate a notification to a plurality of Registrars. The notification to the plurality of Registrars may trigger one or more Registrars in the plurality of Registrars to list the domain name on one or more websites as available for purchase to a plurality of potential Buyers. The Losing Registrar may receive a communication from an Aftermarket Platform or a Gaining Registrar that a Buyer has purchased the domain name from the Seller. The Losing Registrar may facilitate the transfer of the domain name from the Seller controlled account of the Losing Registrar to the Buyer controlled account of the Gaining Registrar. The Losing Registrar may also facilitate the collection of funds from the Buyer (preferably via cooperation with the Gaining Registrar) and the disbursement of funds to the Seller.

In another embodiment, a Losing Registrar may register a domain name to a Seller. The Seller may manage the domain name from a Seller controlled account of a Losing Registrar and the Seller may have executed an agreement. The agreement may permit the domain name to be transferred, only after a Buyer has agreed to purchase the domain name and without further action from the Seller, from the Seller controlled account of a Losing Registrar to a Buyer controlled account of a Gaining Registrar. The agreement is preferably executed prior to making the domain name available to the Buyer for purchase. The Losing Registrar may communicate the agreement to an Aftermarket Platform that triggers the Aftermarket Platform to communicate a notification to a plurality of Registrars. The notification to the plurality of Registrars may trigger one or more Registrars in the plurality of Registrars to list the domain name on one or more websites as available for purchase to a plurality of potential Buyers. The Losing Registrar may monitor the transferability of the domain name from the Seller controlled account. If the domain name becomes nontransferable from the Seller controlled account, the Losing Registrar may notify an Aftermarket Platform that the domain name is nontransferable. The notification to the Aftermarket Platform may trigger the Aftermarket Platform to prevent the Buyer from purchasing the domain name, possibly by sending a communication to the plurality of Registrars to stop listing the domain name as available for purchase.

In another embodiment, a Gaining Registrar may receive a domain name transferred from a Seller controlled account of a Losing Registrar to a Buyer controlled account of the Gaining Registrar. The domain name may be registered to a Seller by the Losing Registrar. The Seller may execute an agreement that permits the domain name to be transferred, only after a Buyer has agreed to purchase the domain name and without further action from the Seller, from a Seller controlled account of the Losing Registrar to the Buyer controlled account of the Gaining Registrar. In preferred embodiments, the agreement is executed prior to making the domain name available to the Buyer for purchase. The Gaining Registrar may register the domain name to the Buyer and receive instructions from the Buyer to manage the domain name in the Buyer controlled account.

In another embodiment, a Gaining Registrar may receive a notification from an Aftermarket Platform to list a domain name on a websites as available for purchase to a plurality of potential Buyers. The Gaining Registrar may receive the domain name transferred from a Seller controlled account of a Losing Registrar to a Buyer controlled account of the Gaining Registrar. The domain name may have been registered to the Seller by the Losing Registrar. The Seller may have executed an agreement that permits the domain name to be transferred, only after a Buyer has agreed to purchase the domain name and without further action from the Seller, from a Seller controlled account of the Losing Registrar to the Buyer controlled account of the Gaining Registrar. In a preferred embodiment, the agreement is executed prior to making the domain name available to the Buyer for purchase. The Gaining Registrar may register the domain name to the Buyer and receive instructions from the Buyer to manage the domain name in the Buyer controlled account.

In another embodiment, a Gaining Registrar may receive a first notification from an Aftermarket Platform to list a domain name on a websites as available for purchase to a plurality of potential Buyers. The Gaining Registrar may list the domain name on the website as available for purchase to the plurality of potential Buyers. The Gaining Registrar may receive a second notification from the Aftermarket Platform that the domain name is no longer available for purchase. The Gaining Registrar may then remove the domain name on the website as available for purchase to the plurality of potential Buyers.

In another embodiment, an Aftermarket Platform may display a domain name on a website to a plurality of potential domain name purchasers. The domain name may be registered to a Seller by a Losing Registrar and the domain name may have expired. The Aftermarket Platform may receive directly or via a Gaining Registrar an offer from a Buyer for the domain name. The Aftermarket Platform may communicate directly or via the Losing Registrar, the offer to the Seller. The Aftermarket Platform may receive directly or via the Losing Registrar, an acceptance from the Seller to the offer from the Buyer. The Aftermarket Platform may facilitate the transfer of the domain name from the Seller controlled account of the Losing Registrar to a Buyer controlled account of the Gaining Registrar. The Aftermarket Platform may also facilitate the collection of funds from the Buyer (preferably with cooperation from the Gaining Registrar) and the disbursement of funds to the Seller (preferably with cooperation with the Selling Registrar) corresponding to the offer from the Buyer to the Seller.

In another embodiment, an Aftermarket Platform may display a domain name on a website to a plurality of potential domain name purchasers. The domain name may be registered to a Seller by a Losing Registrar and the domain name may have expired. The Aftermarket Platform may receive directly or via a Gaining Registrar, an offer from a Buyer for the domain name. The Aftermarket Platform may communicate directly or via the Losing Registrar the offer to the Seller. The Aftermarket Platform may communicate directly or via the Gaining Registrar, a counteroffer from the Seller to the Buyer. The Aftermarket Platform may receive directly or via the Gaining Registrar, an acceptance from the Buyer to the counteroffer from the Seller. The Aftermarket Platform may facilitate the transfer of the domain name from the Seller controlled account of the Losing Registrar to a Buyer controlled account of the Gaining Registrar. The Aftermarket Platform may also facilitate the collection of funds from the Buyer (preferably with cooperation from the Gaining Registrar) and the disbursement of funds to the Seller (preferably with cooperation from the Losing Registrar) corresponding to the counteroffer from the Buyer to the Seller.

In another embodiment, a Losing Registrar registers a domain name to a Seller. The Losing Registrar may communicate to an Aftermarket Platform that the domain name has expired. The Losing Registrar may receive an offer from a Buyer to purchase the domain name from the Seller. The Losing Registrar may receive an acceptance from the Seller to the offer from the Buyer. The Losing Registrar may facilitate the transfer of the domain name from a Seller controlled account of the Losing Registrar to a Buyer controlled account of the Gaining Registrar. The Losing Registrar may also facilitate the collection of funds from the Buyer and the disbursement of funds to the Seller corresponding to the offer.

In another embodiment, a Losing Registrar registers a domain name to a Seller. The Losing Registrar may communicate to an Aftermarket Platform that the domain name has expired. The Losing Registrar may receive an offer from a Buyer to purchase the domain name from the Seller. The Losing Registrar may receive a counteroffer from the Seller to purchase the domain name by the Buyer. The Losing Registrar may receive an acceptance from the Buyer to the counteroffer from the Seller. The Losing Registrar may facilitate the transfer of the domain name from a Seller controlled account of the Losing Registrar to a Buyer controlled account of the Gaining Registrar. The Losing Registrar may also facilitate the collection of funds from the Buyer (preferably with cooperation from the Gaining Registrar) and the disbursement of funds to the Seller corresponding to the offer.

In another embodiment, a domain name may be transferred from a Seller controlled account to an Aftermarket Platform. Funds may be transferred or entered, preferably either from a Gaining Registrar or an Aftermarket Platform, to the Aftermarket Platform. The transfer of the domain name to the Aftermarket Platform and the transfer of the funds to the Aftermarket Platform may occur in either order. After, and preferably only after, the Aftermarket Platform has both the domain name and the funds, the Aftermarket Platform may transfer the domain name to a Buyer controlled account in a Gaining Registrar and the Aftermarket Platform may transfer the funds from the Aftermarket Platform to the Seller. The transfer of the domain name from the Aftermarket Platform to the Buyer controlled account in the Gaining Registrar and the transfer of the funds from the Aftermarket Platform to the Seller may occur in either order. In this embodiment, in the event the domain name is not transferred to the Aftermarket Platform after a predetermined period of time, the Aftermarket Platform may return any received funds to the Buyer. In this embodiment, in the event the funds are not transferred to the Aftermarket Platform after a predetermined period of time, the Aftermarket Platform may return the domain name to the Seller controlled account in the Losing Registrar. This embodiment has the advantage of reducing the risk the Seller will lose the domain name without receiving the funds and reduce the risk the Buyer will lose the funds without receiving the domain name.

In another embodiment, a Seller may execute an agreement that permits a domain name registered to the Seller to be transferred/sold from a Seller controlled account at a Losing Registrar to a Buyer controlled account at a Gaining Registrar upon purchase by a Buyer. The agreement may be executed, i.e., agreed to, on a website controlled by the Losing Registrar or an Aftermarket Platform. The agreement preferably allows the domain name to be transferred without further action by the Seller. The domain name may be listed, i.e., offered for sell, on a plurality of Registrars' websites to a plurality of potential Buyers after the Seller executes the agreement. The domain name may be monitored (preferably by the Losing Registrar) and delisted, i.e., disabled from being purchased by a Buyer from any Registrar, if the domain name becomes nontransferable from the Seller controlled account. The Buyer and Seller may make any number of offers and counteroffers for the domain name, even if the domain name has expired, but remains transferable from the Seller controlled account. Once an offer or counteroffer has been accepted, the domain name may be transferred from the Seller controlled account at a Losing Registrar to the Buyer controlled account at a Gaining Registrar and funds may be transferred from the Buyer to the Seller.

In another embodiment, a buyer funds may be collected from a Buyer by a plurality of hardware servers. Ownership of a domain name may be transferred from a Seller to a Third Party. The WHOIS database may be changed to reflect the Third Party as the new registrant of the domain name. Ownership of the domain name may be transferred from the Third Party to the Buyer. The WHOIS database may be changed to reflect the Buyer as the new registrant of the domain name. A seller funds may be disbursed to the Seller, preferably if, and only if, the domain name was successfully transferred to the Buyer.

In another embodiment, a buyer funds may be collected from a Buyer by a Gaining Registrar. Ownership of a domain name may be transferred from a Seller to a Third Party by a Losing Registrar. The WHOIS database may be changed to reflect the Third Party as the new registrant of the domain name. Ownership of the domain name may be transferred from the Third Party to the Gaining Registrar by the Third Party. The WHOIS database may be changed to reflect the Buyer as the new registrant of the domain name. The Losing Registrar or Third Party may disburse a seller funds to the Seller, preferably if, and only if, the domain name was successfully transferred to the Buyer. The Gaining Registrar and the Losing Registrar may be the same or different registrars. The Third Party may be an Aftermarket Platform or other legal entity.

In another embodiment, the ownership of a domain name may be transferred from a Seller to a Third Party, wherein a Gaining Registrar may collect a buyer funds from a Buyer purchasing the domain name. A registrant in the WHOIS database may be changed from the Seller to the Third Party to reflect the new ownership. The ownership of the domain name may be transferred from the Third Party to the Buyer, wherein a Losing Registrar or an Aftermarket Platform may disburse a seller funds to the Seller selling the domain name. The registrant in the WHOIS database may be changed from the Third Party to the Buyer to reflect the new ownership. In a preferred embodiment, the Losing Registrar or the Aftermarket Platform disburses the seller funds to the Seller if, and only if, the domain name was successfully transferred from the Seller to the Third Party and/or successfully transferred from the Third Party to the Buyer. The Gaining Registrar and the Losing Registrar may be the same or different registrars. In preferred embodiments, the Third Party is not the Gaining Registrar or the Losing Registrar. The Third Party may be an Aftermarket Platform or other legal entity.

In another embodiment an electronic shopping cart may collect a funds from a Buyer. The funds may comprise: 1) only a non-escrow funds, 2) only the non-escrow funds and an escrow funds, or 3) only the escrow funds. Non-escrow funds are collected by a Gaining Registrar from a Buyer in exchange for a product or service from the Gaining Registrar. Escrow funds are collected by the Gaining Registrar from the Buyer in exchange for a transfer of ownership of the domain name from the Seller to the Buyer. If, and only if, the funds comprise only non-escrow funds, then transfer the non-escrow funds to the Gaining Registrar. If, and only if, the funds comprise only non-escrow funds and escrow funds, then transfer the funds to a Third Party where the Third Party transfers the non-escrow funds to the Gaining Registrar and the Losing Registrar disburses the escrow funds to the Seller. If, and only if, the funds comprise only escrow funds, then transfer the funds to the Third party and the Losing Registrar disbursing the escrow funds to the Seller. In preferred embodiments, the domain name may be transferred from a Seller controlled account with the Losing Registrar to a Buyer controlled account with the Gaining Registrar. In other preferred embodiments, a registrant in the WHOIS database for the domain name may be changed from the Seller to the Third Party and then from the Third Party to the Buyer. In other preferred embodiments, the Losing Registrar disburses the escrow funds to the Seller of the domain name, if, and only if, the ownership of the domain name is transferred successfully to the Buyer. In these embodiments, the Gain Registrar and the Losing Registrar may be the same or different registrars. In these embodiments, the Third Party is not the Gaining Registrar or the Losing Registrar.

In another embodiment, a Losing Registrar may assist in creating an auction for expired domain names across multiple domain name registrars. The Losing Registrar may start by registering a domain name to a last registrant. The last registrant is preferably the last registrant of the domain name prior to the start of the auction. The Losing Registrar may communicate the domain name as available for purchase to an Aftermarket Platform when the domain name is: 1) under management of the Losing Registrar, 2) expired and 3) unencumbered by any rights of the last registrant. The Losing Registrar may receive a list of a plurality of domain names that are available for purchase or bidding from the Aftermarket Platform. Each domain name in the plurality of domain names is preferably 1) under management by a registrar that is not the Losing Registrar, 2) expired and 3) unencumbered by any rights of a previous registrant. The Losing Registrar may display the domain name and the plurality of domain names that are available for purchase on a website to a plurality of potential buyers. The Losing Registrar may receive one or more bids for the domain name or for the one or more domain names in the plurality of domain names. If a Buyer selects the domain name for purchase from a Gaining Registrar and the Buyer has entered the highest bid at the end of the auction, the Losing Registrar may transfer the domain name to the Gaining Registrar.

In another embodiment, a Gaining Registrar may assist in creating an auction for expired domain names across multiple domain name registrars. The Gaining Registrar may receive a list of a plurality of domain names that are available for purchase from an Aftermarket Platform. Each domain name in the plurality of domain names is preferably: 1) under management by a registrar that is not the Gaining Registrar, 2) expired and 3) unencumbered by any rights of a previous registrant. The Gaining Registrar may display the plurality of domain names available for purchase on a website to a plurality of potential buyers. The Gaining Registrar may receive a plurality of bids for one or more domain names in the plurality of domain names and a highest bid before the end of the auction from a Buyer. The Gaining Registrar may collect a funds from the Buyer for the purchase of the domain name. A Losing Registrar may renew and transfer the domain name to the Gaining Registrar. The Gaining Registrar may take the domain name under management and register the domain name to the Buyer.

In another embodiment, an Aftermarket Platform may assist in creating an auction for expired domain names across multiple domain name registrars. The Aftermarket Platform may receive a list of available domain names from a Losing Registrar (and optionally from a Gaining Registrar as well as other registrars). Each domain name in the list is preferably: 1) under management of a registrar, 2) has expired and 3) is unencumbered by any rights of a previous registrant. The Aftermarket Platform may distribute the list of domain names available for purchase to a Gaining Registrar (and optionally the Losing Registrar as well as other registrars). The Gaining Registrar may display on a website the domain names to a plurality of potential buyers. In preferred embodiments, the Losing Registrar as well as the other registrars also display on their respective websites the domain names to additional potential buyers in an attempt to become the Gaining Registrar. The Gaining Registrar, Losing Registrar and other registrars may receive one or more bids from potential buyers. The Gaining Registrar becomes the Gaining Registrar by receiving a highest bid from a Buyer out of the plurality of potential buyers at all the registrars before the close of the auction. The Gaining Registrar may collect a funds from the Buyer for the ownership of the domain name. The Losing Registrar may renew the domain name and transfer the domain name to the Gaining Registrar. The Gaining Registrar may register the domain name to the Buyer.

In another embodiment, a Losing Registrar may assist in creating an auction for expired domain names across multiple domain name registrars. The Losing Registrar may comprise a registrar function, a communication system and one or more servers. The registrar function may be able to register a domain name to a domain name registrant and renew the domain name when the domain name is under management of the Losing Registrar, the domain name has expired, the domain name is unencumbered by any rights of the domain name registrant and a Buyer has bid on the domain name. The registrar function may also be able to transfer the domain name to a Gaining Registrar. The communication system may be able to send a list of domain names that are available for purchase to an Aftermarket Platform. The domain names are preferably: 1) under management of the Losing Registrar, 2) have expired and 3) are unencumbered by any rights of a last registrant. The communication system may also be able to receive a list of domain names that are available for purchase from the Aftermarket Platform. The domain names are preferably: 1) under management by the Gaining Registrar, 2) have expired and 3) are unencumbered by any rights of a previous registrant. The one or more servers may display the list of domain names from the Aftermarket Platform on a website to a plurality of potential buyers, receive one or more bids from the plurality of potential buyers, and transmit the one or more bids to the Aftermarket Platform.

In another embodiment, a Gaining Registrar may assist in creating an auction for expired domain names across multiple domain name registrars. The Gaining Registrar may comprise a communication system, one or more servers running a website and a registrar function. The communication system may communicate a first list of a first plurality of domain names that are available for purchase to an Aftermarket Platform. The first plurality of domain names are: 1) under management of the Gaining Registrar, 2) expired and 3) are unencumbered by any rights of a previous registrant. The communication system may also receive a second list of a second plurality of domain names. The second plurality of domain names are: 1) under management by a Losing Registrar and possibly other registers, 2) expired and 3 are unencumbered by any rights of a previous registrant. The one or more servers running the website may: 1) display the second plurality of domain names to a plurality of potential buyers, 2) receive one or more bids for one or more domain names from the plurality of potential buyers, 3) receive a highest bid from a Buyer for a domain name in the second plurality of domain names, 4) transmit the one or more bids and the highest bid to the Aftermarket Platform, and 5) collect funds for the purchase of the domain name from the Buyer. The registrar function may be configured to receive the domain name transferred from the Losing Registrar (the Losing Registrar renewed the domain name) and register the domain name to the Buyer.

In another embodiment, an Aftermarket Platform may assist in creating an auction for expired domain names. The Aftermarket Platform may comprise a communication system, an auction system and notification system. The communication system may receive one or more lists comprising a plurality of domain names available for purchase, wherein the plurality of domain names comprises one or more domain names from one or more registrars in a plurality of registrars. Each domain name in the plurality of domain names may be: 1) under management by a registrar in the plurality of registrars, 2) expired and 3) unencumbered by any rights of a previous registrant. The communication system may communicate the one or more lists comprising the plurality of domain names available for purchase to the plurality of registrars. The auction system may be configured to receive one or more bids from a plurality of bidders for each domain name in the plurality of domain names. The auction system may also, for each domain name in the plurality of domain names, determine: 1) a highest bidder in the plurality of bidders, a Gaining Registrar in the plurality of registrars used by the highest bidder and a Losing Registrar in the plurality of registrars that has each domain name under management. The notification system may be configured to notify the Losing Registrar to renew each domain name and transfer each domain name to the Gaining Registrar for each domain name in the plurality of domain names. The notification system may also be configured to notify the Gaining Registrar for each domain name in the plurality of domain names to: 1) collect a funds from the highest bidder, 2) receive each domain name transferred from the Losing Registrar and 3) register each domain name to the highest bidder.

In another embodiment, a Registry may sell never before registered domain names with the same top-level domain at variable prices through one or more registrars to a Buyer. The process may start by the Registry calculating a list price for one or more never before registered domain names. These domain names may have the same top-level domain, but be priced differently based on the desirability of the second-level domain for each domain name. The list price may comprise only the registration fee that will be owed by the Gaining Registrar to the Registry or may include the registration fee and a fee or commission for the Gaining Registrar. If the list price comprises only the registration fee, the Gaining Registrar may add its fee to the list price to create a purchase price that is displayed and charged to the Buyer. The desirability for the second-level domain may be determined, as a non-limiting example, by using historical data of the second-level domain with other top-level domains. The Registry may then communicate a list of the one or more never before registered domain names and their corresponding list prices to a plurality of registrars and to a Gaining Registrar. In some embodiments, the Registry may receive a request from the Gaining Registrar to register one of the one or more never before registered domain names to a Buyer. The Registry and/or Registrar may register the domain in the WHOIS database to the Buyer. The Buyer thus becomes the registrant of the domain name. The Registry may then communicate to the plurality of registrars that the domain name is no longer available for registration, possibly by sending an updated list that no longer includes the registered domain name or updating a registry maintained list that is exposed through a web service. In other embodiments, the Registry may periodically communicate with the plurality of registrars a current list with current corresponding list prices of never before registered domain names.

In another embodiment, a Registry may sell unregistered domain names with the same top-level domain at variable prices through one or more registrars to a Buyer. A Registry may determine a plurality of unregistered domain names that have the same top-level domain that are highly desirable due to the quality of the domain name's second-level domain. The Registry may determine or calculate a list price for each of these domain name based on the second-level domain. The more desirable the second-level domain, the higher the list price resulting in domain names that do not all have the same list price. The Registry may communicate the plurality of domain names with their corresponding different list prices to an Aftermarket Platform. The Aftermarket Platform may communicate the domain names and list price to a plurality of registrars and a Gaining Registrar that display the domain names to a plurality of potential buyers on a plurality of different websites. The unregistered domain names are preferably domain names that have never been registered and/or never listed or included in a WHOIS database. In additional embodiments, the Registry may receive a request from the Gaining Registrar to register one or more domain names in the plurality of domain names to a Buyer. The Registry may register the one or more domain names to the Buyer. The Registry may then update its list of the plurality of unregistered domain names to remove any registered domain names or domain names that are no longer available for registration and communicate this list to the Aftermarket Platform. The Aftermarket Platform may then communicate this list to the plurality of registrars so that only available never before registered domain names are displayed to potential buyers.

In another embodiment, a Registry may determine a list of premium domain names that all have the same top-level domain and that have never been registered. In some embodiments, the premium domain names comprise a second-level domain that has historically been very desirable, valuable and/or receives a large amount of traffic when combined with other top-level domains. The Registry may assign a list price to each domain name in the list, wherein at least two of the domain names have different list prices. The list price may represent: 1) the amount of money the Registry wants to register the domain name (which may be referred to as a registration fee) or 2) the amount of money the Registry wants to register the domain name and an additional amount for the Gaining Registrar. The list price and purchase price may include other fees involved in registering a domain name. The list of premium domain names may be communicated to an Aftermarket Platform, a plurality of registrars and/or a Gaining Registrar. The Registry may receive a request to register a domain name to a Buyer from the Gaining Registrar or the Aftermarket Platform and then register the domain name to the Buyer, preferably adding the registration information to a WHOIS database.

In another embodiment, a Gaining Registrar may offer and sell never before registered domain names with the same top-level domain at variable prices to a Buyer on a website. The Gaining Registrar may receive a domain name search request on a website from the Buyer. The Gaining Registrar may display a domain name that is an exact match of the domain name search request and/or additional similar domain names on the website to the Buyer. The displayed domain names may comprise at least two that have never been registered before, have the same top-level domain and different list prices or purchase prices. In additional embodiments, the Gaining Registrar may receive, preferably periodically, an updated list of domain names from a Registry or an Aftermarket Platform that have never been registered, have the same top-level domain and have different list prices or purchase prices. The Gaining Registrar (and optionally a plurality of other registrars) may then display and offer for sale these domain names, preferably if the domain names are close to a domain name search requests, on a website to a plurality of buyers. Additionally, the domain names may be checked for availability and only the domain names available for registration are displayed on the website.

In another embodiment, a Gaining Registrar may display on a website a plurality of domain names that have never before been registered that share a common top-level domain, but have different list prices to a plurality of potential buyers. A Buyer, using the website, may select one or more of the displayed never before registered domain names for registration. The Gaining Registrar may collect funds (that includes at least the list price) from the Buyer. The Gaining Registrar, in cooperation with a Registry, may register the selected displayed one or more never before registered domain names to the Buyer.

In another embodiment, a Gaining Registrar may receive a list of a plurality of never before registered domain names with a corresponding plurality of list prices from a Registry or an Aftermarket Platform. At least two domain names in the plurality of never before registered domain names have the same top-level domain, but have different list prices. The Gaining Registrar (and preferably a plurality of other registrars) may display, preferably in response to a domain name search request from a Buyer, on a website the one or more of the plurality of never before registered domain names and corresponding list prices to a plurality of potential buyers and to the Buyer. The Gaining Registrar may receive a selection from the Buyer for a displayed domain name, collect a purchase price for the domain name from the Buyer and then register, thru a Registry, the never before registered domain name to the Buyer. The Gaining Registrar may disburse, possibly in combination with other domain name purchases, all or part of the purchase price to the Registry as the list price or as a registration fee.

In another embodiment, a Buyer may enter a domain name (or search string) in a search field of a website operated by a Gaining Registrar. The Gaining Registrar may determine the domain name is registered at a Losing Registrar (the Gaining Registrar may be a different registrar from the Losing Registrar). The Gaining Registrar may ask whether the Buyer would like to make an offer on one or more domain names that are already registered and the following process may be repeated for each selected domain name. The Gaining Registrar preferably validates the Buyer to confirm the identity of the Buyer to reduce the possibility of a fraudulent transaction. The Gaining Registrar may also calculate an estimated value of the domain name and present the estimated value to the Buyer. The Gaining Registrar may receive a selected domain name, offer amount and/or a time the offer is good from the Buyer. The Gaining Registrar may also collect a reserve from the Buyer. The reserve may be of any amount, but is preferably about 2-5% of the offer. The percentage of the reserve may also be based on the trustworthiness of the Buyer. The Gaining Registrar may send the domain name, offer amount and possibly a time the offer is good to an Aftermarket Platform (or directly to a Losing Registrar). The Aftermarket Platform may communicate the domain name, offer amount and/or a time the offer is good to the Losing Registrar. The Losing Registrar may check a do not contact list for the Seller and/or the domain name and terminate the process if the Seller and/or domain name are on the do not contact list. The Losing Registrar may communicate the domain name, offer amount and possibly a time the offer is good to a Seller. The Seller may accept the offer, make a counter-offer, decline the offer or take no action within the time the offer is good. If the Seller accepts the offer (or the Buyer accepts the counter-offer) the domain name is transferred to the Gaining Registrar and registered to the Buyer and the reserve (possibly minus a transaction fee from the Losing Registrar and/or the Gaining Registrar) is disbursed to the Seller. If no offer or counter-offer is accepted or they are declined, the reserve (possibly minus a transaction fee) may be disbursed back to the Buyer.

In another embodiment, a method for an intra-registrar hi-jack prevention service is performed. A Registrar may register a domain name to a registrant. The Registrar may ask for and receive a preferred contact method from the registrant. The preferred contact method should be secure in that only the registrant (or trusted agents of the registrant) has access to the preferred contact method. The Registrar may manage the domain name in a first account based on instructions received from the registrant. The Registrar may receive instructions from the registrant, possibly in response to a request from the Registrar, to enable a hi-jack prevention service. The Registrar may enable the hi-jack prevention service for the domain name. The Registrar, at some time after the hi-jack prevention service has been enabled, may receive a request to move the domain name from a first account managed by the Registrar to a second account managed by the Registrar. In response to the move request, the Registrar may send a confirmation request for moving the domain name by the preferred contact method to the registrant. The requester of the move will not receive the confirmation email sent only via the preferred contact method unless the requester is the registrant. Upon the Registrar receiving an affirmative response in response to the confirmation request within a predetermined time limit, the Registrar may move the domain name from the first account to the second account. An email confirming the move was successful (or unsuccessful) may be sent to the registrant using the preferred contact method. Upon the Registrar not receiving the affirmative response in response to the confirmation request within the predetermined time limit, the Registrar not moving the domain name from the first account to the second account. An email stating the domain name was not moved may be sent to the registrant using the preferred contact method.

In another embodiment, a method for an intra-registrar third party platform hi-jack prevention service is performed. A Registrar may register a domain name to a registrant. The Registrar may ask for and receive a preferred contact method from the registrant. The preferred contact method should be secure in that only the registrant (or trusted agents of the registrant) has access to the preferred contact method. The Registrar may manage the domain name in a first account based on instructions received from the registrant. The Registrar may receive instructions from the registrant, possibly in response to an offer from the Registrar, to enable a hi-jack prevention service. The Registrar may enable the hi-jack prevention service for the domain name. The Registrar, at some time after the hi-jack prevention service has been enabled, may receive a request to move the domain name from a first account managed by the Registrar to a second account managed by the Registrar. In response to the move request, a third party platform may send a confirmation request for moving the domain name by the preferred contact method to the registrant. The requester of the move will not receive the confirmation request sent only via the preferred contact method unless the requester is the registrant. Upon the third party platform receiving an affirmative response in response to the confirmation request within a predetermined time limit, the Registrar may move the domain name from the first account to the second account. An email confirming the move was successful (or unsuccessful) may be sent to the registrant using the preferred contact method. Upon the Registrar not receiving the affirmative response in response to the confirmation request within the predetermined time limit, the Registrar not moving the domain name from the first account to the second account. An email stating the domain name was not moved may be sent to the registrant using the preferred contact method.

In another embodiment, a method for an inter-registrar third party platform hi-jack prevention service is performed. A Losing Registrar may register a domain name to a registrant. The Losing Registrar may ask for and receive a preferred contact method from the registrant. The preferred contact method should be secure and only the registrant (or trusted agents of the registrant) has access to the preferred contact method. The Losing Registrar may manage the domain name in a first account based on instructions received from the registrant. The Losing Registrar may receive instructions, possibly in response to an offer from the Losing Registrar, to enable a hi-jack prevention service. The Losing Registrar may enable the hi-jack prevention service for the domain name. The Losing Registrar, at some time after the hi-jack prevention service has been enabled, may receive a request to transfer the domain name from the Losing Registrar to a Gaining Registrar. In response to the transfer request, a third party platform may change the authentication code, with the Losing Registrar to prevent the transfer of the domain name until the registrant has been verified. The third party may generate a token or new authentication code for registrant to validate through the Gaining Registrar or third party. Once the registrant has been validated, the third party may change the authentication code back to its original value to allow the transfer of the domain name between the Gaining Registrar and the Losing Registrar. If the registrant is not validated, the third party does not change the authentication code back to its original value and prevents the transfer.

In another embodiment, a method for an inter-registrar third party platform hi-jack prevention service is performed. A Losing Registrar may register a domain name to a registrant. The Losing Registrar may ask for and receive a preferred contact method from the registrant. The preferred contact method should be secure and only the registrant (or trusted agents of the registrant) has access to the preferred contact method. The Losing Registrar may manage the domain name in a first account based on instructions received from the registrant. The Losing Registrar may receive instructions, possibly in response to an offer from the Losing Registrar, to enable a hi-jack prevention service. The Losing Registrar may enable the hi-jack prevention service for the domain name. The Losing Registrar, at some time after the hi-jack prevention service has been enabled, may receive a request to transfer the domain name from the Losing Registrar to a Gaining Registrar. In response to the transfer request, a third party platform may send an authentication code for transferring the domain name by the preferred contact method to the registrant. The requester of the transfer will not receive the authentication code sent only via the preferred contact method unless the requester is the registrant. Upon the Gaining Registrar receiving the authentication code from the registrant before a predetermined time limit, transferring the domain name from the Losing Registrar to the Gaining Registrar. Upon the Gaining Registrar not receiving the authentication code from the registrant before the predetermined time limit, not transferring the domain name from the Losing Registrar to the Gaining Registrar.

The above features and advantages of the present invention will be better understood from the following detailed description taken in conjunction with the accompanying drawings.

BRIEF DESCRIPTION OF THE DRAWINGS

FIG. 40 is a block diagram illustrating how a Losing Registrar may be configured as part of an auction for expired domain names across multiple registrars.

FIG. 41 is a block diagram illustrating how a Gaining Registrar may be configured as part of an auction for expired domain names across multiple registrars.

FIG. 42 is a block diagram illustrating how an Aftermarket Platform may be configured as part of an auction for expired domain names across multiple registrars.

DETAILED DESCRIPTION

Figure 1:
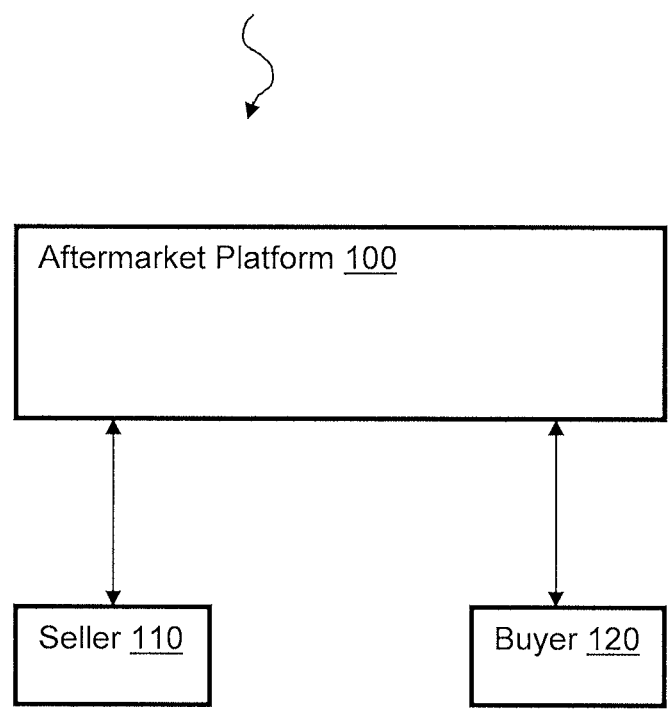
FIG. 1 is a block diagram of part of a Domain Name Aftermarket.
Figure 2:
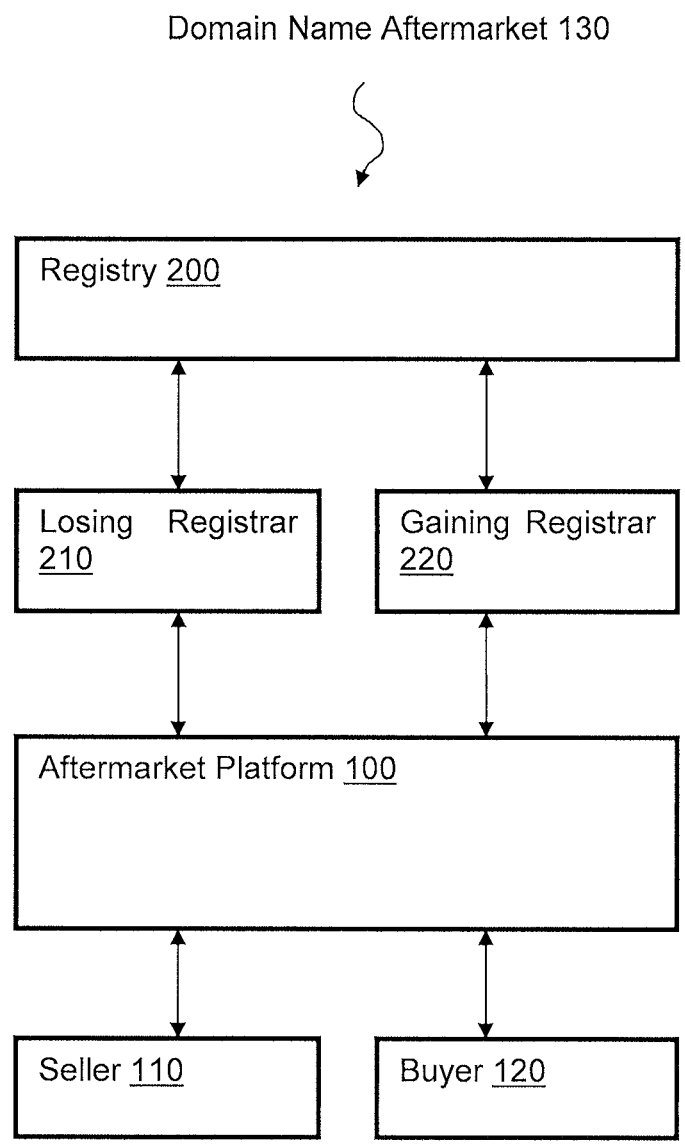
FIG. 2 is a block diagram of a Domain Name Aftermarket that illustrates a Seller and a Buyer in communication with an Aftermarket Platform, the Aftermarket Platform in communication with a Losing Registrar and a Gaining Registrar and the Losing Registrar and the Gaining Registrar in communication with a Registry.
Figure 3:
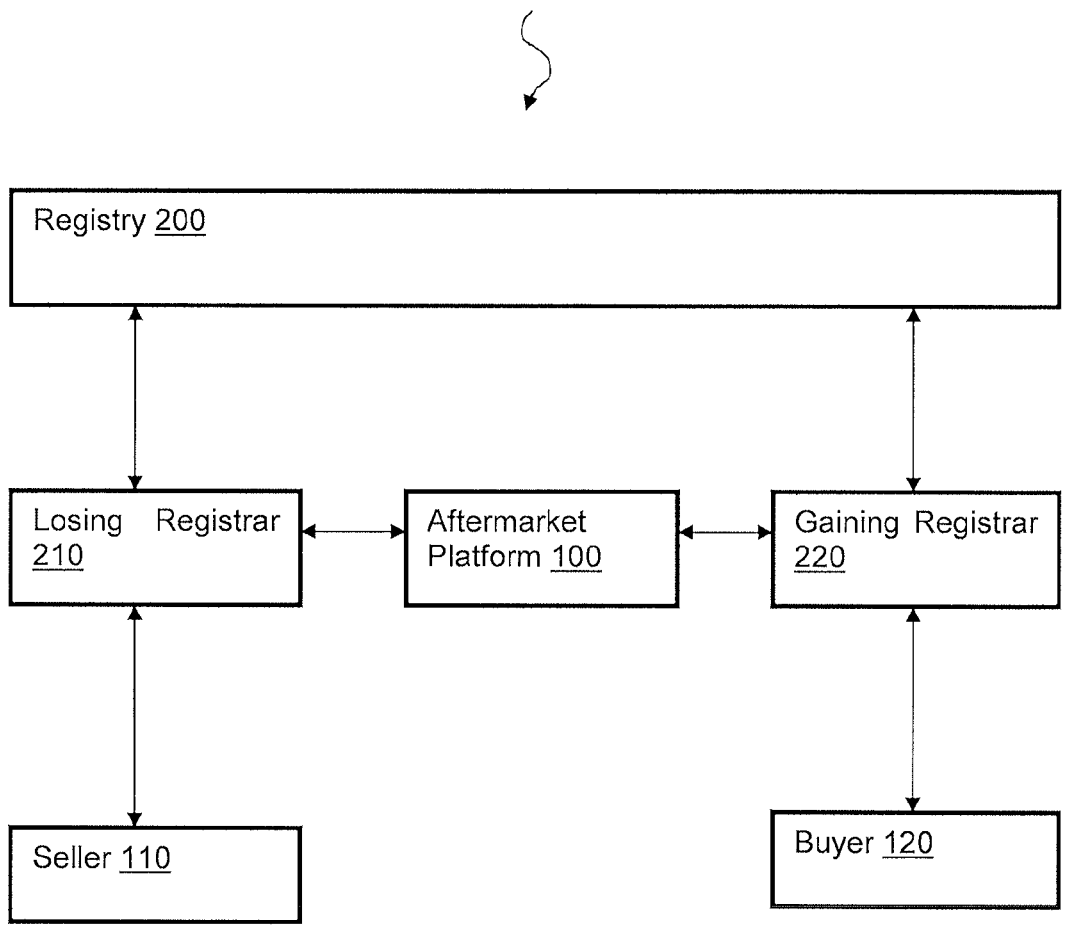
FIG. 3 is a block diagram of a Domain Name Aftermarket that illustrates a Seller in communication with a Losing Registrar, a Buyer in communication with a Gaining Registrar, the Losing Registrar and Gaining Registrar in communication with an Aftermarket Platform and a Registry.
Figure 4:
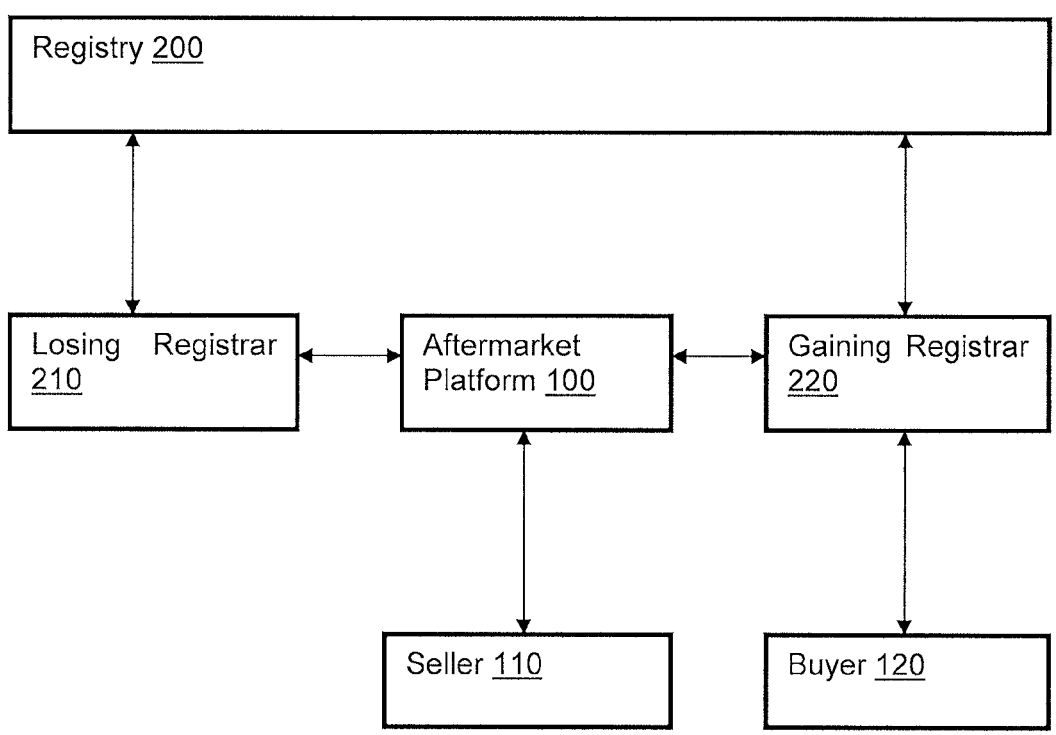
FIG. 4 is a block diagram of a Domain Name Aftermarket that illustrates a Seller in communication with an Aftermarket Platform, a Buyer in communication with a Gaining Registrar, the Losing Registrar and Gaining Registrar in communication with an Aftermarket Platform and a Registry.
Figure 5:
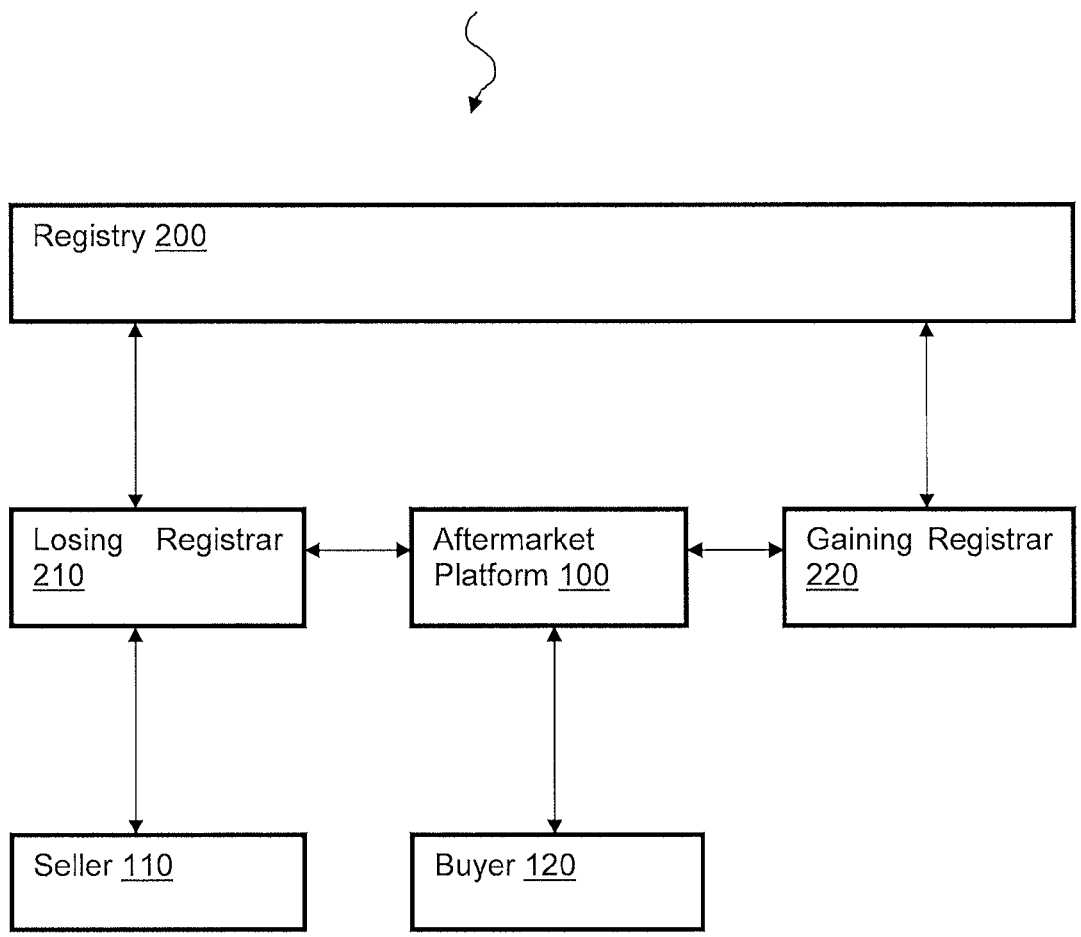
FIG. 5 is a block diagram of a Domain Name Aftermarket that illustrates a Seller in communication with a Losing Registrar, a Buyer in communication with an Aftermarket Platform, the Losing Registrar and Gaining Registrar in communication with the Aftermarket Platform and a Registry.
Figure 6:
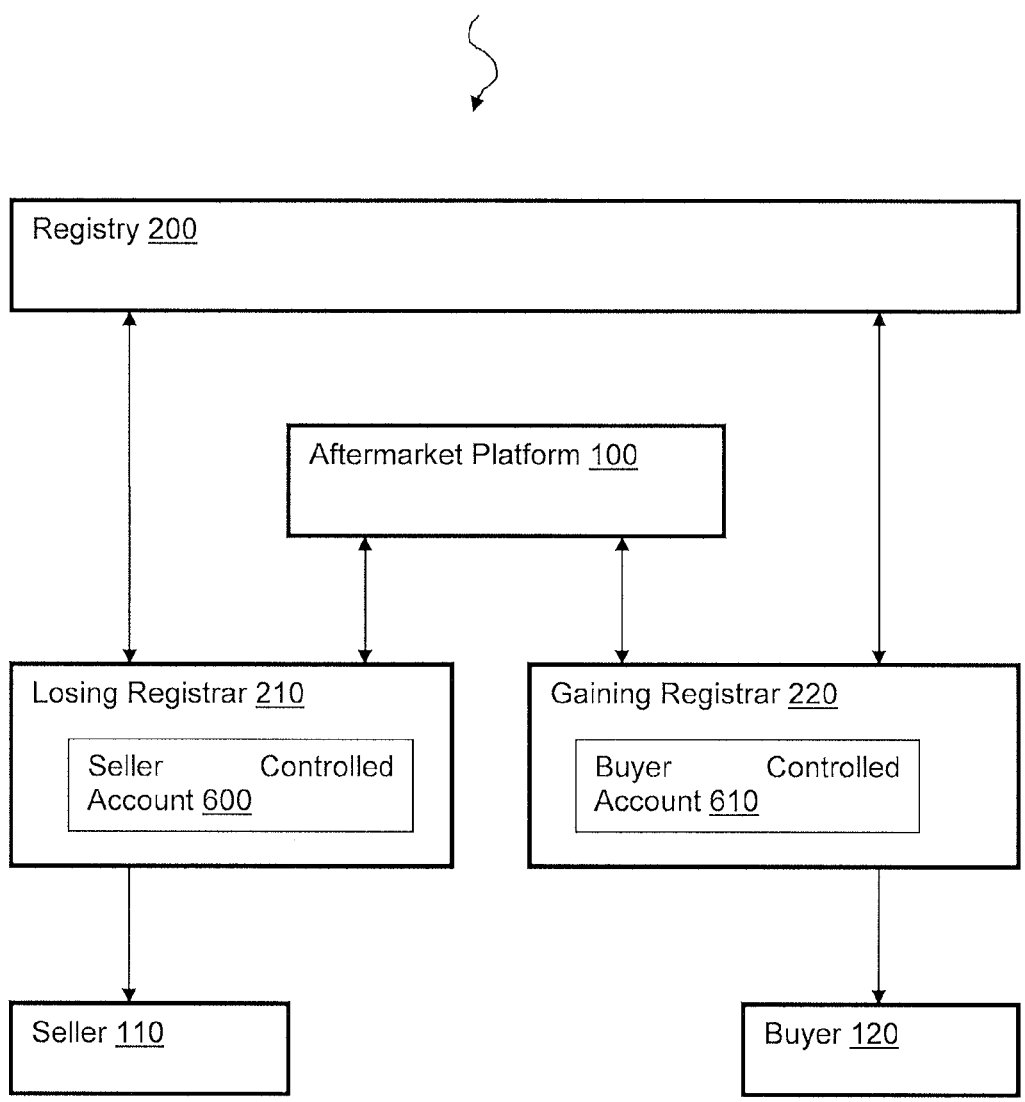
FIG. 6 is a block diagram of a Domain Name Aftermarket that illustrates a Seller in communication with a Losing Registrar (that includes a Seller controlled account), a Buyer in communication with a Gaining Registrar (that includes a Buyer controlled account), the Losing Registrar and Gaining Registrar in communication with an Aftermarket Platform and a Registry.
Figure 7:
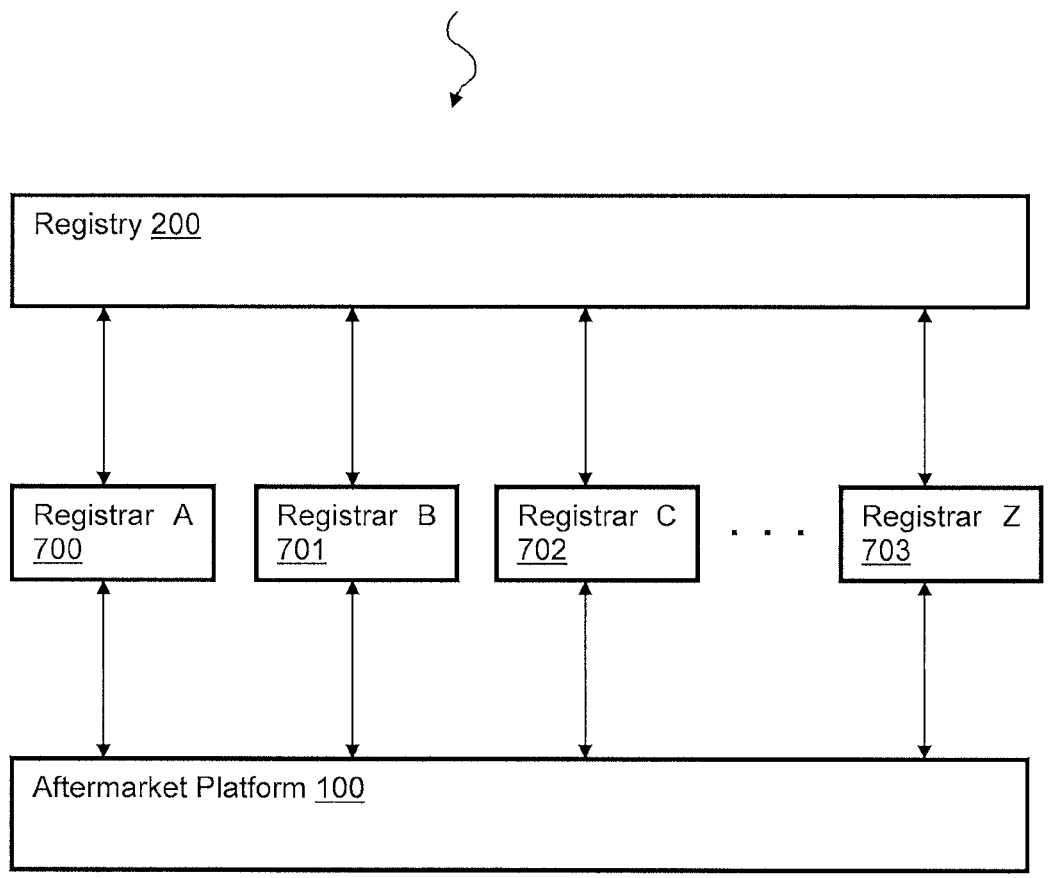
FIG. 7 is a block diagram of a Domain Name Aftermarket that illustrates a plurality of Registrars A-Z (where each Registrar may be the Losing Registrar, Gaining Registrar, neither or both) in communication with an Aftermarket Platform and a Registry.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIGS. 1-9, 24, 25, 31A, 31B, 31C, 31D-36 illustrate a Domain Name Aftermarket 130 that may include an Aftermarket Platform 100, a Seller 110, a Buyer 120, a Losing Registrar 210 (that may have a Seller controlled account 600), a Gaining Registrar 220 (that may have a Buyer controlled account 610) and a Registry 200. The arrows between these parties represent one or more computer networks, such as the Internet. The communications may use any currently known or developed in the future methods or protocols. As a non-limiting examples, the parties in the Domain Name Aftermarket 130 may use one or more Application Program Interfaces (APIs) or Extensible Provisioning Protocol (EPP) to communicate and coordinate the activities of the illustrated parties.

A computer network is a collection of links and nodes (e.g., multiple computers and/or other devices connected together) arranged so that information may be passed from one part of the computer network to another over multiple links and through various nodes. Non-limiting examples of computer networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users on clients and websites hosted on servers. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related webpages. Websites, unless very large and complex or have unusual traffic demands, typically reside on a single server and are prepared and maintained by a single individual or entity (although websites residing on multiple servers are also becoming increasingly common). Menus, links, tabs, etc. may be used to move between different web pages within the website or to move to a different website.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER, GOOGLE CHROME or MOZILLA FIREFOX. After the browser has located the desired webpage, the browser requests and receives information from the webpage, typically in the form of an HTML document, and then displays the webpage content for the user on the user's client. The user then may view other webpages at the same website or move to an entirely different website using the browser.

The Internet user may use a client, such as, as non-limiting examples, a cell phone, PDA, tablet, laptop computer, or desktop computer to access a website via a computer network, such as the Internet.

The website may have a plurality of webpages and be hosted or operated from one or more servers. The servers may be, as a non-limiting example, one or more Dell PowerEdge(s) rack server(s), HP Blade Servers, IBM Rack or Tower servers, although other types of servers, combinations of one or more servers, server software and applications may also be used.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "Registry 200") for maintaining an authoritative source for the registered domain names within a Top-Level Domain (TLD) and their corresponding IP addresses. For certain TLDs (e.g., .biz, .info, .name, and .org) the Registry 200 is also the authoritative source for contact information related to the domain name and is referred to as a "thick" Registry 200. For other TLDs (e.g., .com and .net) only the domain name, registrar identification, and name server information is stored within the Registry 200, and a Registrar 700 is the authoritative source for the contact information related to the domain name. Such Registries 200 are referred to as "thin" Registries 200. Most gTLDs are organized through a central domain name Shared Registration System (SRS) based on their TLD. TLDs may also be referred to as domain name extensions.

The process for registering a domain name with .com, .net, .org, and some other TLDs allows an Internet user to use an ICANN-accredited Registrar 700 to register their domain name. For example, if an Internet user, John Doe, wishes to register the domain name "mycompany.com," John Doe may initially determine whether the desired domain name is available by contacting a domain name Registrar 700. The Internet user may make this contact using the Registrar's webpage and typing the desired domain name into a field on the Registrar's webpage created for this purpose. Upon receiving the request from the Internet user, the Registrar 700 may ascertain whether "mycompany.com" has already been registered by checking the SRS database associated with the TLD of the domain name or by checking with the Registry 200. The results of the search then may be displayed on the webpage to thereby notify the Internet user of the availability of the domain name. If the domain name is available, the Internet user may proceed with the registration process. If the domain name is not available for registration, the Internet user may keep selecting alternative domain names until an available domain name is found.

Domain Name Aftermarket

A Buyer 120 is a person or entity wishing to purchase and register a domain name, even if that domain name is already registered. A current problem many Internet users (Buyers 120) face is trying to find a domain name that is available for registration or purchase. The Buyer 120 is in control of a Buyer controlled account 610 at a Gaining Registrar 220. The Gaining Registrar 220 may have a process for the Buyer 120 in order for the Buyer 120 to be given and gain control of the Buyer controlled account 610. The Buyer 120 may be able to access a website controlled by the Gaining Registrar 220 and, for example, enter a login name and password, to access the Buyer controlled account 610.

A Seller 110 is a person or entity that desires to sell a domain name that is already registered to the Seller 110, i.e., the Seller 110 starts as the registrant of the domain name. Another problem many Internet users (Sellers 110) face is trying to sell a previously registered domain name. The Seller 110 is in control of a Seller controlled account 600 at a Losing Registrar 210. The Losing Registrar 210 may have a process for the Seller 110 in order for the Seller 110 to be given and gain control of the Seller controlled account 600. The Seller 110 may be able to access a website controlled by the Losing Registrar 210 and, for example, enter a login name and password, to access the Seller controlled account 600.

A Losing Registrar 210 is a domain name Registrar 700 that has a domain name under management that is initially registered to a Seller 110. The domain name is managed by the Seller 110, prior to being purchased, from a Seller controlled account 600 via a website controlled and maintained by the Losing Registrar 210. The Seller 110 may list or sell the domain name from the Losing Registrar's website. The Losing Registrar 210 will "lose" the domain name after the domain name is transferred to a Buyer controlled account 610 at a Gaining Registrar 220. The Losing Registrar 210 comprises a domain name registrar, at least one or more hardware servers, electrical communication equipment to interface with one or more computer networks, routing servers to communicate with a plurality of potential sellers and a plurality of potential buyers/bidders and preferably software to automate the various processes attributed to the Losing Registrar 210 in this specification. The Losing Registrar 210 may have a plurality of customers, with the Seller 110 being one of the Losing Registrar's 210 customers, with each customer having a customer controlled account.

A Gaining Registrar 220 is a domain name Registrar that will "gain" a domain name under management that has been purchased by a Buyer 120 (having a Buyer controlled account 610 with the Gaining Registrar 220) from a Seller 110 (having a Seller controlled account 600 with the Losing Registrar 210). The Gaining Registrar 220 controls and maintains a website that allows the Buyer 120 to manage the domain name after the domain name has been purchased. The Buyer 120 may purchase and/or register domain names from the Gaining Registrar's website. The Gaining Registrar 220 comprises a domain name registrar, at least one or more hardware servers, electrical communication equipment to interface with one or more computer networks, routing servers to communicate with a plurality of potential sellers and a plurality of potential buyers/bidders and preferably software to automate the various processes attributed to the Gaining Registrar 220 in this specification. The Gaining Registrar 220 may have a plurality of customers, with the Buyer 120 being one of the Gaining Registrar's 220 customers, with each customer having a customer controlled account.

The Losing Registrar 210 and the Gaining Registrar 220 may be the same Registrar 700 or the Losing Registrar 210 and the Gaining Registrar 220 may be different Registrars 700-703. If the Losing Registrar 210 and the Gaining Registrar 220 are different, in preferred embodiments, the Losing Registrar 210 and the Gaining Registrar 220 do not communicate with each other directly when participating in the Domain Name Aftermarket 130, but always through the Aftermarket Platform 100. Thus, the Aftermarket Platform 100 preferably coordinates the transfer of a domain name from a Seller controlled account 600 at the Losing Registrar 210 to a Buyer controlled account 610 at the Gaining Registrar 220 and the Aftermarket Platform 100 coordinates the collection of funds from the Buyer 120 and the disbursement of funds to the Seller 110.

A Domain Name Aftermarket 130 is a secondary market for domain names in which a Buyer 120 interested in purchasing a domain name that is already registered bids, negotiates or accepts a price selected by the Seller 110 to transfer the domain name from a Seller controlled account 600 at a Losing Registrar 210 to a Buyer controlled account 610 at a Gaining Registrar 220.

An Aftermarket Platform 100 may facilitate the processes of a Domain Name Aftermarket 130 by providing communication methods for Sellers 110 and Buyers 120 to interact, possibly anonymously and/or possibly via a Losing Registrar 210 and/or a Gaining Registrar 220 to negotiate and close a transfer of ownership and possibly Registrar 700-703 of the domain name from a Seller controlled account 600 to a Buyer controlled account 610. The Aftermarket Platform 100 may manage an inventory of listed domain names and be able to create, update and delete information regarding the listed domain names. The Aftermarket Platform 100 may also facilitate in the collection of funds from the Buyer 120 (preferably with cooperation from the Gaining Registrar 220) and the disbursement of funds to the Seller 110 (preferably with cooperation from the Losing Registrar 210).

The Aftermarket Platform 100 comprises at least one or more hardware servers, electrical communication equipment to interface with one or more computer networks and preferably software to automate the various processes attributed to the Aftermarket Platform 100 in this specification. The Aftermarket Platform 100 may have a plurality of customers, with the Seller 110 and/or Buyer 120 being one of the Aftermarket Platform's 100 customers.

The Gaining Registrar 220, Losing Registrar 210, Aftermarket Platform 100 and Registry 200 are hereby defined for the purposes of this specification and the claims to be special purpose machines and are not, and cannot be, by this explicit definition, purely software or comprise only abstract ideas.

Figure 8:
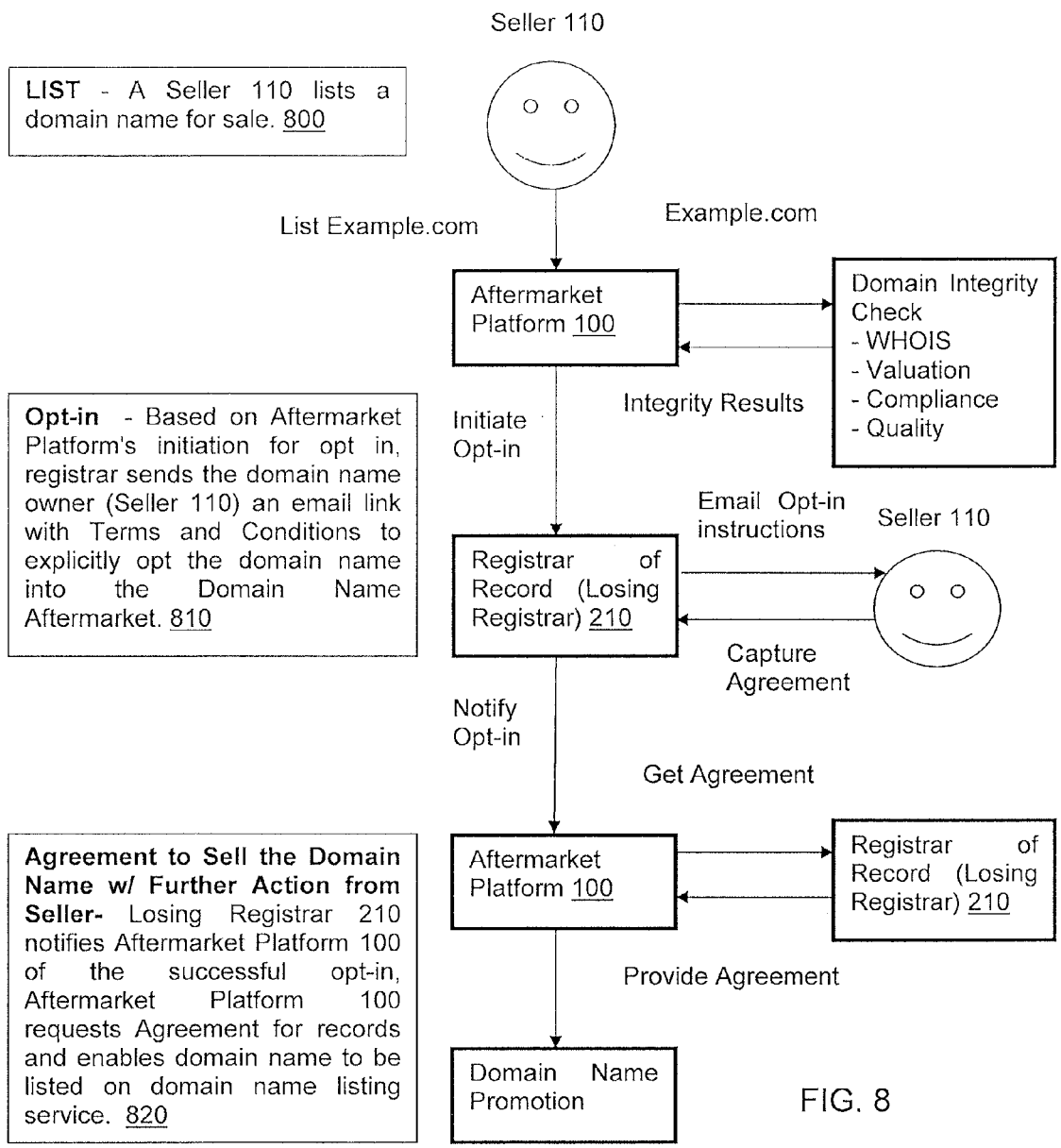
FIG. 8 is a block diagram illustrating a process for quickly transferring a domain name from a Seller to a Buyer from the Seller's point of view.

With reference to FIG. 8, an embodiment of practicing the invention will now be described. A Seller 110 (perhaps using a client computer or mobile device with a browser), in communication with a website controlled and operated by either a Losing Registrar 210 (that the Seller 110 has a Seller controlled account 600 with) or an Aftermarket Platform 100 may list a domain name registered to the Seller 110 as available for purchase. The Seller 110 may also provide a purchase price for the domain name. (Step 800) In preferred embodiments, the identity of the Seller 110 is confirmed by any known or later developed methods of confirming the identity of a person on the Internet. Non-limiting examples of confirming the identity of the Seller 110 include using user names and passwords assigned to the Seller 110, biometric authentication, photographic images, government issued identification documents, access to certain records on the Internet, etc.

Domain Name Integrity Check

One way to gain the trust from the Buyers 120 is to confirm the integrity of the domain names being offered for sale by the Sellers 110. The integrity of the domain names may be checked by any method desired. As non-limiting examples, the integrity of the domain name may be checked by ensuring 1) the domain name is registered to the Seller 110 (possibly by comparing the Seller 110 contact information or other Seller 110 data with domain name registrant contact data and/or other data stored in the WHOIS database, wherein matching information/data is evidence for the domain name being registered to the Seller 110), 2) the domain name listing has all the required metadata, 3) the domain name does not contain vice terms (vice terms are those that indicate the domain name might be used for illegal or immoral activities or activities that go against the Terms and Conditions of the Losing Party, the Aftermarket Platform 100 and/or the Gaining Registrar 220), 4) the domain name does not contain one or more trademarks (the trademarks checked for may be limited to trademarks that are well known and/or commonly used for fraudulent activities), 5) the domain name is reasonably priced given its quality (in some embodiments, domain names above a predetermined purchase price may be excluded from the system), 6) the domain name is housed at a Registrar within the Domain Name Aftermarket's network, 7) the domain name has been successfully opted in for sale by the Seller 110, 8) the Seller 110 has control over the domain name (possibly by checking the Seller's 100 control of the domain name's DNS records), 9) the domain name is transferable (as a non-limiting example the domain name is not locked) from a Seller controlled account 600 at the Losing Registrar 210 and/or 10) the domain name has not expired. Smart algorithms or algorithms that learn may be used to implement one or more of these methods of checking the integrity of domain names listed in the Domain Name Aftermarket 130.

Agreement Executed by Seller

The agreement may be executed, i.e., electronically signed, agreed to and/or acknowledged, by a Seller 110 that is the registrant of a domain name by any desired method. As non-limiting examples, the agreement may be executed via a website controlled by the Losing Registrar 210 created at least for this purpose or by the Losing Registrar 210 sending an email containing opt-in instructions to the Seller 110 that allow the Seller 110 to execute the agreement, possibly by communicating the agreement back to the Losing Registrar 210 or by selecting a link within the email. The communications between the Seller 110 and the Losing Registrar 210 may be, as non-limiting examples, via paper contracts, websites, electronic communications, emails and/or links in the electronic communications and/or emails.

Regardless of how the Seller 110 executes the agreement, the Losing Registrar 210 preferably captures and saves the agreement and sends an electronic version of the agreement, data representing the agreement and/or an opt-in notification to an Aftermarket Platform 100. (Step 810) The Aftermarket Platform 100 may also save an electronic copy of the agreement or data representing the agreement for the Aftermarket Platform's 100 records in a hardware database.

The Losing Registrar 210 also preferably has the Seller 110 agree to the Losing Registrar's 210 Terms and Conditions and/or the Aftermarket Platform's 100 Terms and Conditions for participating in the Domain Name Aftermarket 130. The Aftermarket Platform 100 may work with or require all of the Registrars 700-703 (Losing Registrars 210 and Gaining Registrars 220) in the Domain Name Aftermarket 130 to have uniform and consistent Terms and Conditions for Sellers 110 and Buyers 120 to agree to in order to participate in the Domain Name Aftermarket 130.

The agreement may be a Form of Authorization (FOA) or any other agreement that permits the domain name to be transferred from a Seller controlled account 600 to a Buyer controlled account 610 without further action, e.g., acknowledgement or approval, from the Seller 110. An FOA is a form that a Sellers 110 may fill out to permit the transfer of the Seller's domain name from a Losing Registrar 210 to a Gaining Registrar 220. The FOA is an authorization for registrar transfer provided by ICANN. The FOA may be filled out by the Seller 110 (registered domain name holder) to confirm the intent to transfer the domain name. If the Seller 110 doesn't respond to the FOA then the Seller 110 (registrant) may not be able to transfer the domain name from one registrar (Losing Registrar 210) to another (Gaining Registrar 220). A Losing Registrar 210 may only transfer the domain name if the Losing Registrar 210 has received the FOA, either from the Seller 110 (registrant) or the administrative contact for the domain name. Receiving an agreement from the Seller 110 increases the speed and removes a potential hurdle or obstacle from the time the Buyer 120 purchases the domain name to the time the domain name is in the Buyer controlled account 610. Domain name transfers that use the agreement from the Seller 110 are preferably automated by a Losing Registrar 210 and a Gaining Registrar 220 that communicate over a computer network (such as the Internet) and thus may occur in seconds or less. In contrast, transfers without the agreement require further action or approval from the Seller 110 resulting in transfers that may take several days (or may never happen if the Seller 110 changes the Seller's mind or the Seller 110 cannot be reached). In preferred embodiments, the agreement (which could be an FOA) is executed, i.e., agreed to and/or legally acknowledged by the Seller 110 before the domain name is made available for purchase to a plurality of potential Buyers 120 by one or more potential Gaining Registrars 700-703.

In some embodiments, the Seller 110 may limit how long the agreement is effective for listing the Seller's 110 domain name in the Domain Name Aftermarket 130. As an example, the Seller 110 may select that the agreement to list the domain name in the Domain Name Aftermarket 130 is effective for one year. In this case, at or near the end of one year, the domain may become nontransferable and removed from all listings of available domain names in the Domain Name Aftermarket 130 or the Seller 110 may select to renew the domain name in the Domain Name Aftermarket 130 for the same period (one year in this example) or for a different period of time. The Aftermarket Platform 100 may select one or more time periods that are available to the Seller 110 to select. The domain name may be renewed any number of times as desired by the Seller 110 to keep the domain name listed in the Domain Name Aftermarket 130. In preferred embodiments, the Seller 110 may cancel or delist the domain name from the Domain Name Aftermarket 130 at any time up to the point where a Buyer 120 attempts to buy the domain name. In this embodiment, once the Buyer 120 starts the process of purchasing the domain name, the Seller 110 can no longer cancel or delist the domain name from the Domain Name Aftermarket 130.

In some embodiments, the Seller 110 may enter a purchase price for the domain name, which may be listed with the domain name on one or more websites operated by one or more potential Gaining Registrars 700-703. A Buyer 120 that pays the purchase price may cause the domain name to be transferred from a Seller controlled account 600 to a Buyer controlled account 610 without further action by the Seller 110. The agreement is preferably executed by the Seller 110 prior to the domain name being listed as available for purchase by the Domain Name Aftermarket 130.

The Losing Registrar 210, Gaining Registrar 220, and/or the Aftermarket Platform 100 may also calculate a suggested value for the domain name. The calculated suggested value may be displayed to the Seller 110 and/or potential Buyers 120. If the purchase price entered by the Seller 110 for the domain name differs from the calculated suggested value more than by a predetermined amount, the domain name may be denied for listing on the Domain Name Aftermarket 130. If the absolute difference or the absolute percentage difference between the calculated suggested value of the domain name and the purchase price entered by the Seller 110 is greater than a predetermined amount, the domain name may be denied for listing on the Domain Name Aftermarket 130. In another embodiment, if the purchase price for the domain name is above a predetermined amount, the domain name may be denied for listing on the Domain Name Aftermarket 130. Alternatively, or in combination, if the calculated suggested value for the domain name is below a predetermined amount, the domain name may be denied for listing on the Domain Name Aftermarket 130.

Domain Name Listing Service

After an Aftermarket Platform 100 either receives, preferably via an API communication, the agreement, FOA and/or data corresponding to the agreement directly from a Seller 110 or from a Losing Registrar 210, the Aftermarket Platform 100 may communicate the domain name to a plurality of Registrars A-Z 700-703 (illustrated in FIG. 7) in the Domain Name Aftermarket 130. One or more of these Registrars 700-703 (and possibly the Aftermarket Platform 100 itself) may list the domain name on a Registrar's controlled website as available for purchase, possibly along with a purchase price selected by the Seller 110, to a plurality of potential domain name Buyers 120.

The domain name is preferably listed with other aftermarket domain names, i.e., the aftermarket domain names are already registered, or the aftermarket domain names may be listed with suggested domain names that are not currently registered, i.e., available domain names. The listed domain names on the website may (or may not) have different purchase prices (variable prices) associated with each domain name. Listing the domain name as available for purchase on a plurality of different Registrars' websites greatly increases the domain name's exposure and prospects for being purchased by a Buyer 120. (Step 820)

Monitor Transferability of the Domain Name

In a preferred embodiment, the Losing Registrar 210 checks the transferability of the domain name from the Seller controlled account 600 periodically or continuously throughout the process and terminates the listing, i.e., prevents a Buyer 120 from purchasing the domain name, if the domain name becomes nontransferable for any reason (such as an FOA is no longer in effect). The Losing Registrar 210 may communicate with an Aftermarket Platform 100 and the Aftermarket Platform 100 may let the other Registrars 700-703 within the Domain Name Aftermarket 130 know that the domain name should be delisted and no longer offered to potential Buyers 120 for purchase. Alternatively, or in combination, the Gaining Registrar 220 may also be responsible for verifying the domain name is transferable before letting a Buyer 120 purchase the domain name from a Seller 110.

Figure 9:
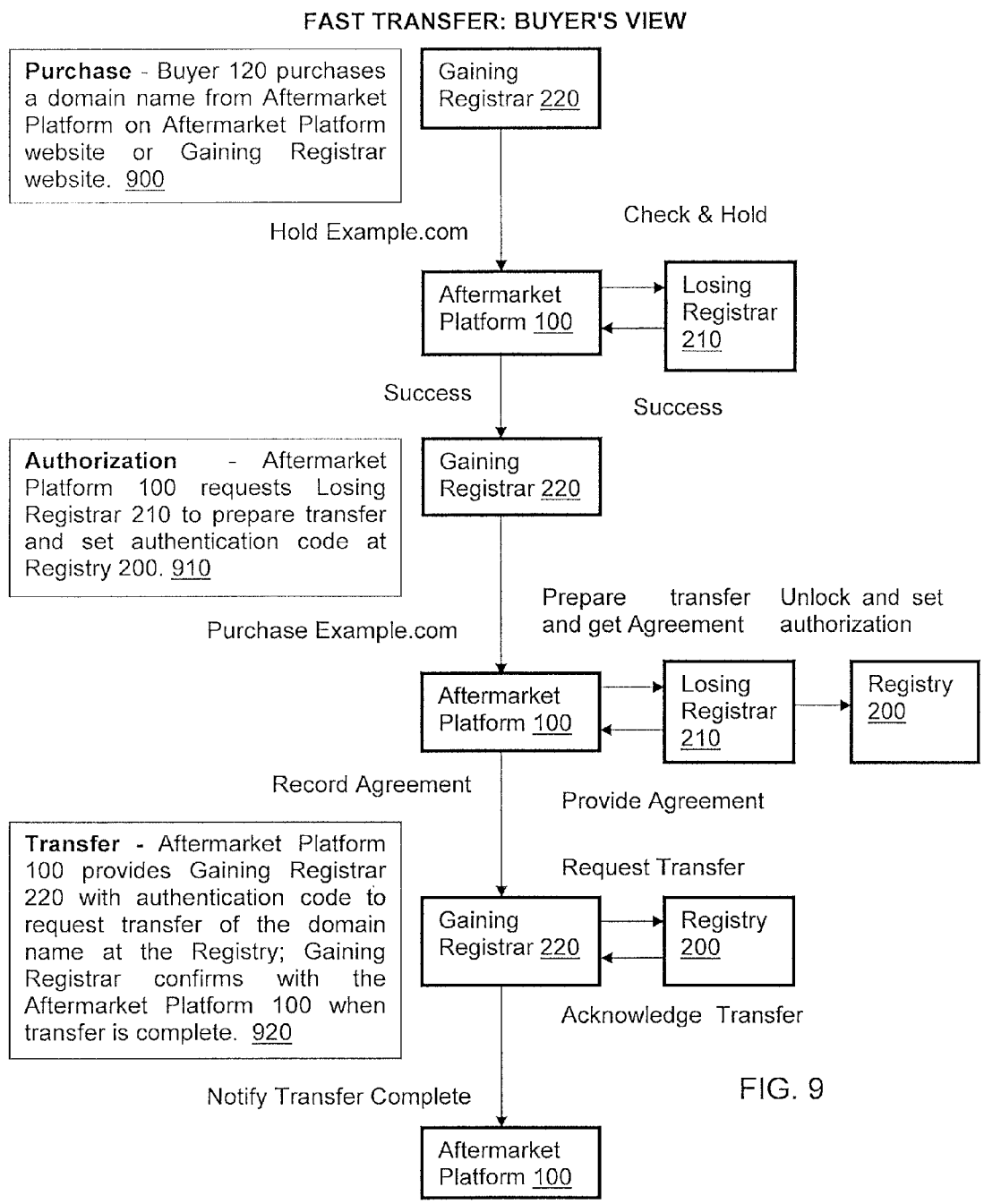
FIG. 9 is a block diagram illustrating a process for quickly transferring a domain name from a Seller to a Buyer from the Buyer's point of view.
Figure 10:
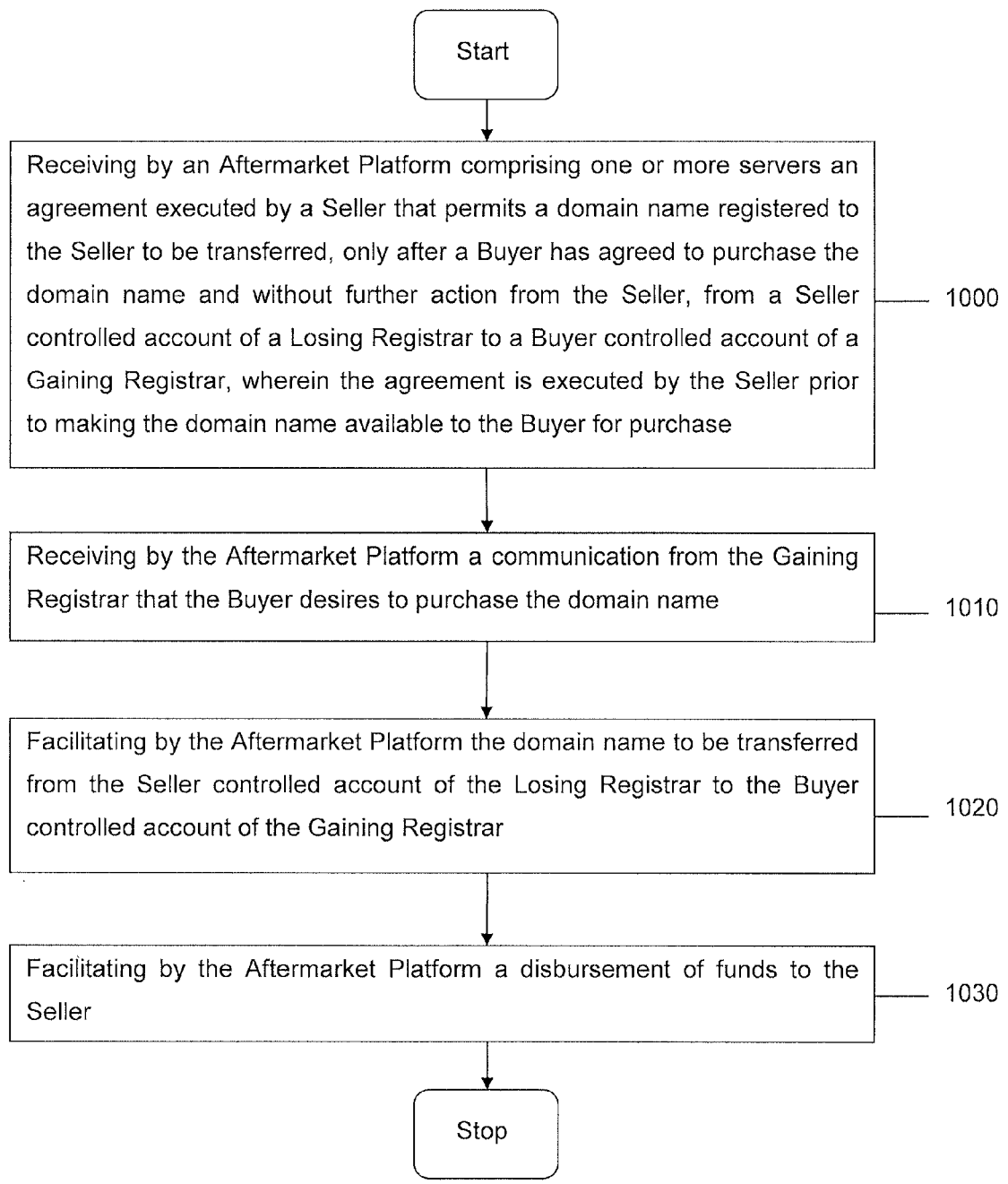
FIG. 10 is a flow diagram of a process from an Aftermarket Platform's point of view for quickly transferring a domain name from a Seller controlled account to a Buyer controlled account and transferring funds from a Buyer to a Seller after a Buyer purchases the domain name.
Figure 11:
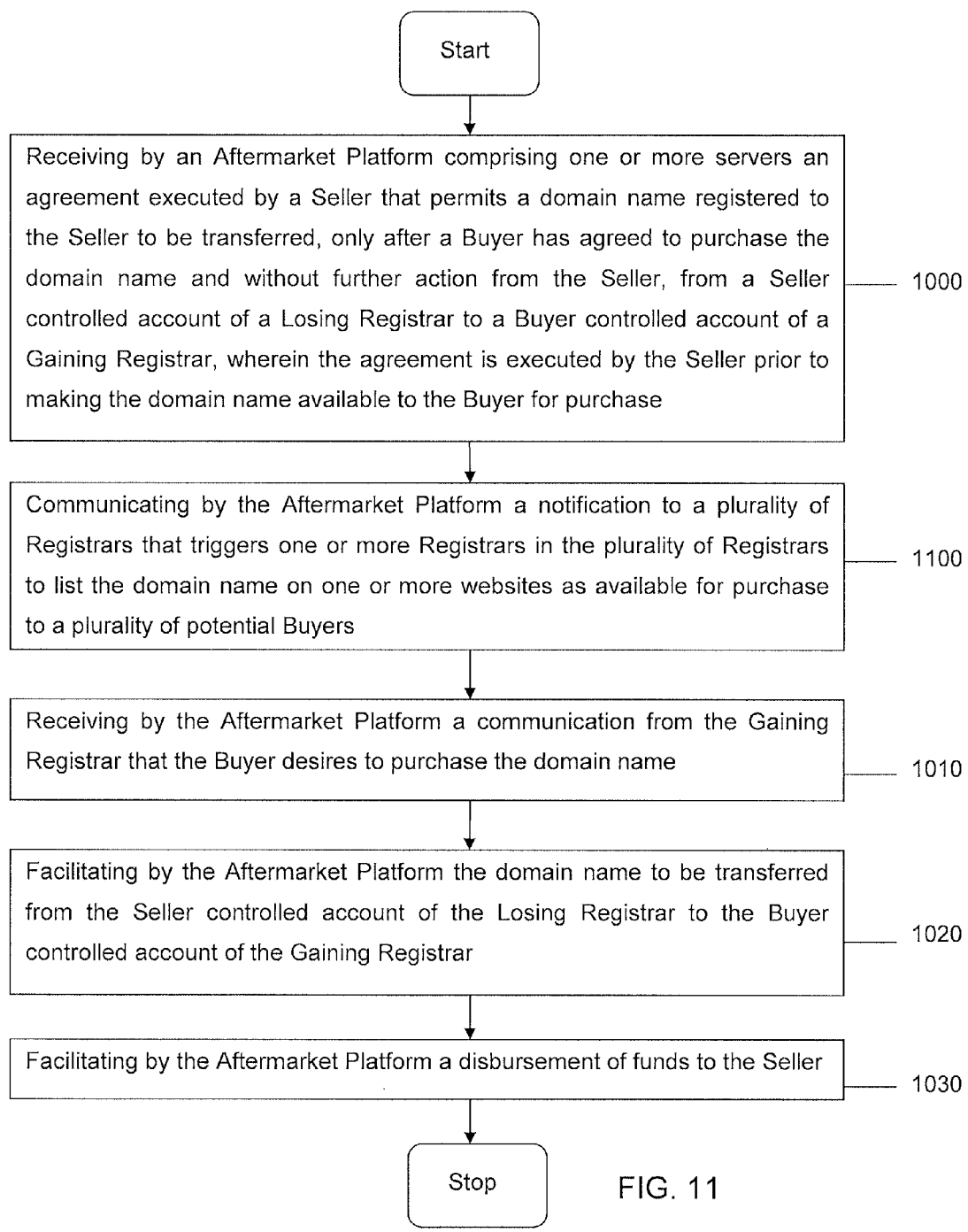
FIG. 11 is a flow diagram of a process from an Aftermarket Platform's point of view for listing a domain name for purchase with a plurality of Registrars and then quickly transferring the domain name from a Seller controlled account to a Buyer controlled account and transferring funds from a Buyer to a Seller after a Buyer purchases the domain name.
Figure 12:
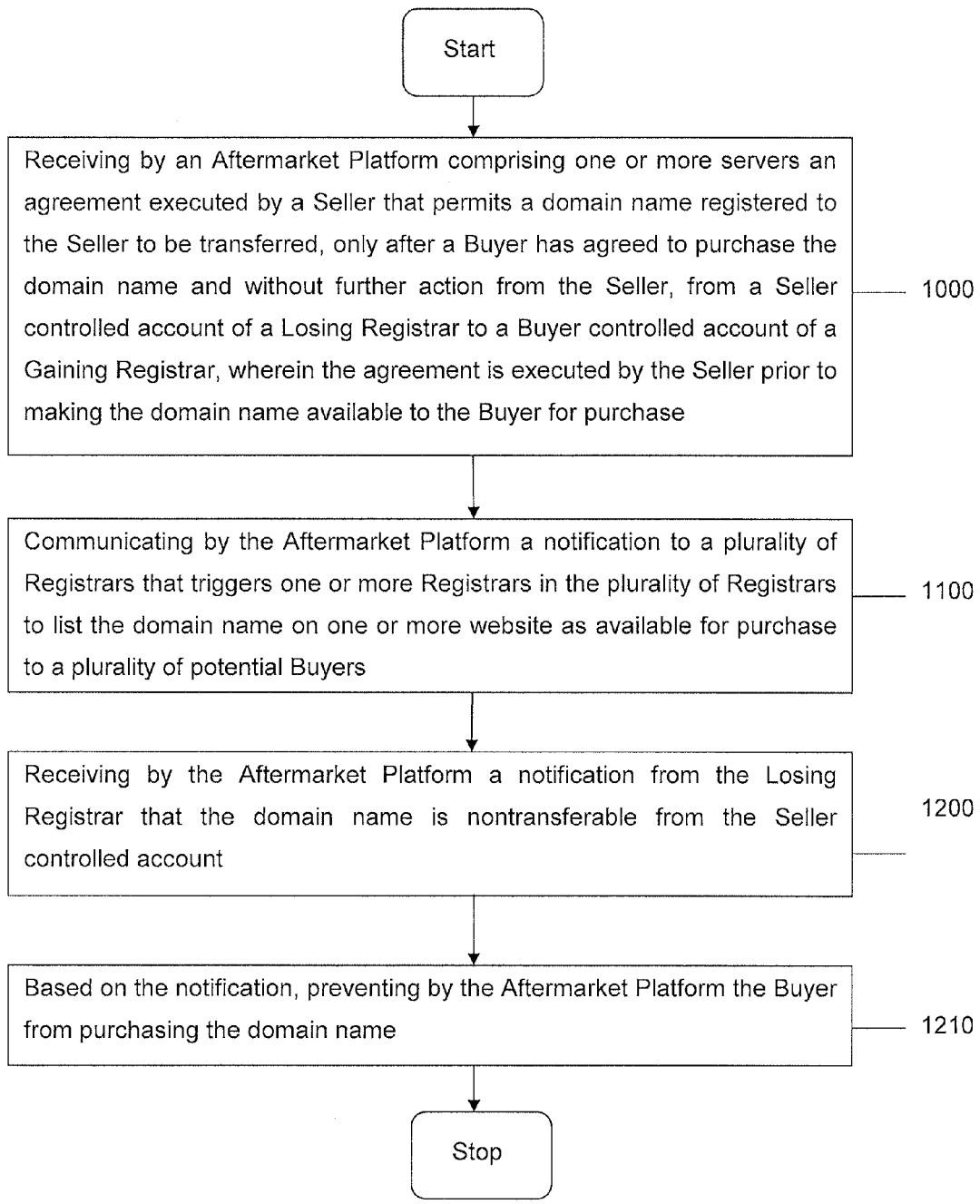
FIG. 12 is a flow diagram of a process from an Aftermarket Platform's point of view for listing a domain name with a plurality of Registrars, but then preventing a Buyer from purchasing the domain name if a Losing Registrar notifies the Aftermarket Platform that the domain name is no longer transferable from the Seller controlled account.
Figure 13:
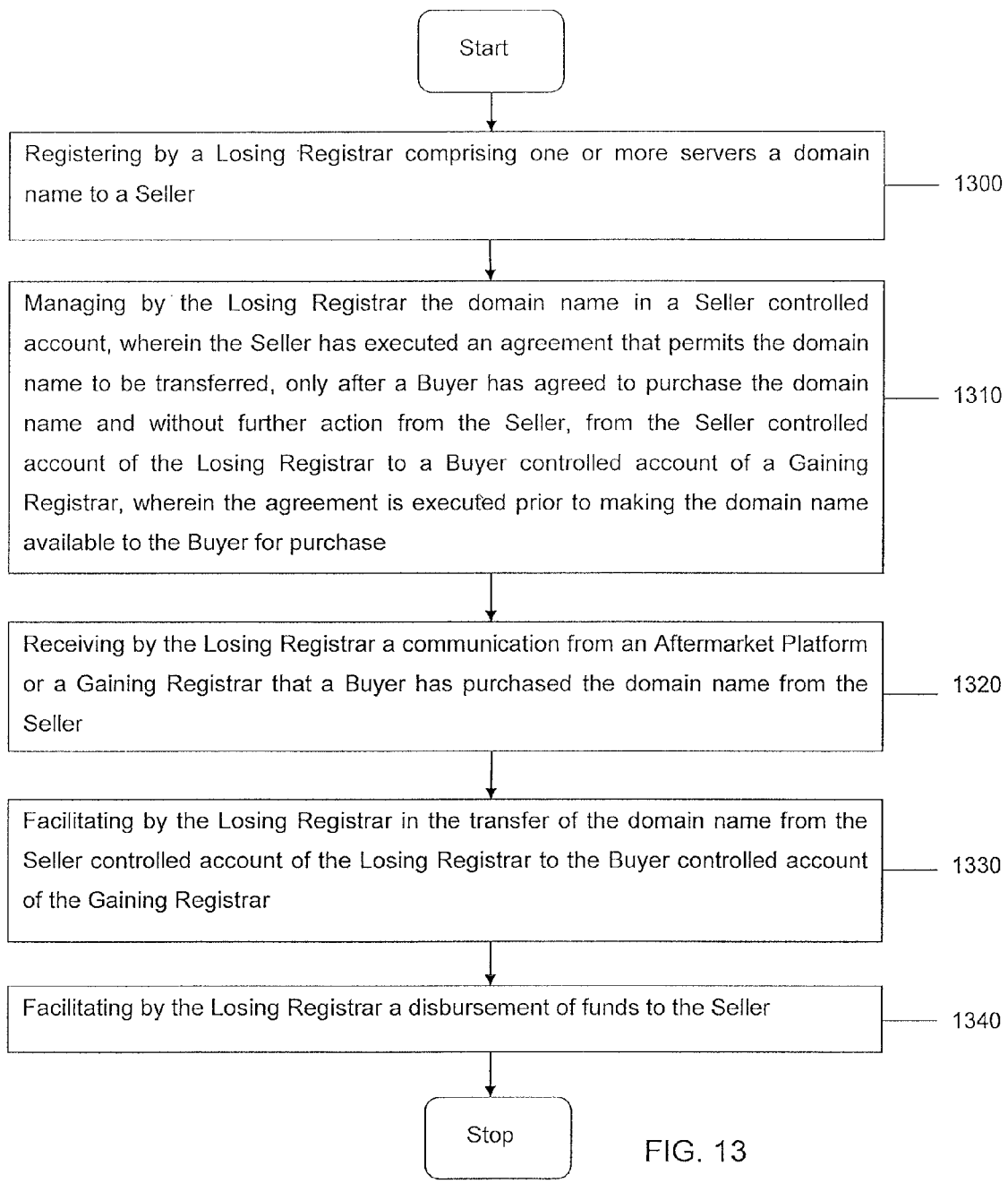
FIG. 13 is a flow diagram of a process from a Losing Registrar's point of view for quickly transferring a domain name from a Seller controlled account to a Buyer controlled account and transferring funds from a Buyer to a Seller after a Buyer purchases the domain name.
Figure 14:
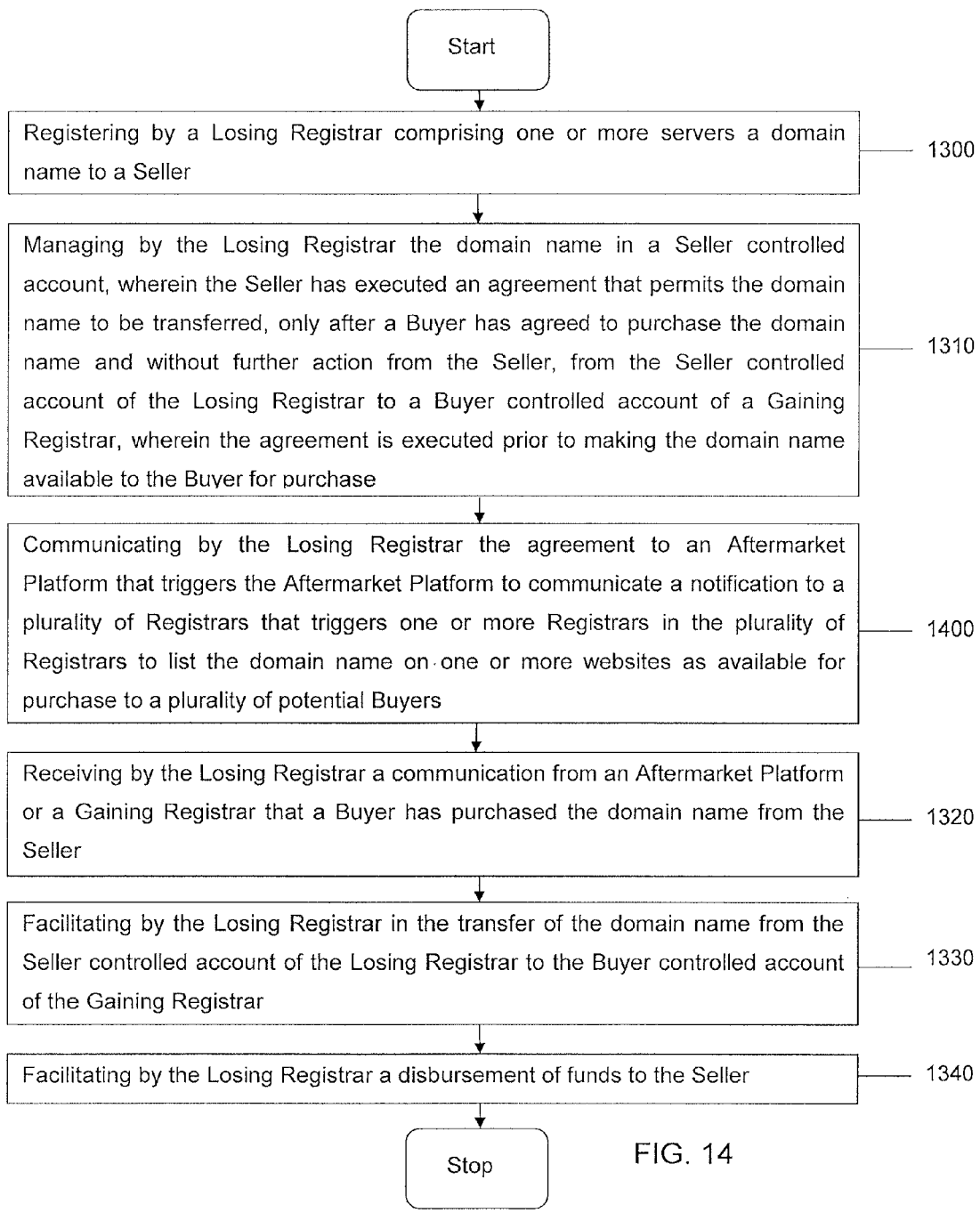
FIG. 14 is a flow diagram of a process from a Losing Registrar's point of view for listing a domain name for purchase with a plurality of Registrars and then quickly transferring the domain name from a Seller controlled account to a Buyer controlled account and transferring funds from a Buyer to a Seller after a Buyer purchases the domain name.
Figure 15:
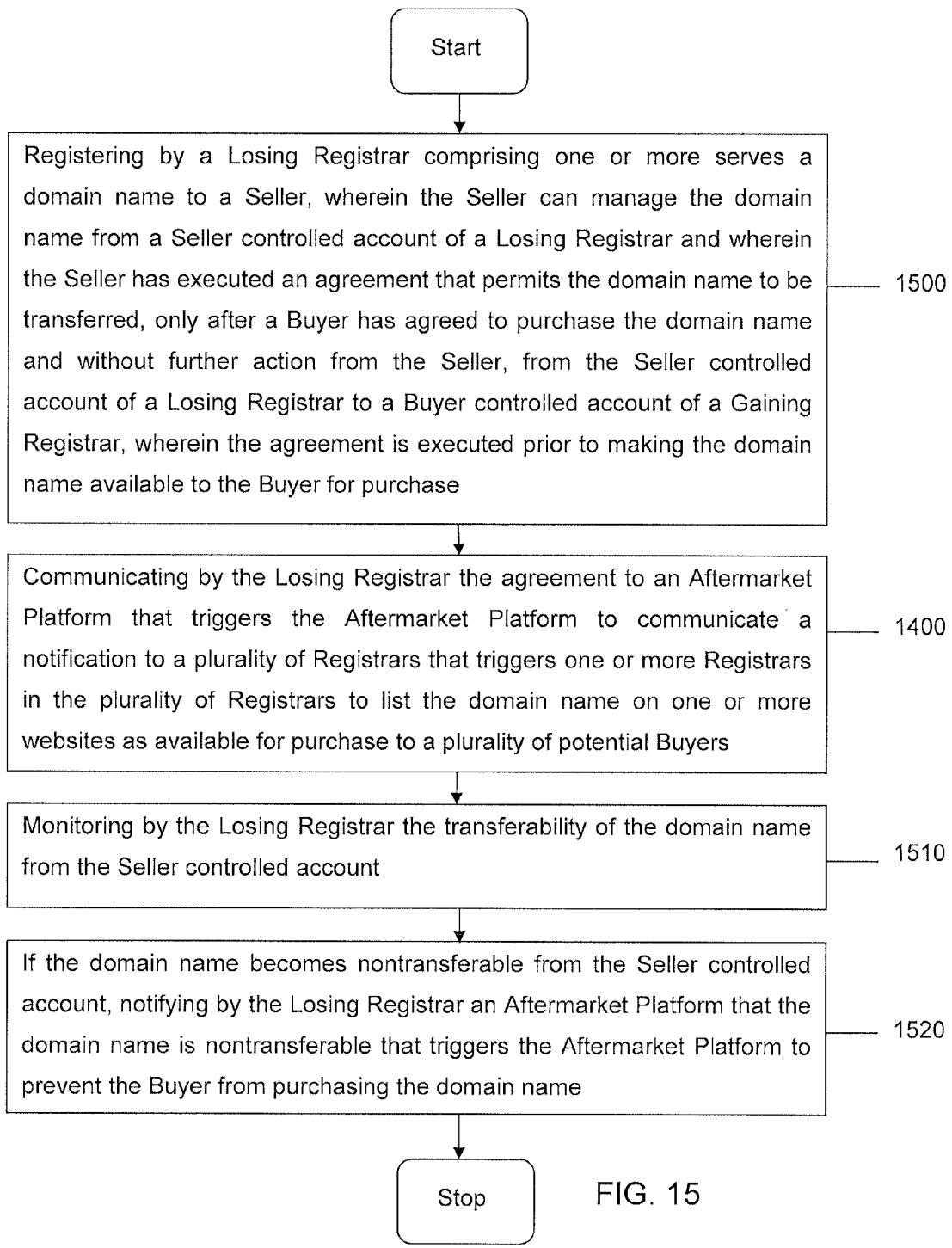
FIG. 15 is a flow diagram of a process from a Losing Registrar's point of view for listing a domain name with a plurality of Registrars, but then preventing a Buyer from purchasing the domain name if the Losing Registrar notifies the Aftermarket Platform that the domain name is no longer transferable from the Seller controlled account.
Figure 16:
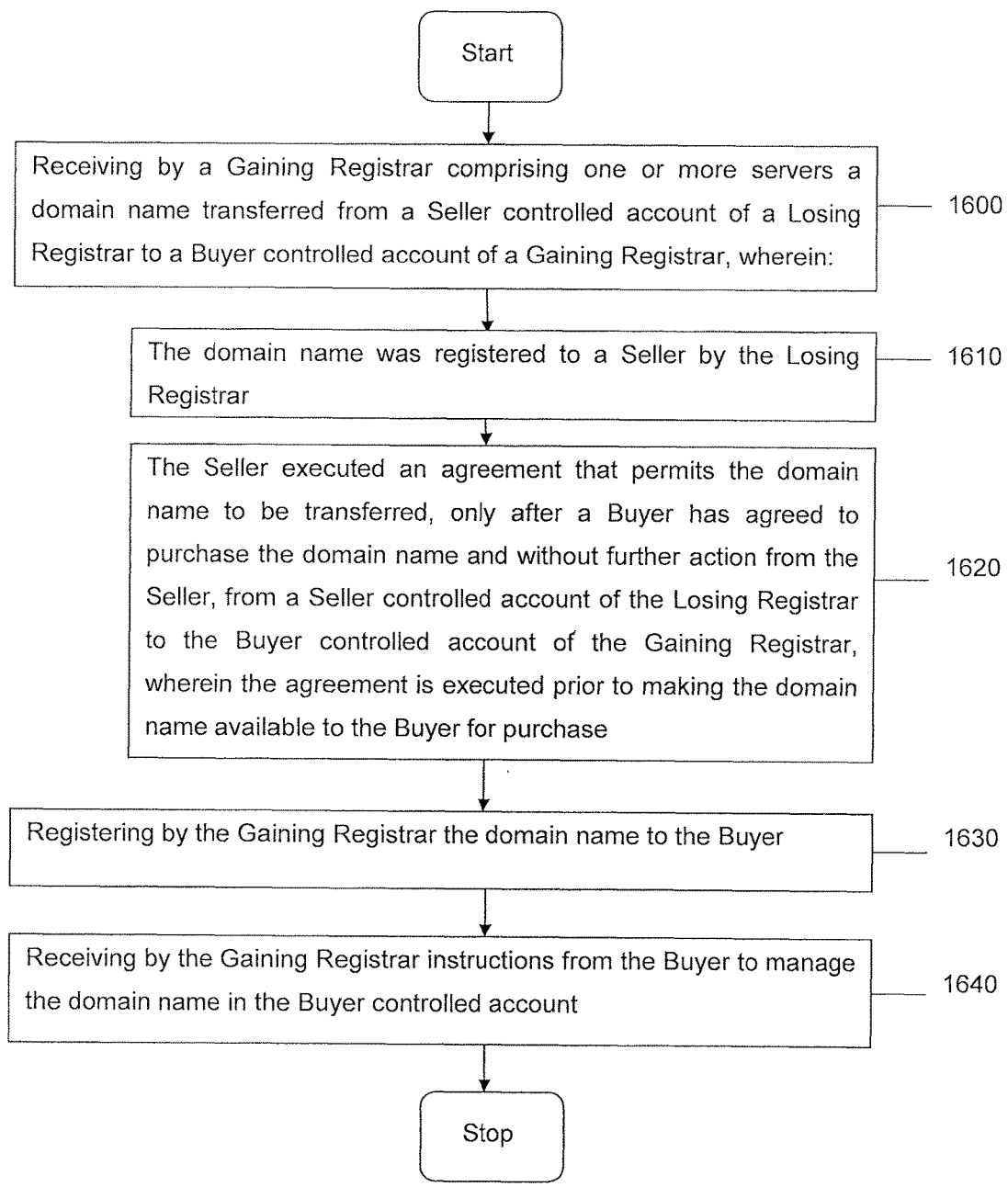
FIG. 16 is a flow diagram of a process from a Gaining Registrar's point of view for quickly transferring a domain name from a Seller controlled account to a Buyer controlled account and managing the domain name for the Buyer.
Figure 17:
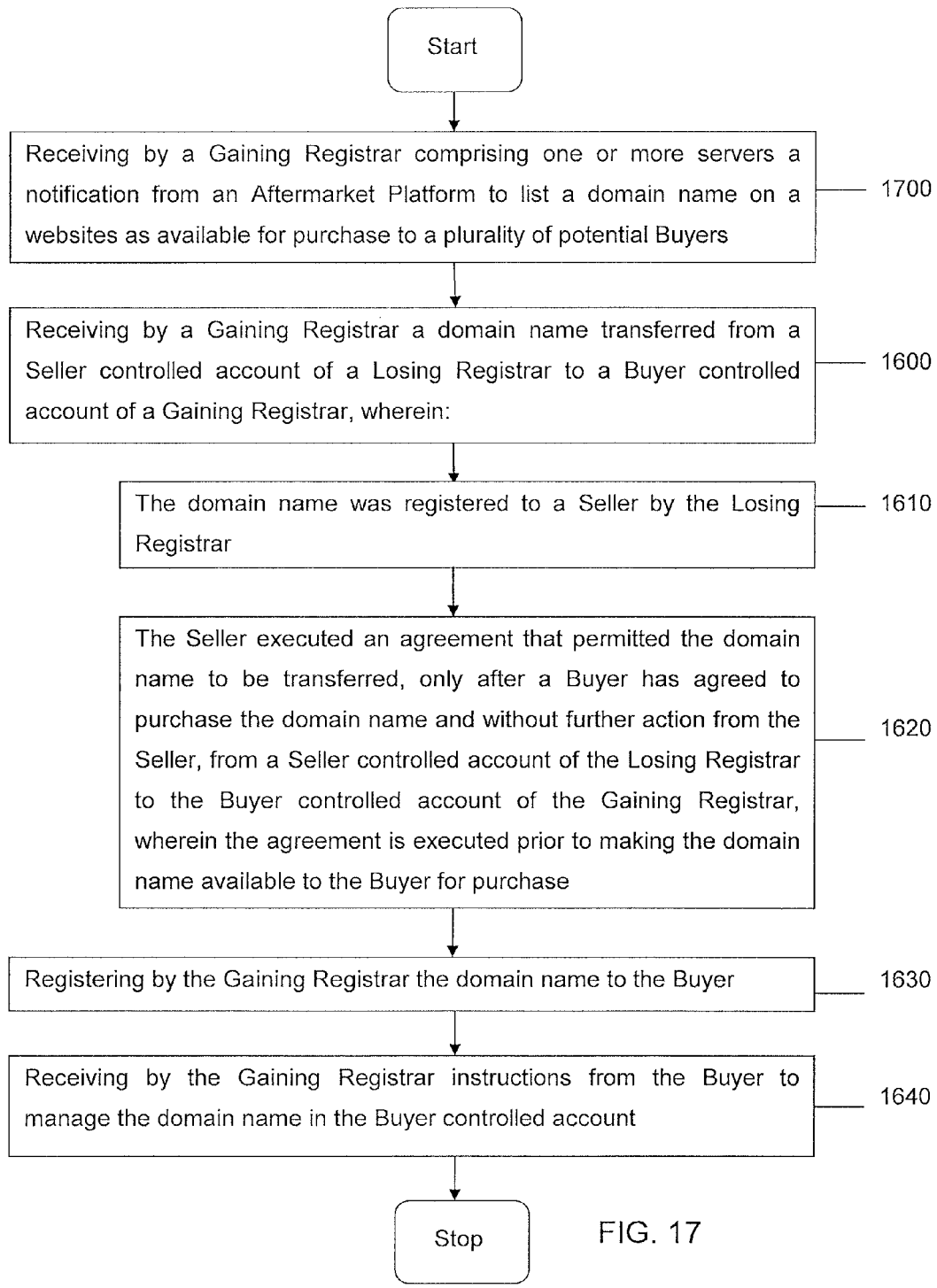
FIG. 17 is a flow diagram of a process from a Gaining Registrar's point of view for listing a domain name for purchase with a plurality of Registrars and then quickly transferring the domain name from a Seller controlled account to a Buyer controlled account and managing the domain name for the Buyer.
Figure 18:
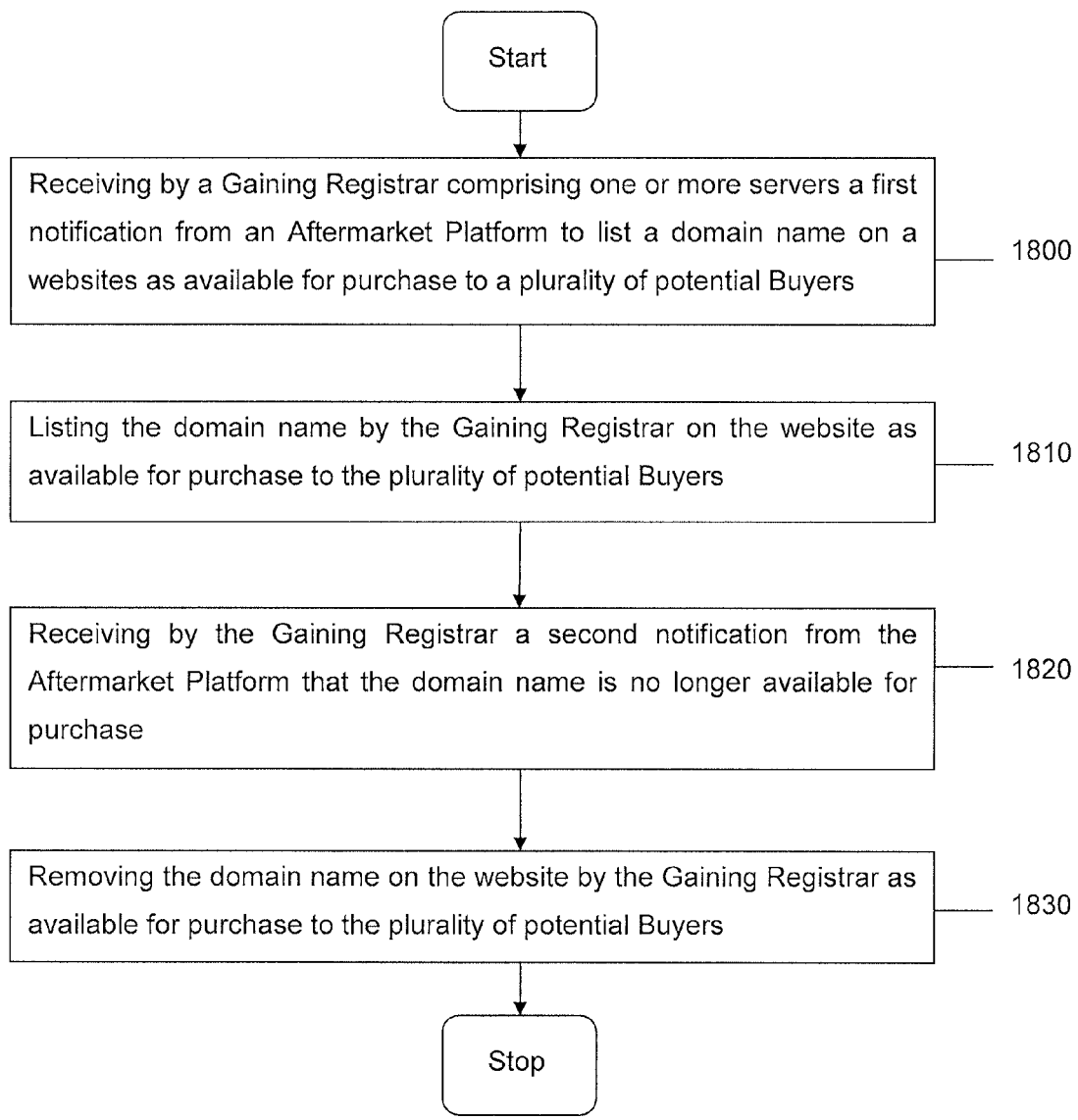
FIG. 18 is a flow diagram of a process from a Gaining Registrar's point of view for listing a domain name with a plurality of Registrars, but then preventing a Buyer from purchasing the domain name if the Gaining Registrar receives notice that the domain name is no longer available for purchase.
Figure 19:
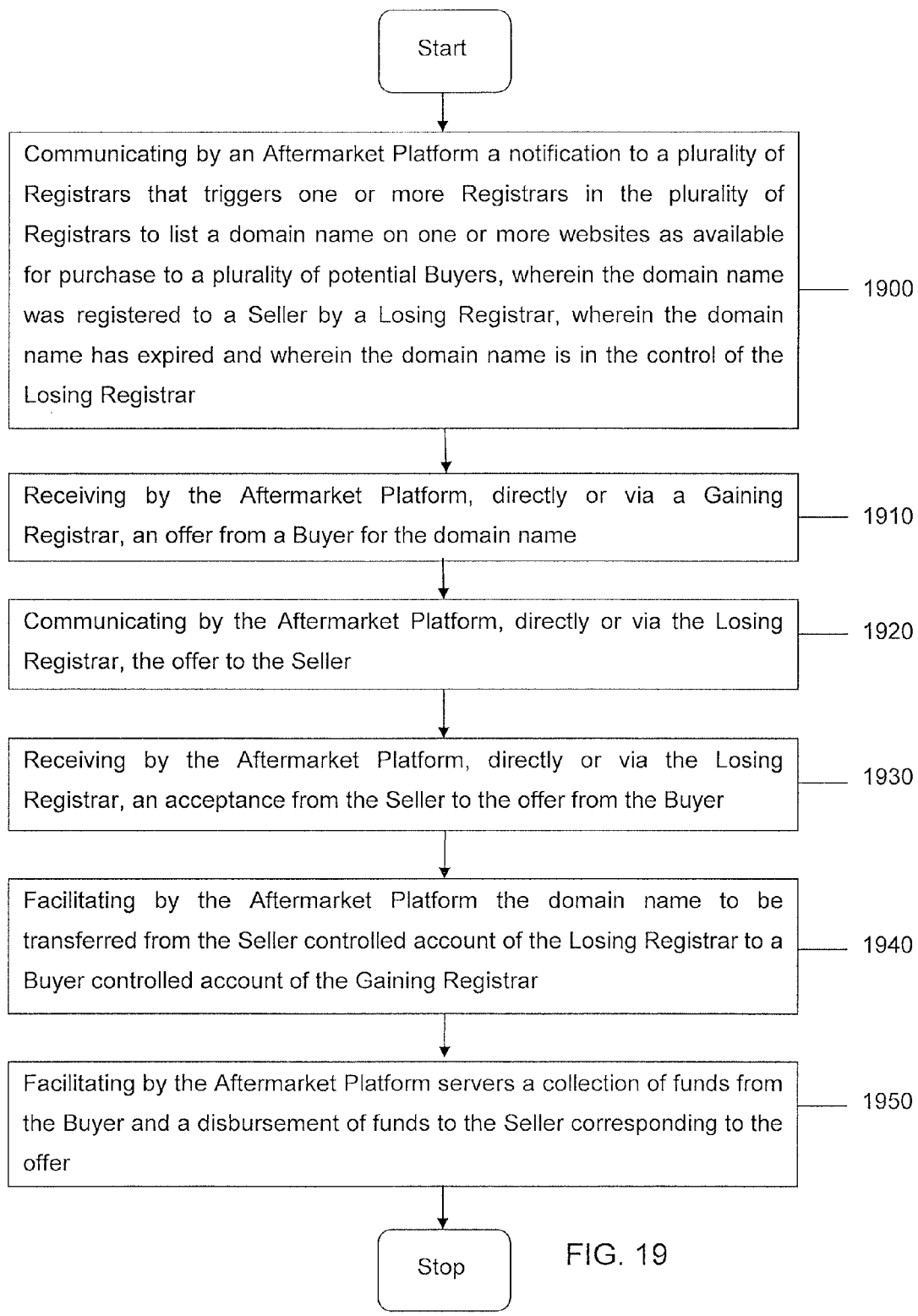
FIG. 19 is a flow diagram of a process from an Aftermarket Platform's point of view for receiving an offer from a Buyer to purchase a domain name.
Figure 20:
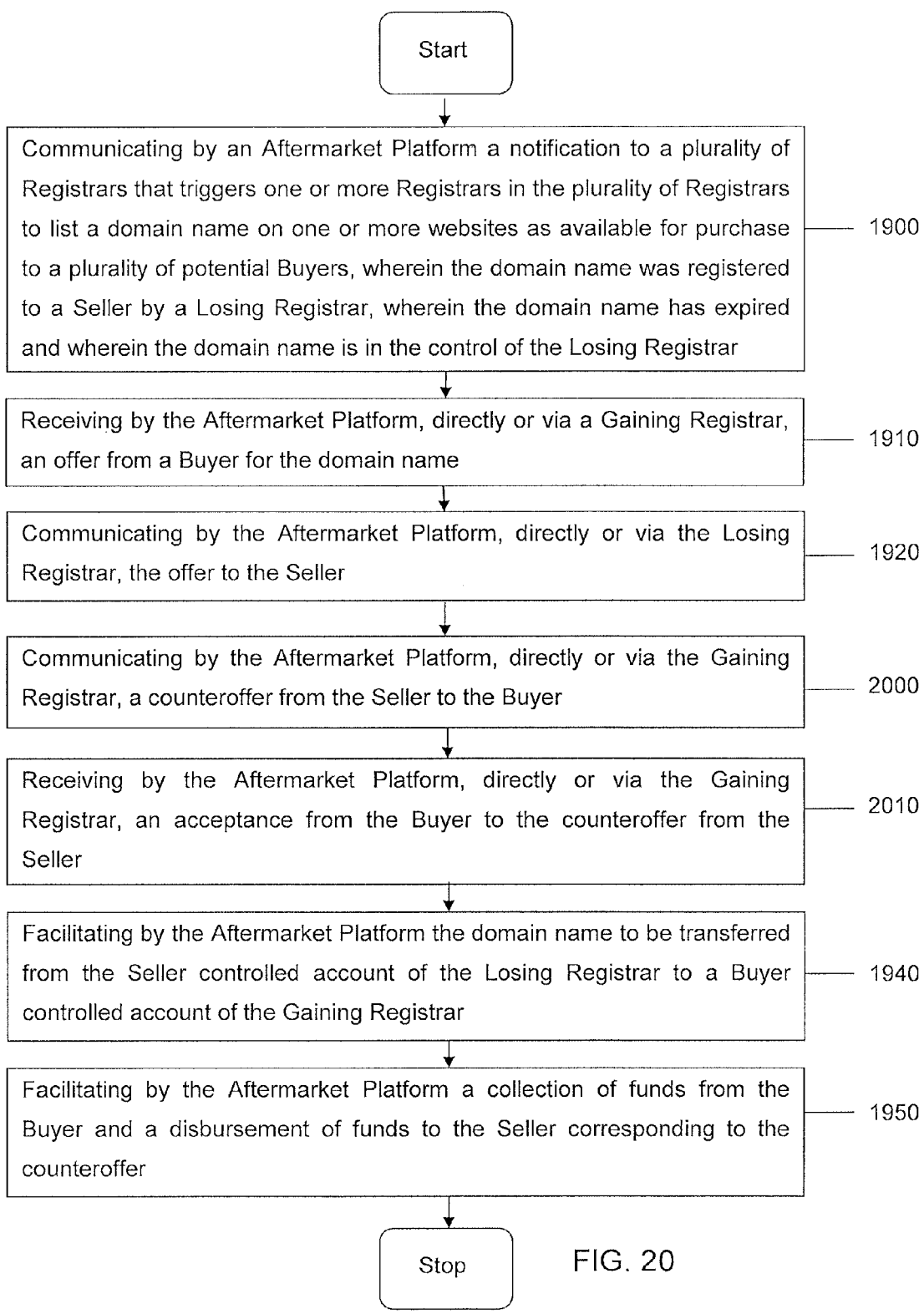
FIG. 20 is a flow diagram of a process from an Aftermarket Platform's point of view for receiving an offer from a Buyer and a counteroffer from a Seller to purchase a domain name.
Figure 21:
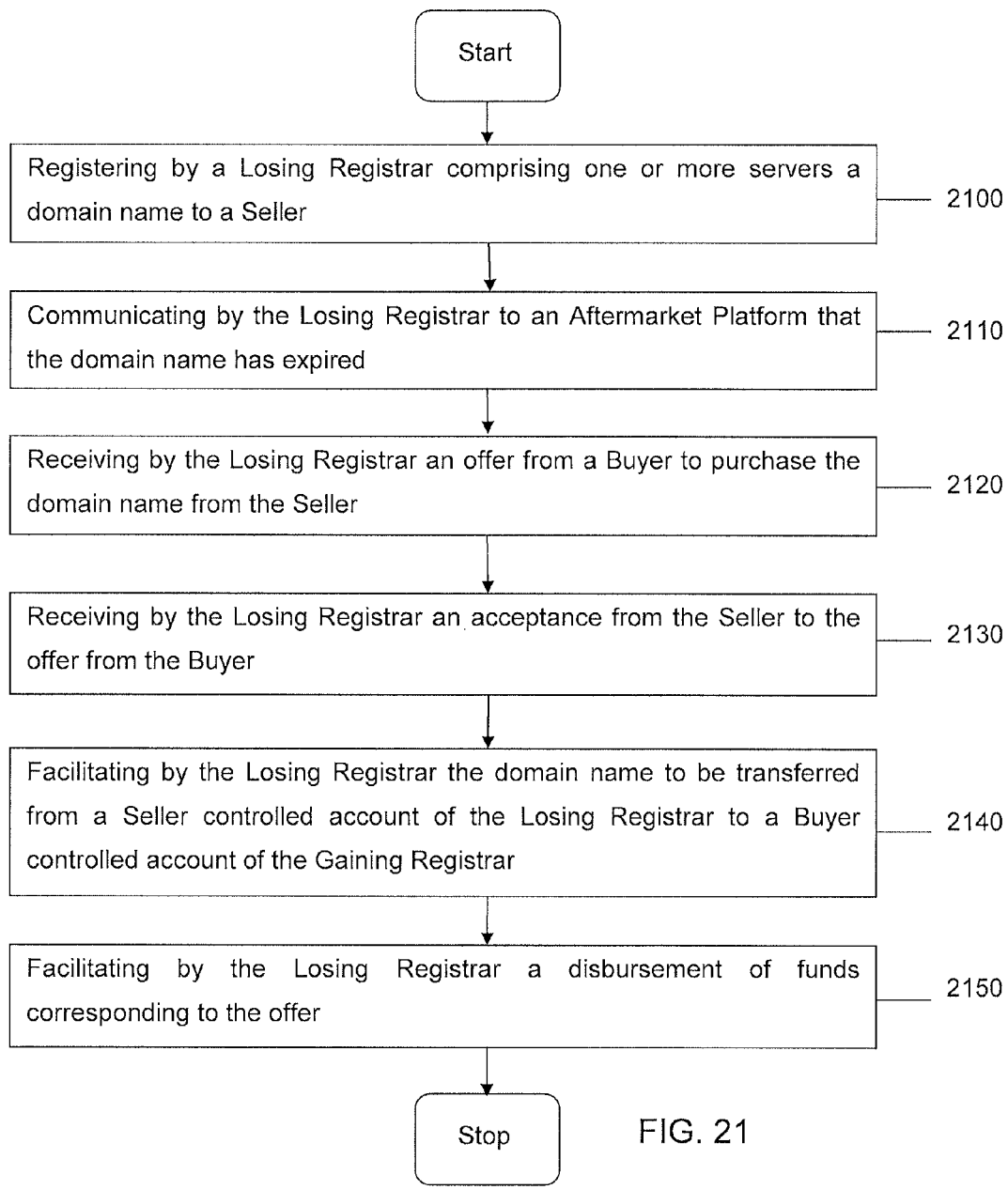
FIG. 21 is a flow diagram of a process from a Losing Registrar's point of view for receiving an offer from a Buyer to purchase a domain name.
Figure 22:
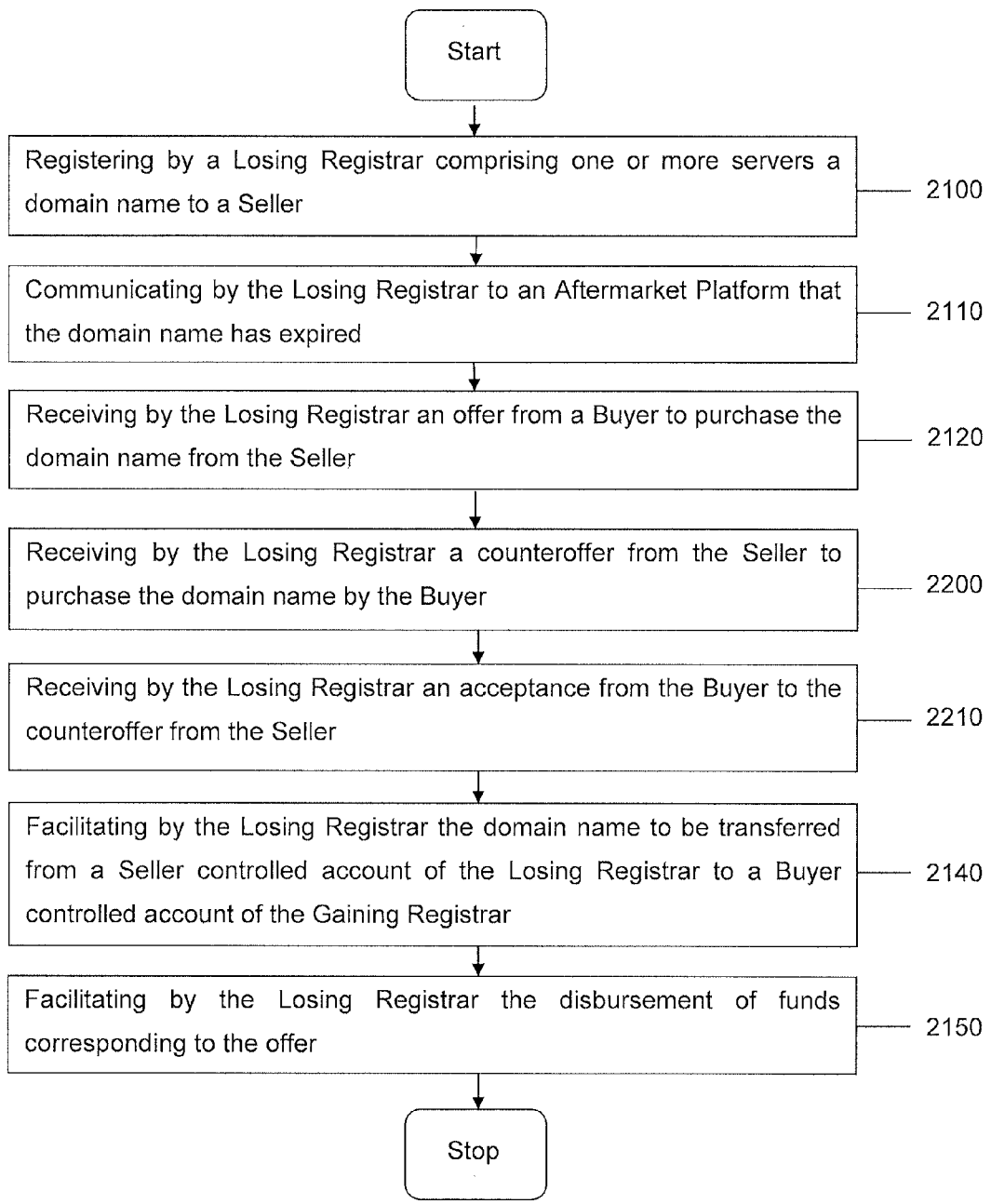
FIG. 22 is a flow diagram of a process from a Losing Registrar's point of view for receiving an offer from a Buyer and a counteroffer from a Seller to purchase a domain name.

With reference to FIG. 9, an embodiment of practicing the invention will now be described. A Buyer 120 may view and purchase a domain name from an Aftermarket Platform 100 website or a Gaining Registrar 220 website. (Step 900) The Aftermarket Platform 100 may communicate with the Losing Registrar 210 and verify that the domain name is still available (and transferable) and instruct the Losing Registrar 210 to hold the domain name so that it cannot be purchased by another Buyer 120 or made nontransferable by the Seller 110 for a specified time period.

Transfer of the Domain Name and Funds

The Aftermarket Platform 100 may request a Losing Registrar 210 to prepare a transfer of the domain name (such as by unlocking the domain name) and set an authorization code, or any other inter-registrar transfer set out by the Registry 200 and ICANN, with a Registry 200. (Step 910) The Aftermarket Platform 100 may provide a Gaining Registrar 220 with the authorization code to request the transfer of the domain name at the Registry 200. The Gaining Registrar 220 may use the authorization code with the Registry 200 to transfer the domain name from the Losing Registrar 210 to the Gaining Registrar 220. The Gaining Registrar 220 may confirm with the Aftermarket Platform 100 when the transfer is complete. (Step 920) In a preferred embodiment, the purchased domain name is transferred from a Seller controlled account 600 at the Losing Registrar 210 to a Buyer controlled account 610 at the Gaining Registrar 220. A domain name may be transferred to a Gaining Registrar 220 from a Losing Registrar 210 and/or ownership may be transferred to a Buyer 120 so that the Buyer 120 becomes the new registrant of the domain name. Information (names, email address and contact addresses) in the WHOIS database may be updated to reflect that the Buyer 120 is now the new registrant and owner of the domain name.

The Aftermarket Platform 100 may facilitate the collection of funds from the Buyer and a disbursement of funds to the Seller for the purchased domain name, preferably with the cooperation of the Gaining Registrar 220 and the Losing Registrar 210. In one embodiment, the transfer of the domain name from a Seller controlled account 600 to a Buyer controlled account 610 is confirmed before the funds are collected from the Buyer 120 and disbursed to the Seller 110. In another embodiment, a collection of the funds from the Buyer 120 and a disbursement of the funds to the Seller 110 is confirmed before the domain name is transferred from the Seller controlled account 600 to the Buyer controlled account 610. In another embodiment, the Registrars 700-703 may have deposit accounts with each other and/or exchange invoices and/or payments periodically, such as monthly, to balance funds collected from one or more Buyers 120 (preferably by the Gaining Registrars 220) and funds disbursed to one or more Sellers 110 (preferably by the Losing Registrar 210). Fees and/or commissions may also be exchanged/collected/paid out between the Registrars 700-703 for participation or performance in the Domain Name Aftermarket 130.

The transfer of a domain name from a Seller controlled account 600 to a Buyer controlled account 610 may be direct or have one or more intermediate steps. A collection of funds from the Buyer and a disbursement of funds to the Seller may be direct or have one or more intermediate steps. The transfer of a domain name and funds should not be assumed to be direct or have intermediate steps unless specifically stated. The disbursement of funds to the Seller 110 may occur by any method now known or developed in the future. As non-limiting examples, the funds may be disbursed using any type of electronic fund transfer into an account for the Seller 110 or a check may be mailed to the Seller 110. Funds collected from the Buyer 120 may or may not include fees or commissions for the use of the Domain Name Aftermarket 130 system. Thus, in some embodiments, a fund (purchase price for the domain name) and commissions and/or fees may be collected from the Buyer 120. Alternatively, or in combination, funds collected from the Buyer 120 may have commissions and/or fees removed before the funds are disbursed to the Seller 110. In some embodiments, the funds collected from the Buyer 120 will not equal the funds disbursed to the Seller 110 as fees and/or commissions may have been removed from the funds collected from the Buyer 120. Offers and Counteroffers for domain names may also have fees and/or commissions removed from the funds collected from the Buyer 120 before the funds are disbursed to the Seller 110.

Figure 23:
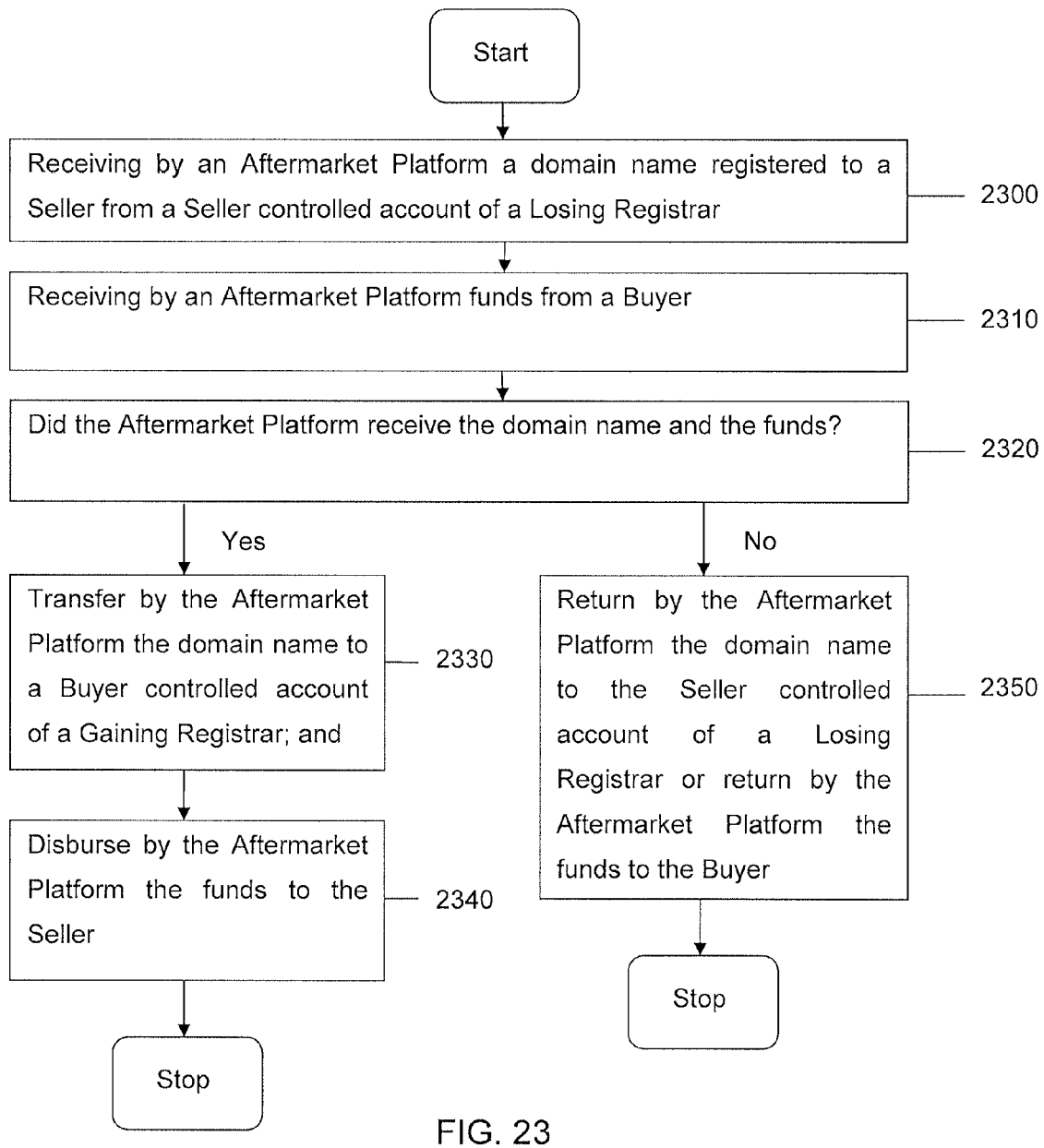
FIG. 23 is a flow diagram of a process from an Aftermarket Platform point of view for transferring a domain name from a Seller controlled account at a Losing Registrar to a Buyer controlled account at a Gaining Registrar via the Aftermarket Platform and transferring funds from the Buyer to the Seller via the Aftermarket Platform.
Figure 24:
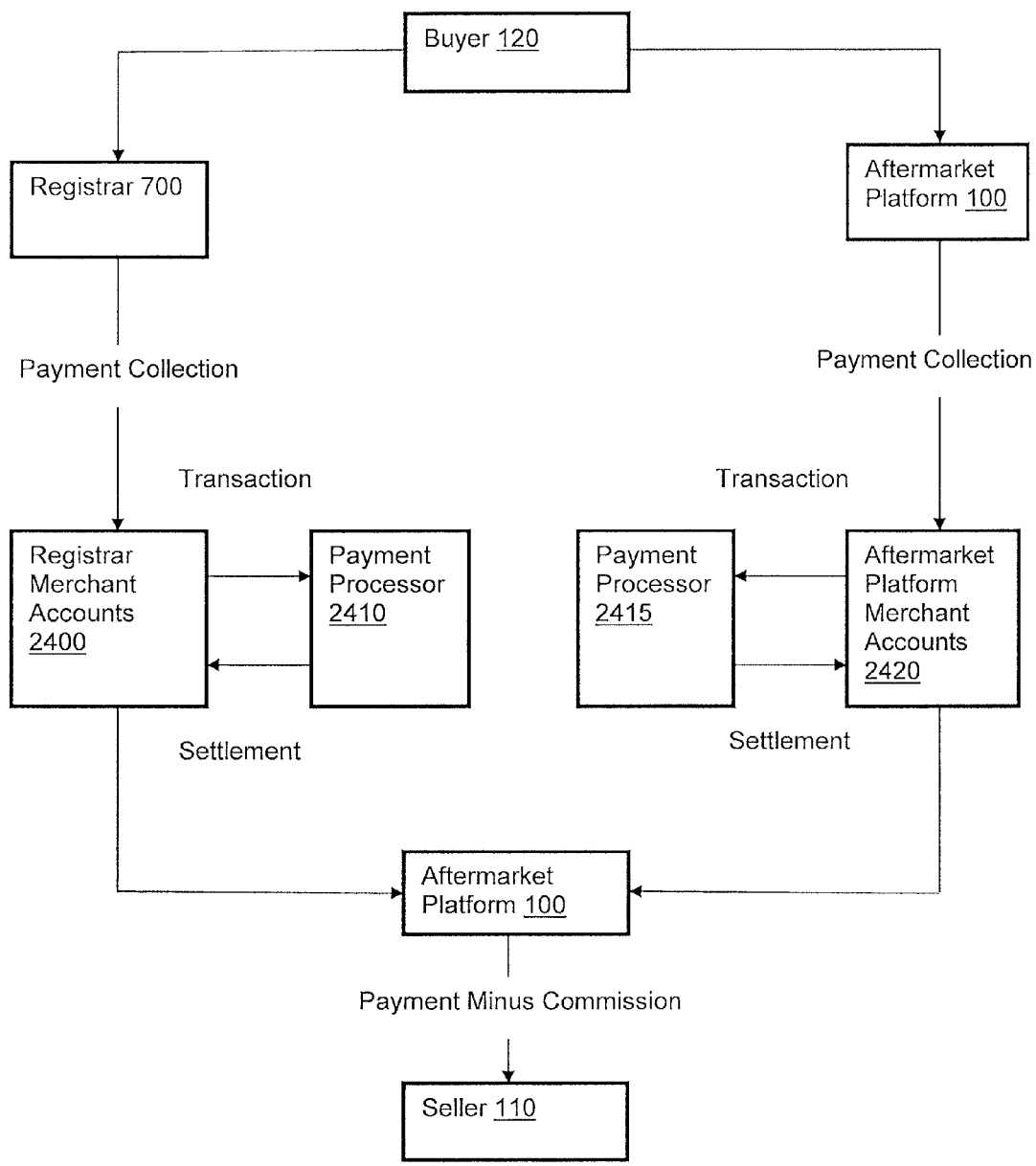
FIG. 24 is a cash (funds) flow diagram for a Registrar illustrating a possible flow of cash when the ownership of a domain name is transferred from a Seller to a Buyer.
Figure 25:
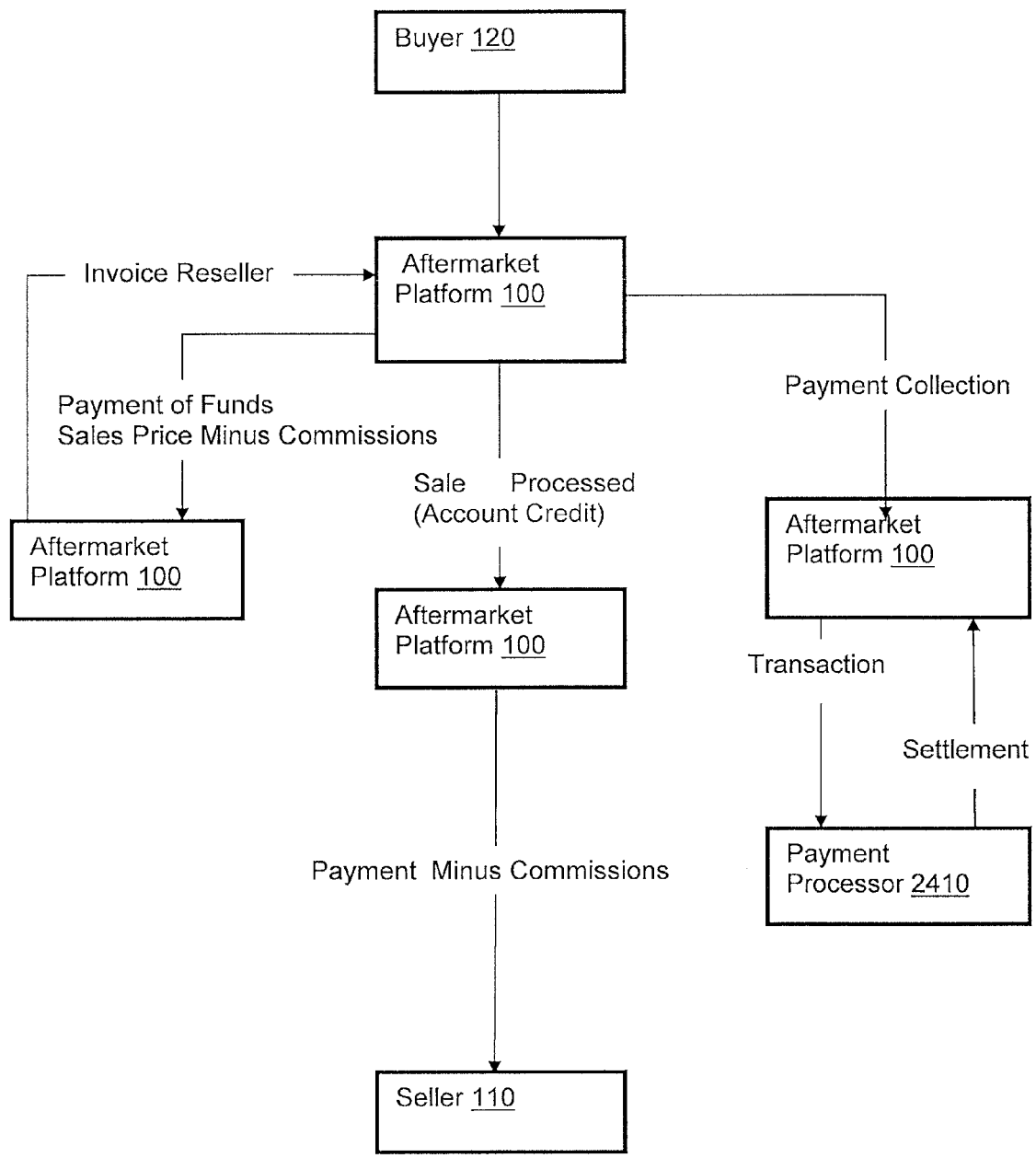
FIG. 25 is a cash (funds) flow diagram for a Reseller illustrating a possible flow of cash when the ownership of a domain name is transferred from a Seller to a Buyer.
Figure 26:
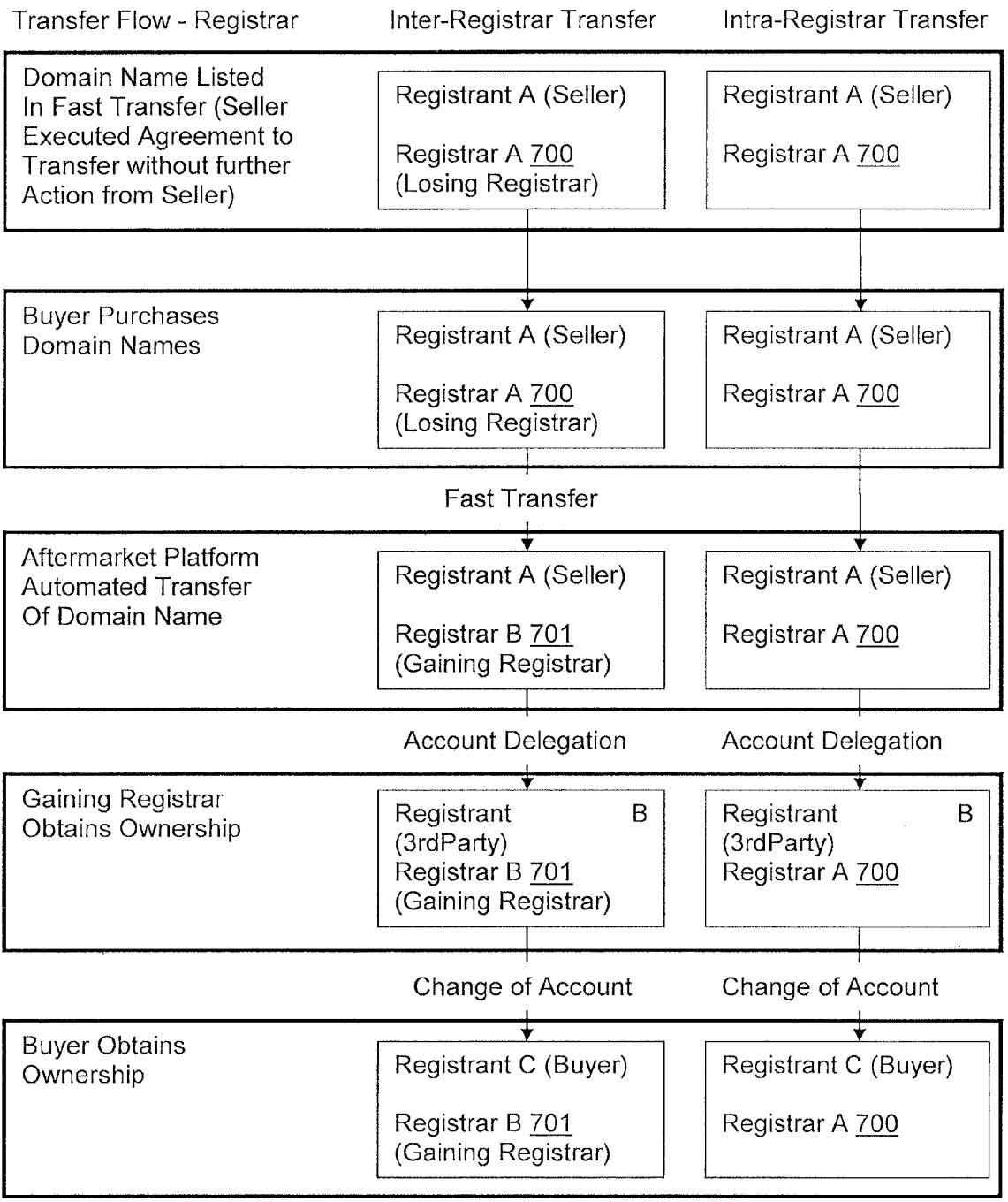
FIG. 26 is a block diagram of a domain name transfer from a sale at a registrar.
Figure 27:
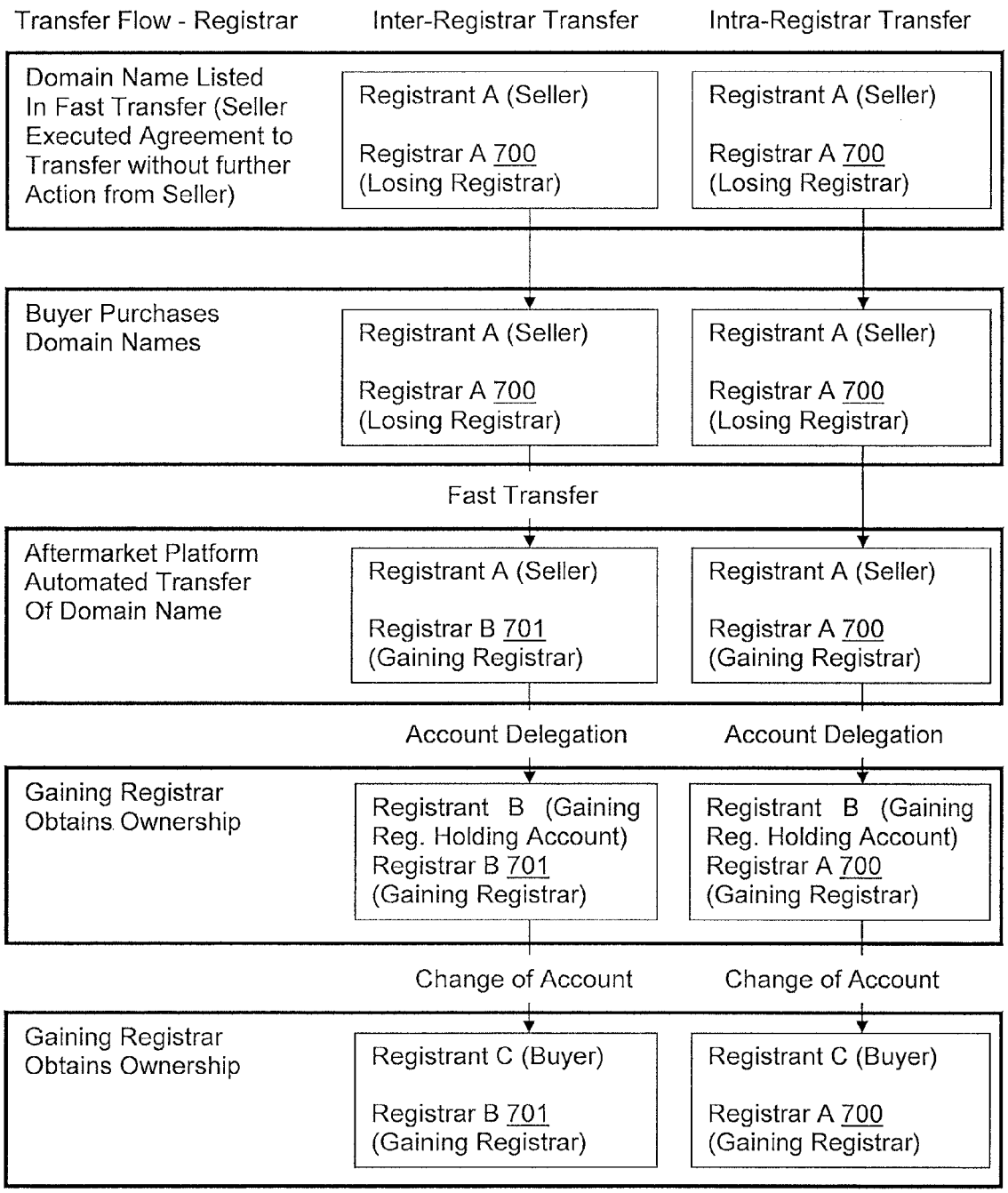
FIG. 27 is a block diagram of a domain name transfer from a sale at an Aftermarket Platform Reseller Sale.
Figure 28:
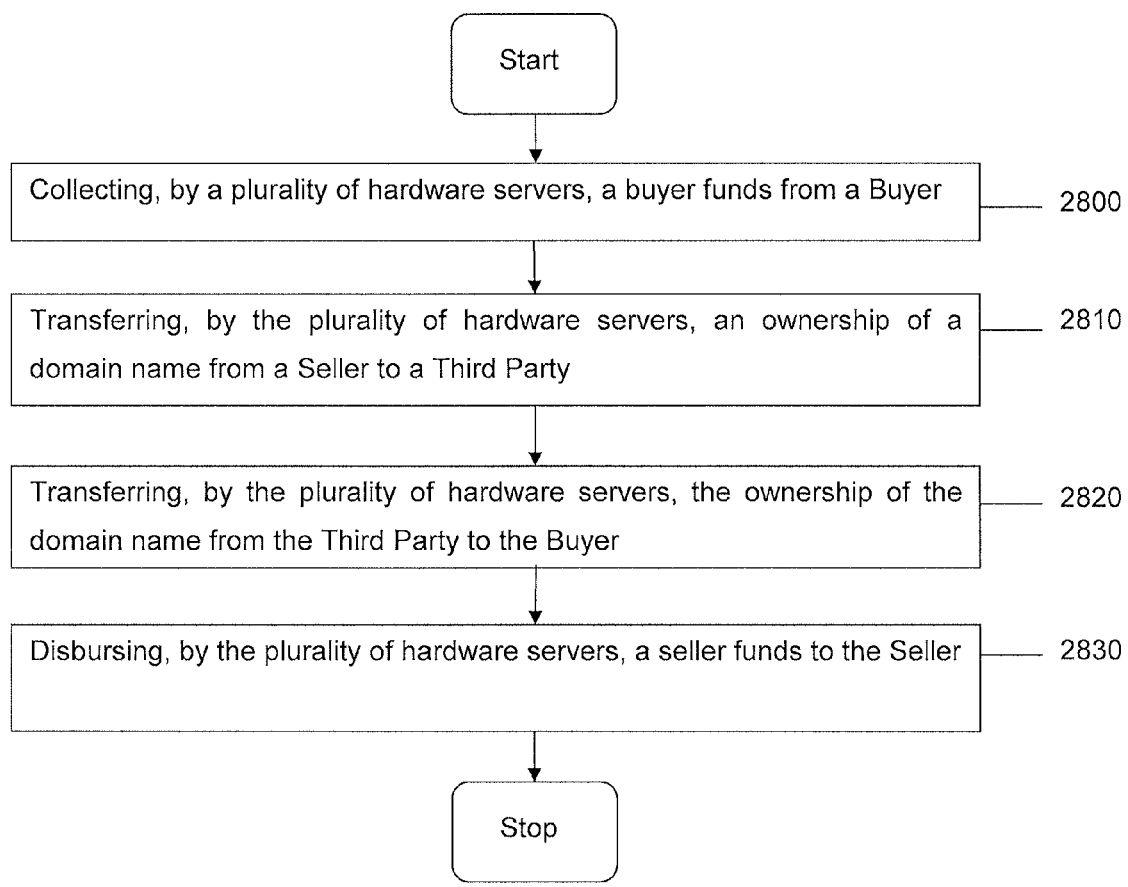
FIG. 28 is a flow diagram of a process for transferring ownership of a domain name from a Seller to a Buyer and for collecting a buyer funds from the Buyer and distributing a seller funds to the Seller.
Figure 29:
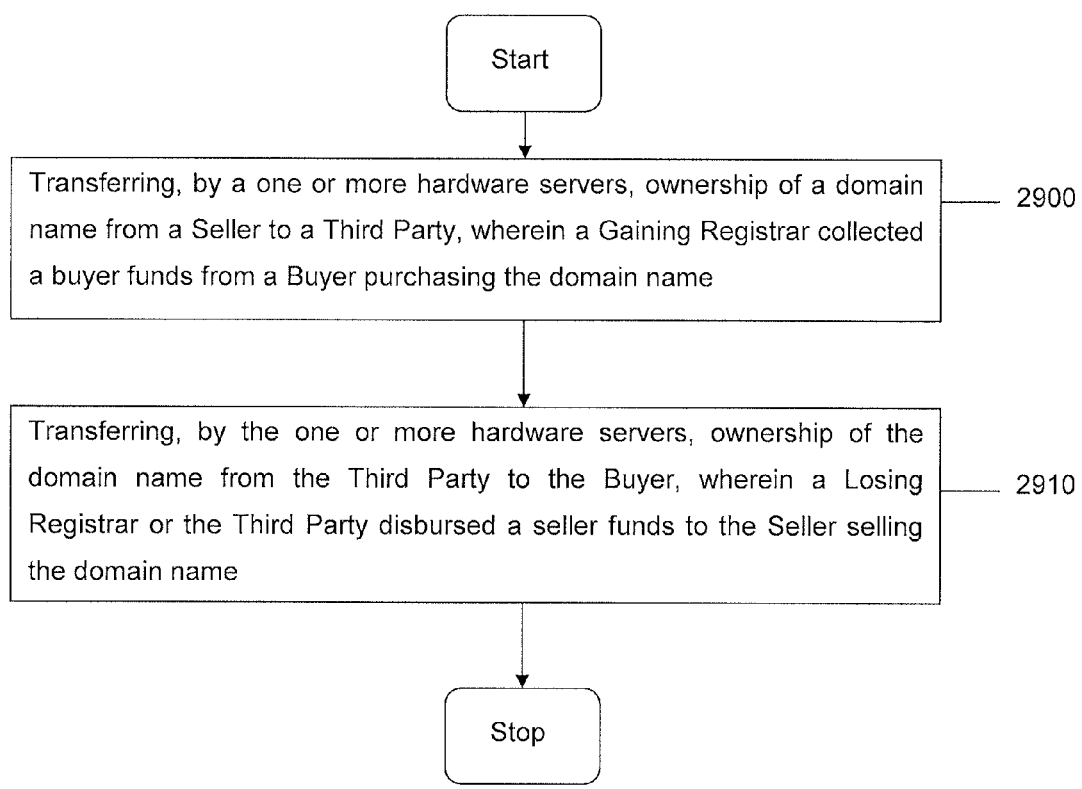
FIG. 29 is a flow diagram of a process for transferring ownership of a domain name from a Seller to a Buyer and for collecting a buyer funds from the Buyer and distributing a seller funds to the Seller.
Figure 30:
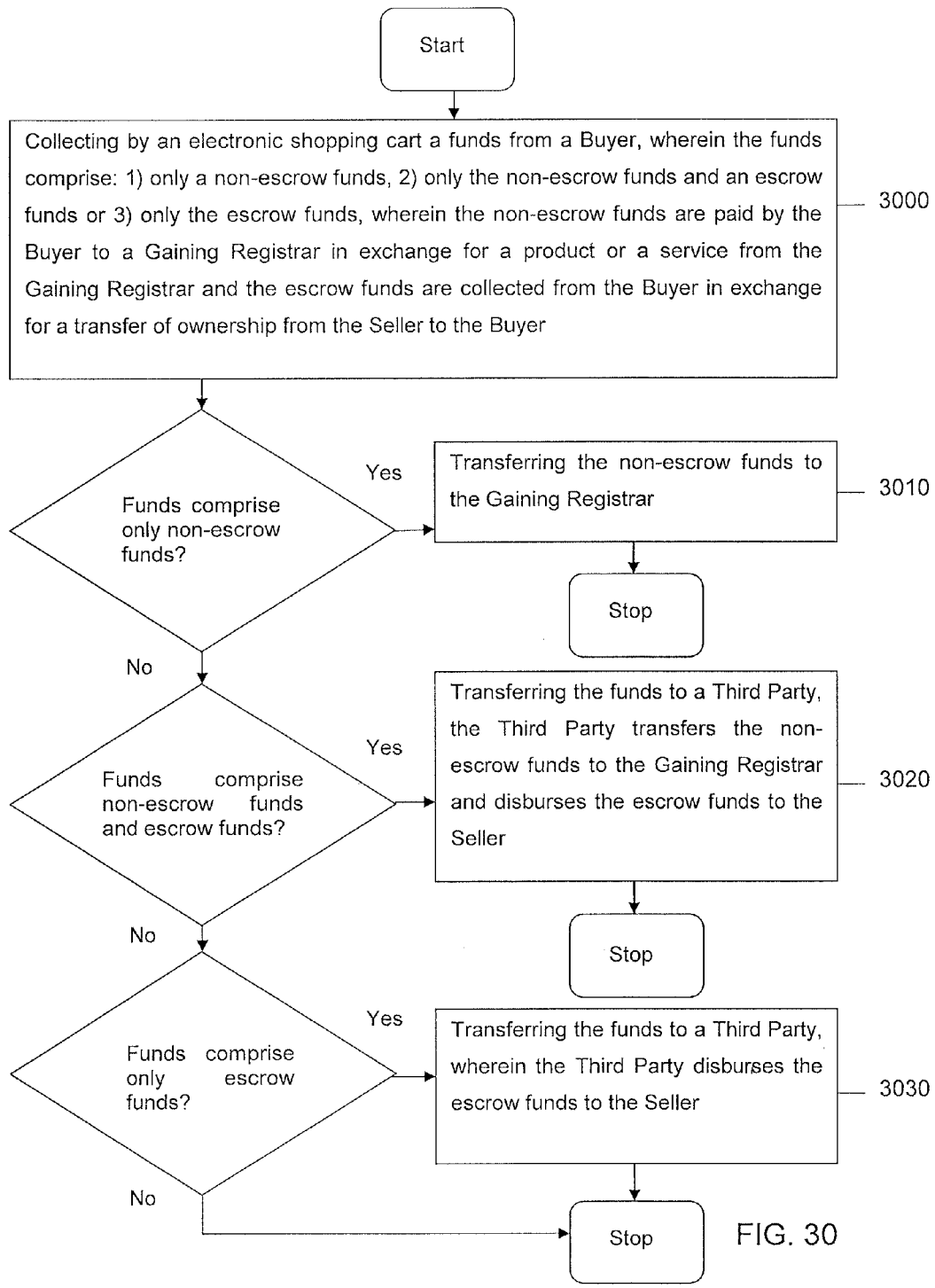
FIG. 30 is a flow diagram of a process for transferring ownership of a domain name from a Seller to a Buyer and for collecting a buyer funds from the Buyer and distributing a seller funds to the Seller.
Figure 31A:
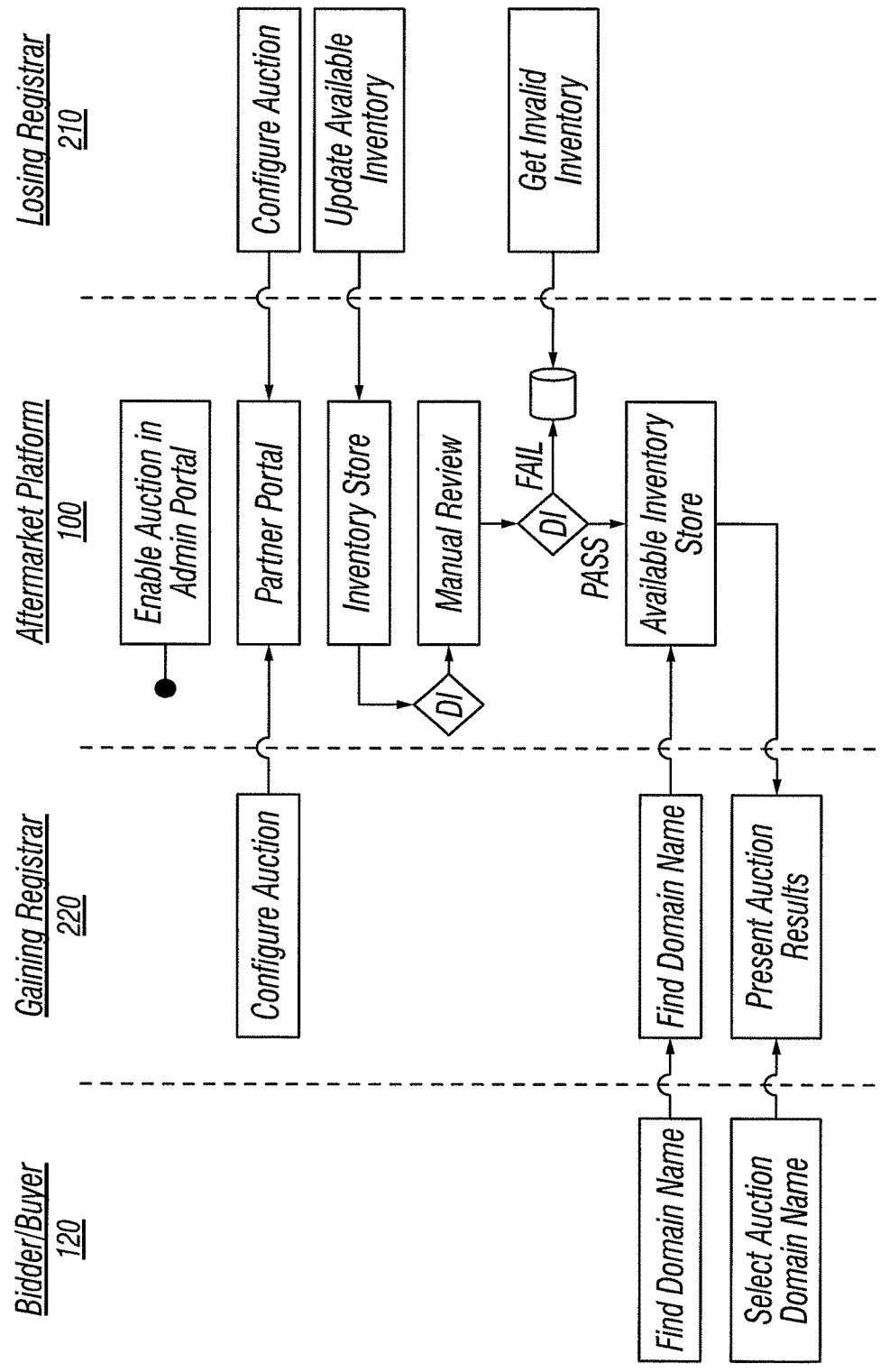
FIGS. 31A, 31B, 31C and 31D are a timing diagram for the actions of a bidder/Buyer, Gaining Registrar, Aftermarket Platform and Losing Registrar in an auction of expired domain names.
Figure 31B:
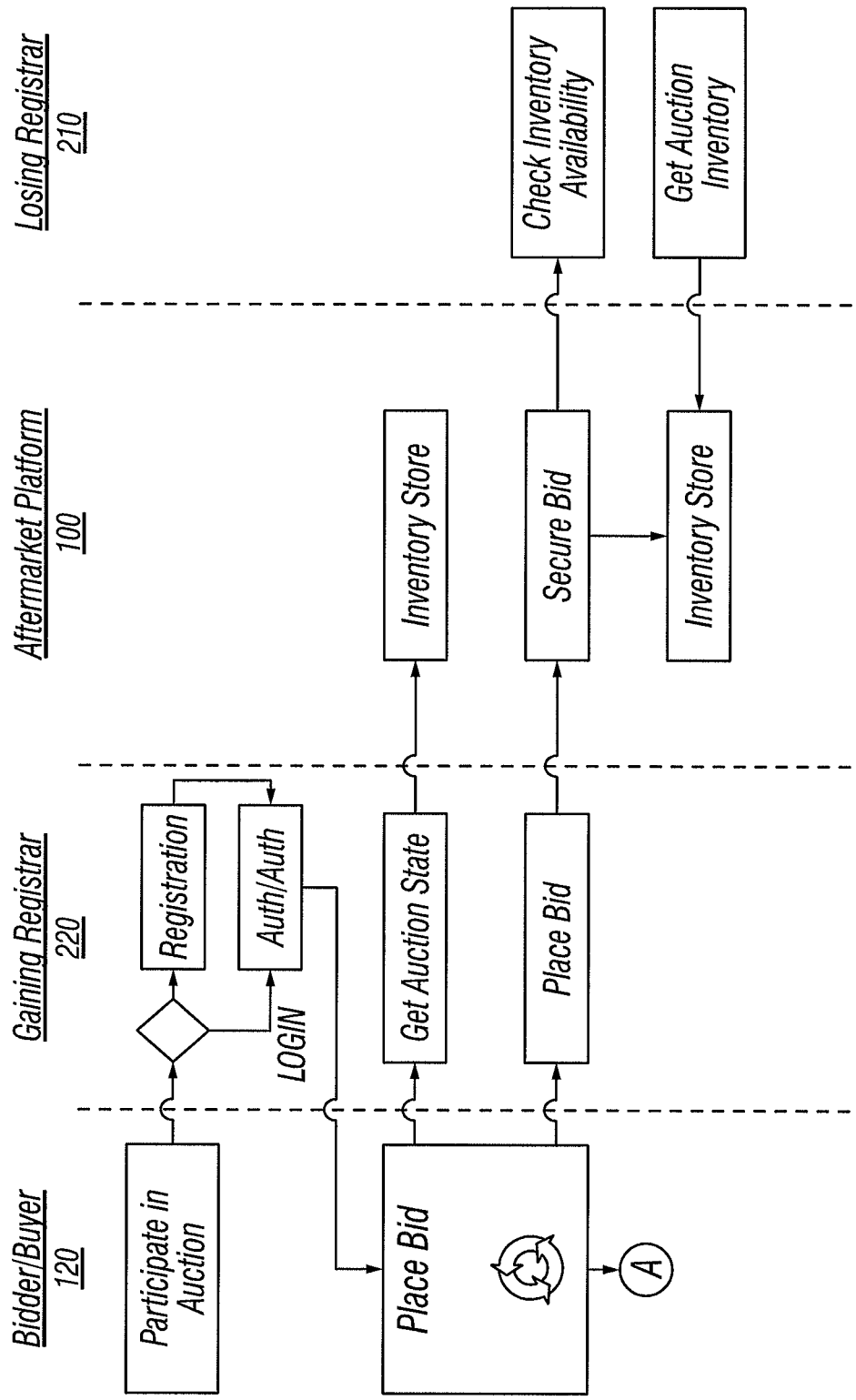
Figure 31C:
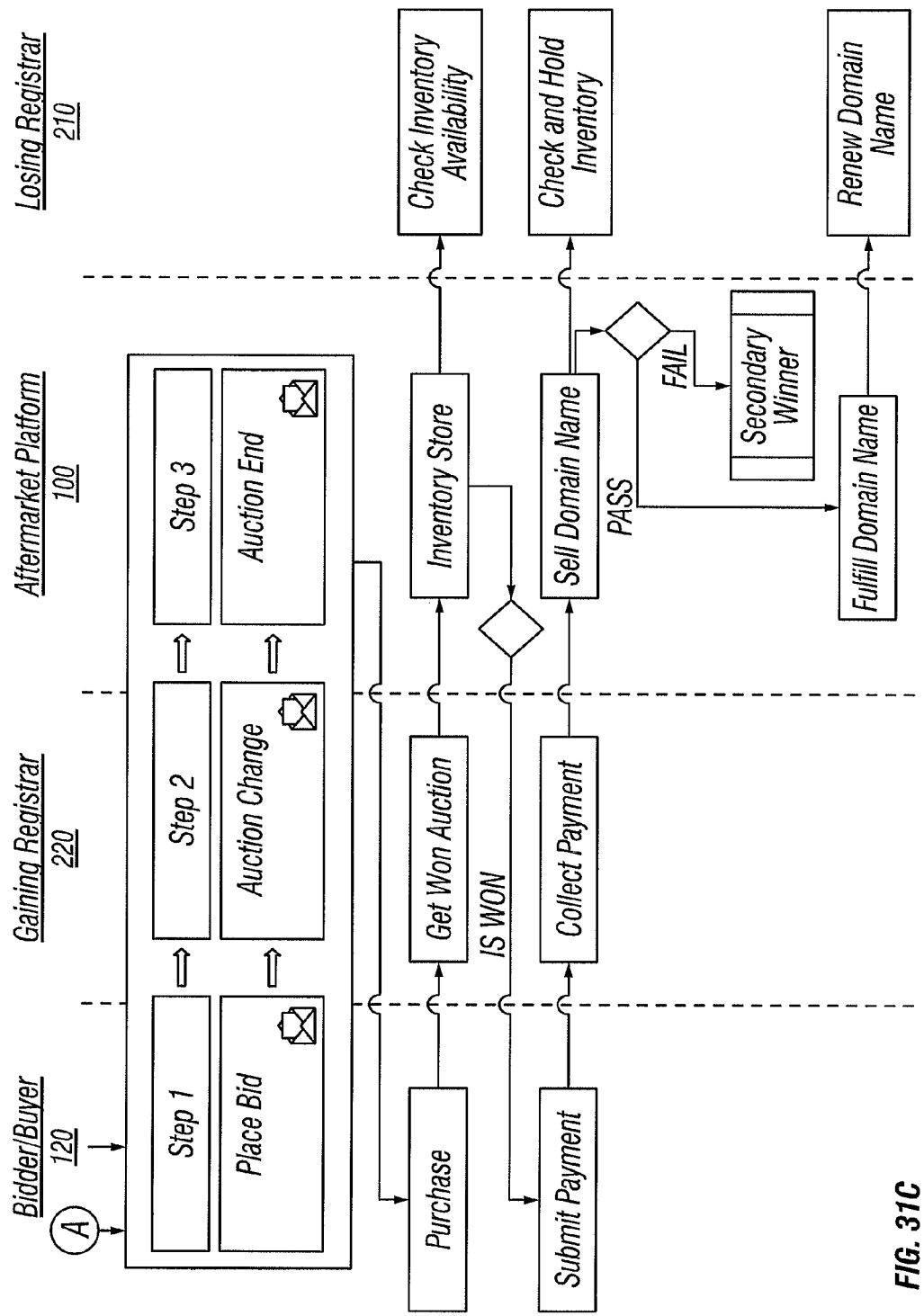
Figure 31D:
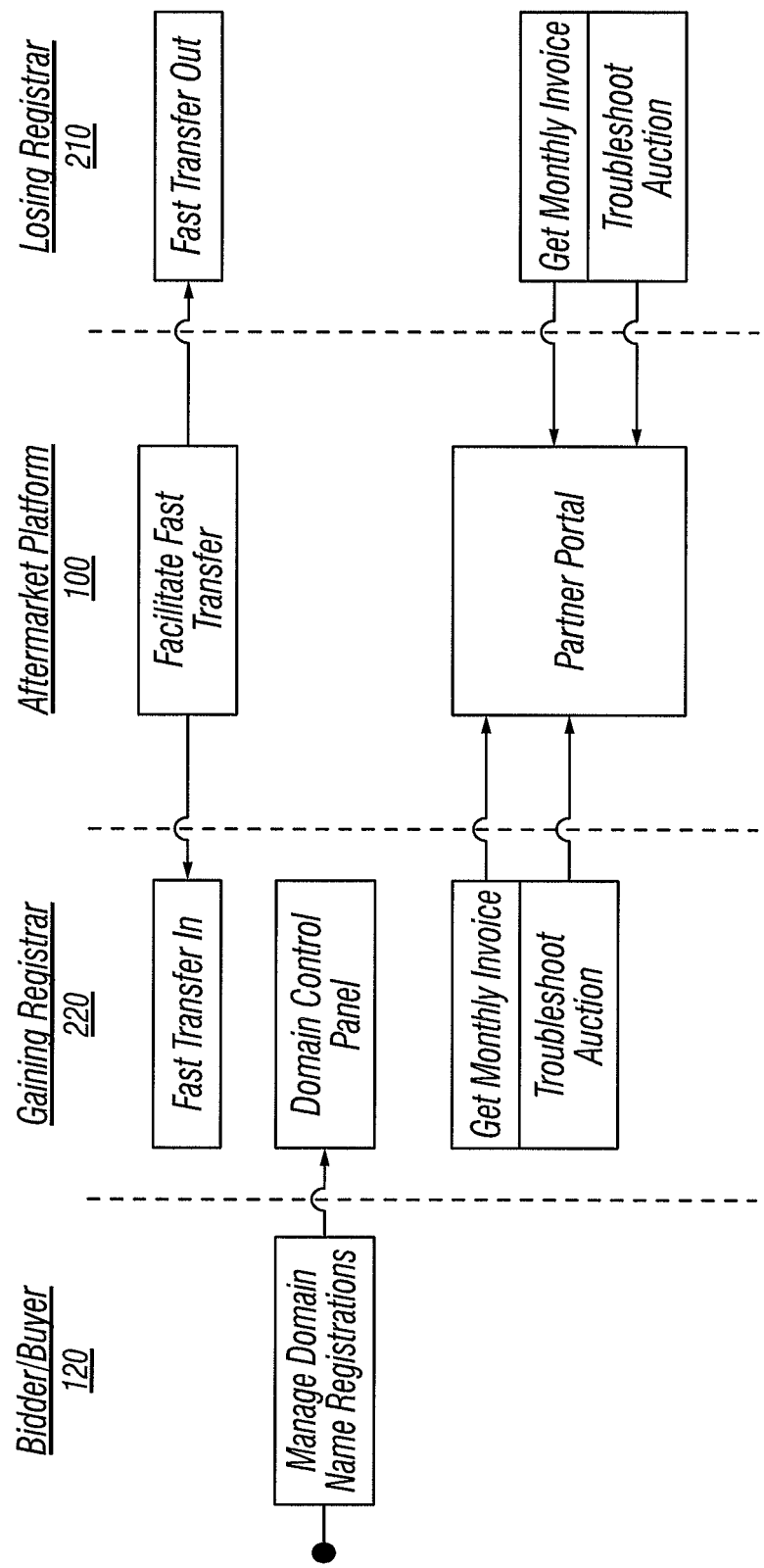
Figure 32:
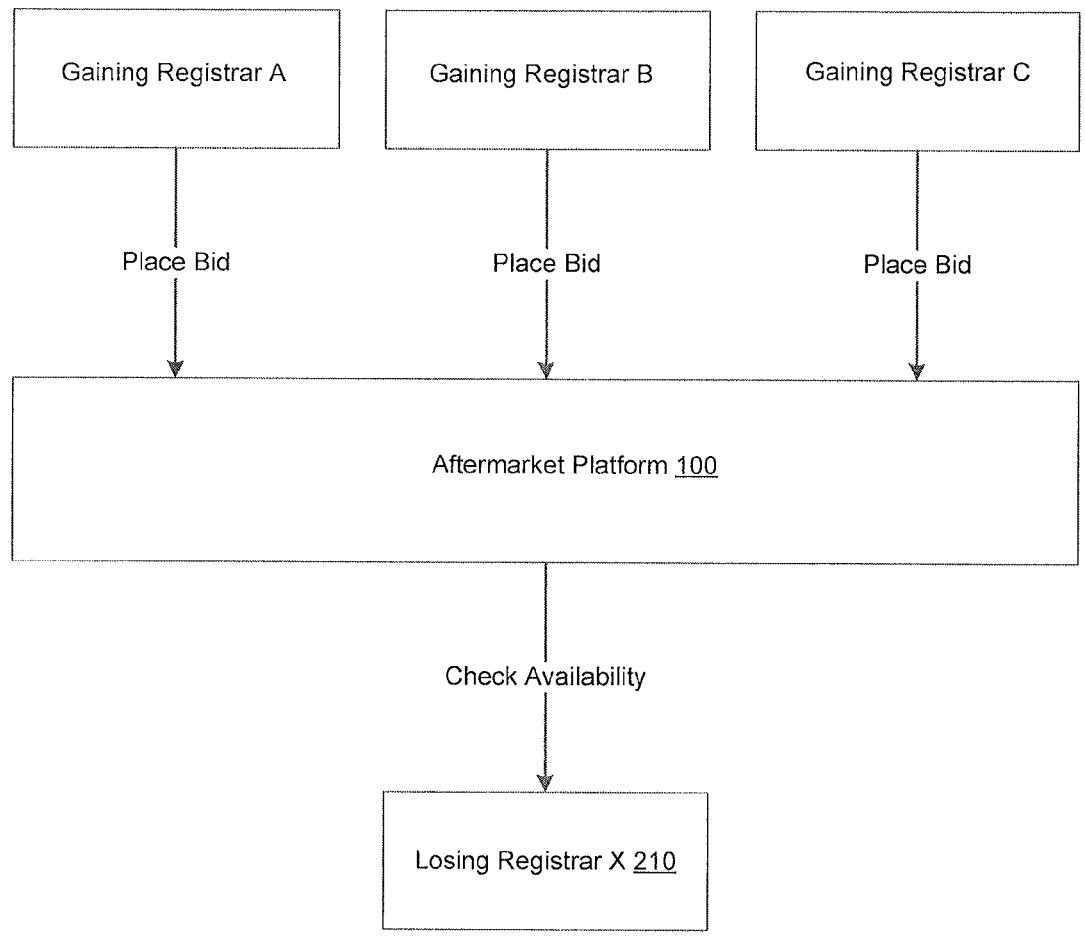
FIG. 32 is a block diagram of an expired domain name auction illustrating the Gaining Registrars A, B and C placing bids with an Aftermarket Platform and the Aftermarket Platform checking the availability of a domain name with a Losing Registrar.
Figure 33:
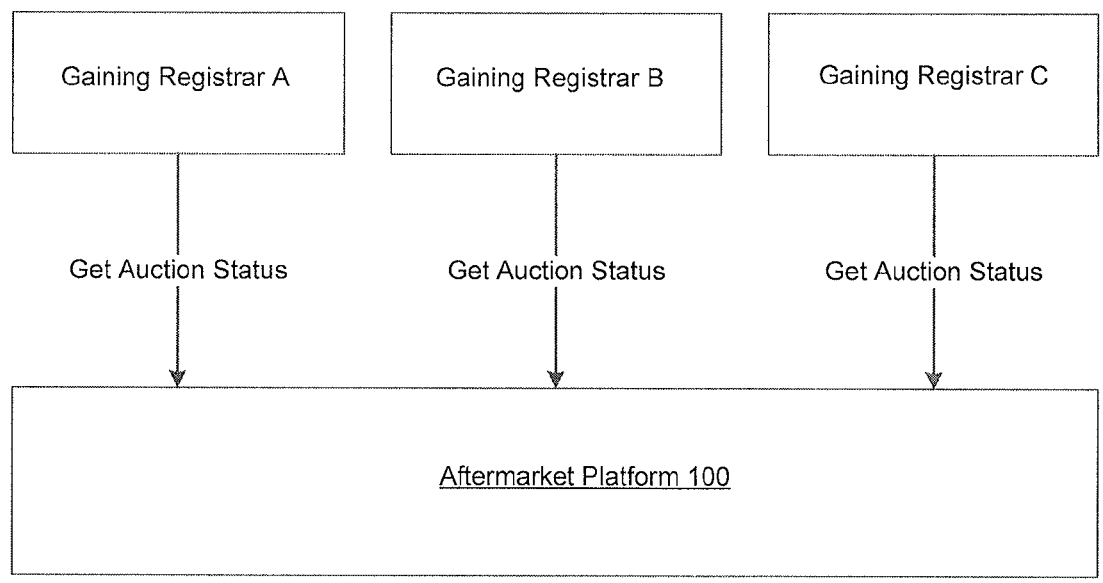
FIG. 33 is a block diagram of an expired domain name auction illustrating the Gaining Registrars A, B and C requesting and/or receiving an auction status from an Aftermarket Platform.
Figure 34:
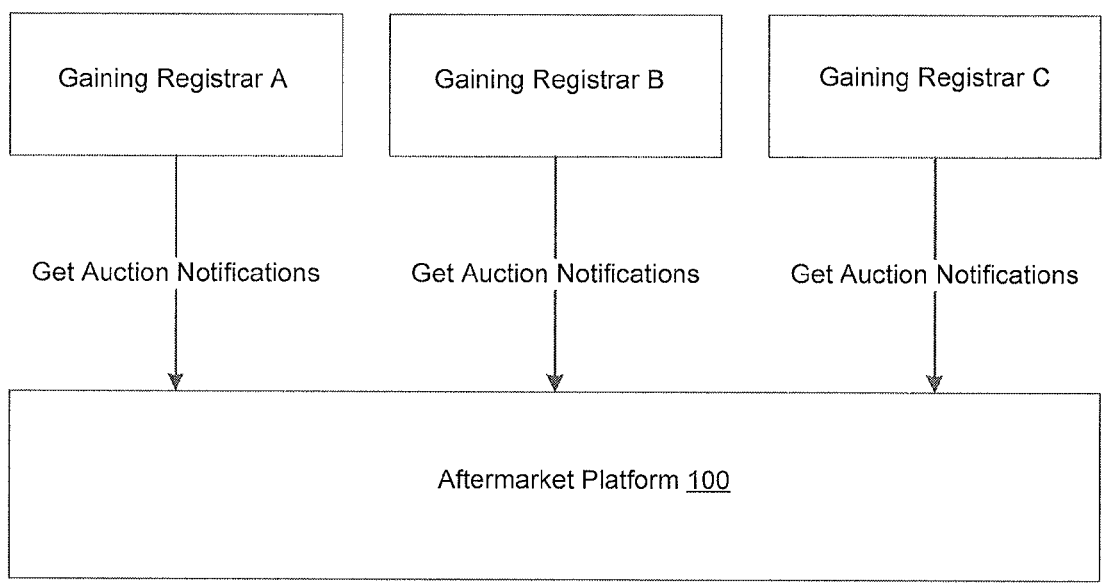
FIG. 34 is a block diagram of an expired domain name auction illustrating the Gaining Registrars A, B and C requesting and/or receiving an auction notification from an Aftermarket Platform.
Figure 35:
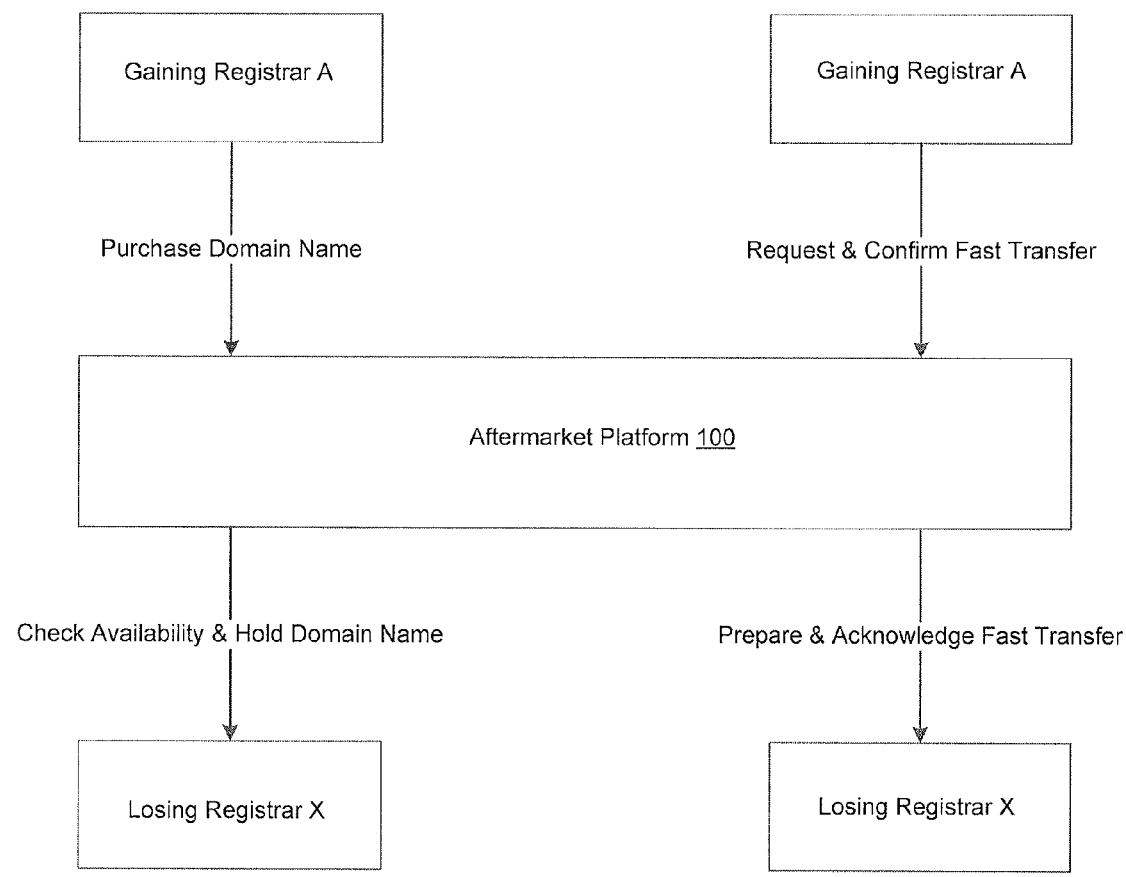
FIG. 35 is a block diagram of an expired domain name auction illustrating possible communications between Gaining Registrars A and B and the Aftermarket Platform and possible communications between the Aftermarket Platform and the Losing Registrar.
Figure 36:
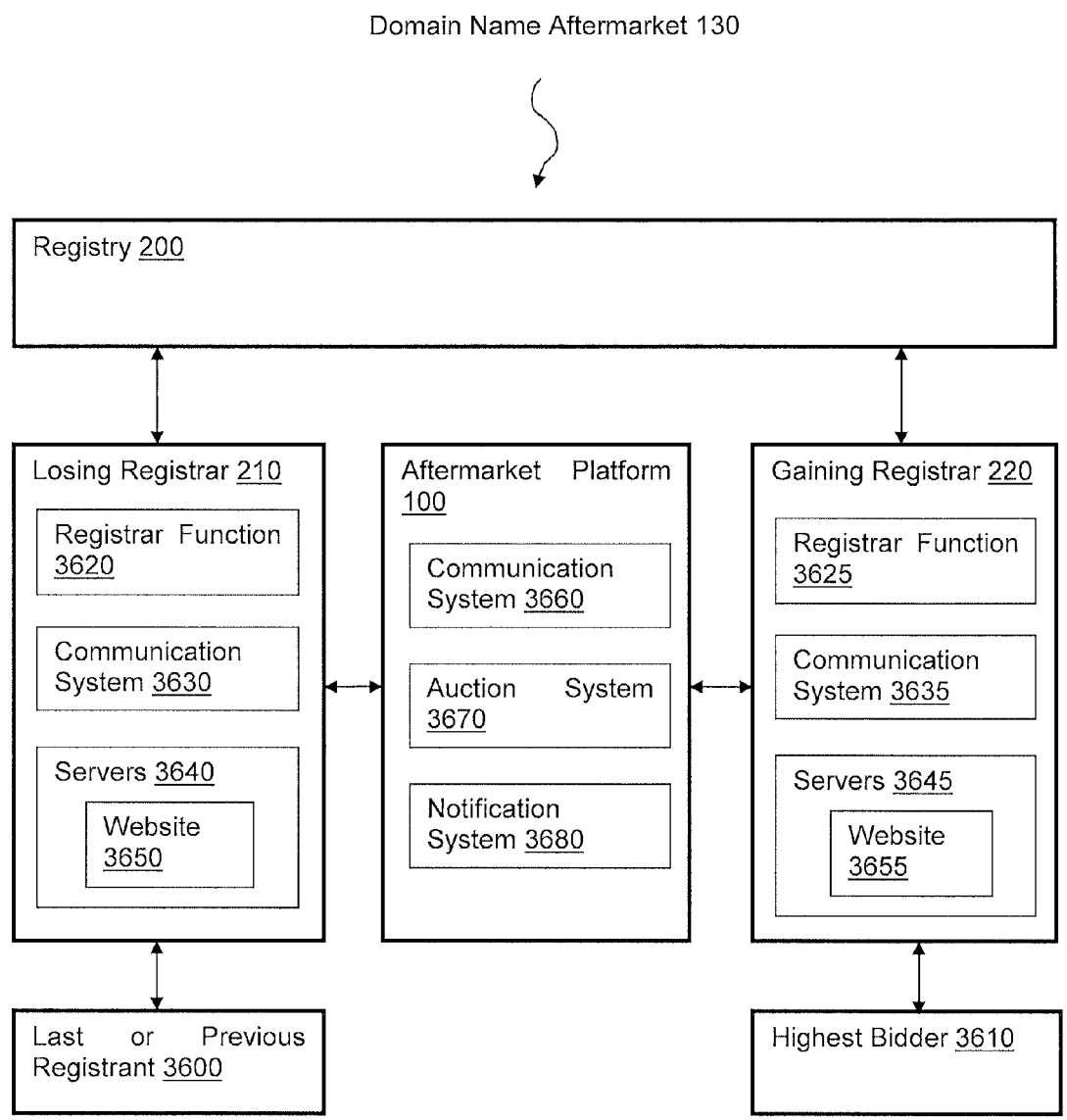
FIG. 36 is a block diagram of a Domain Name Aftermarket illustrating possible components of a Losing Registrar, Aftermarket Platform and Gaining Registrar.
Figure 37:
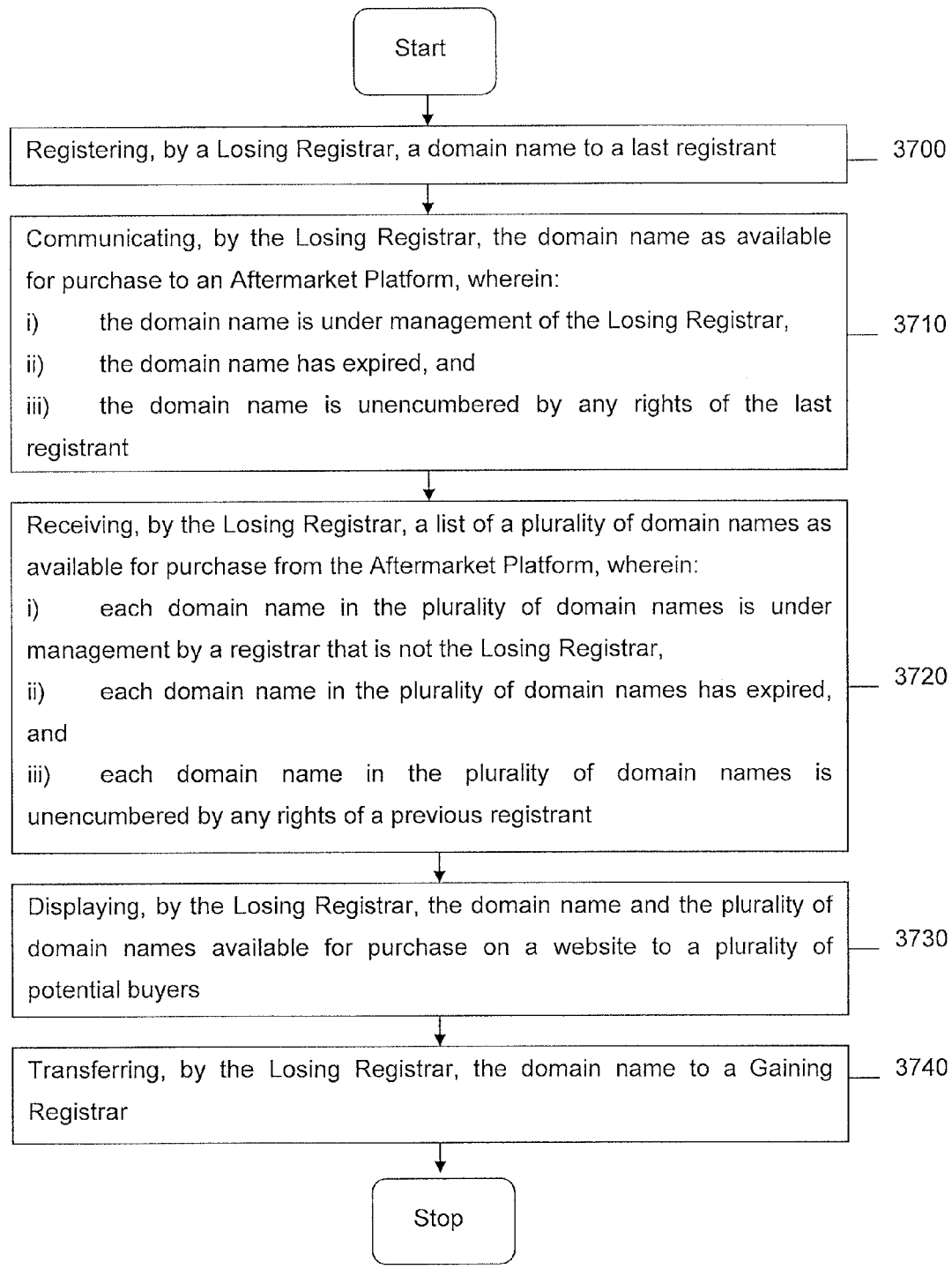
FIG. 37 is a flow diagram of a process for a Losing Registrar to participate in an expired domain name auction across multiple registrars.
Figure 38:
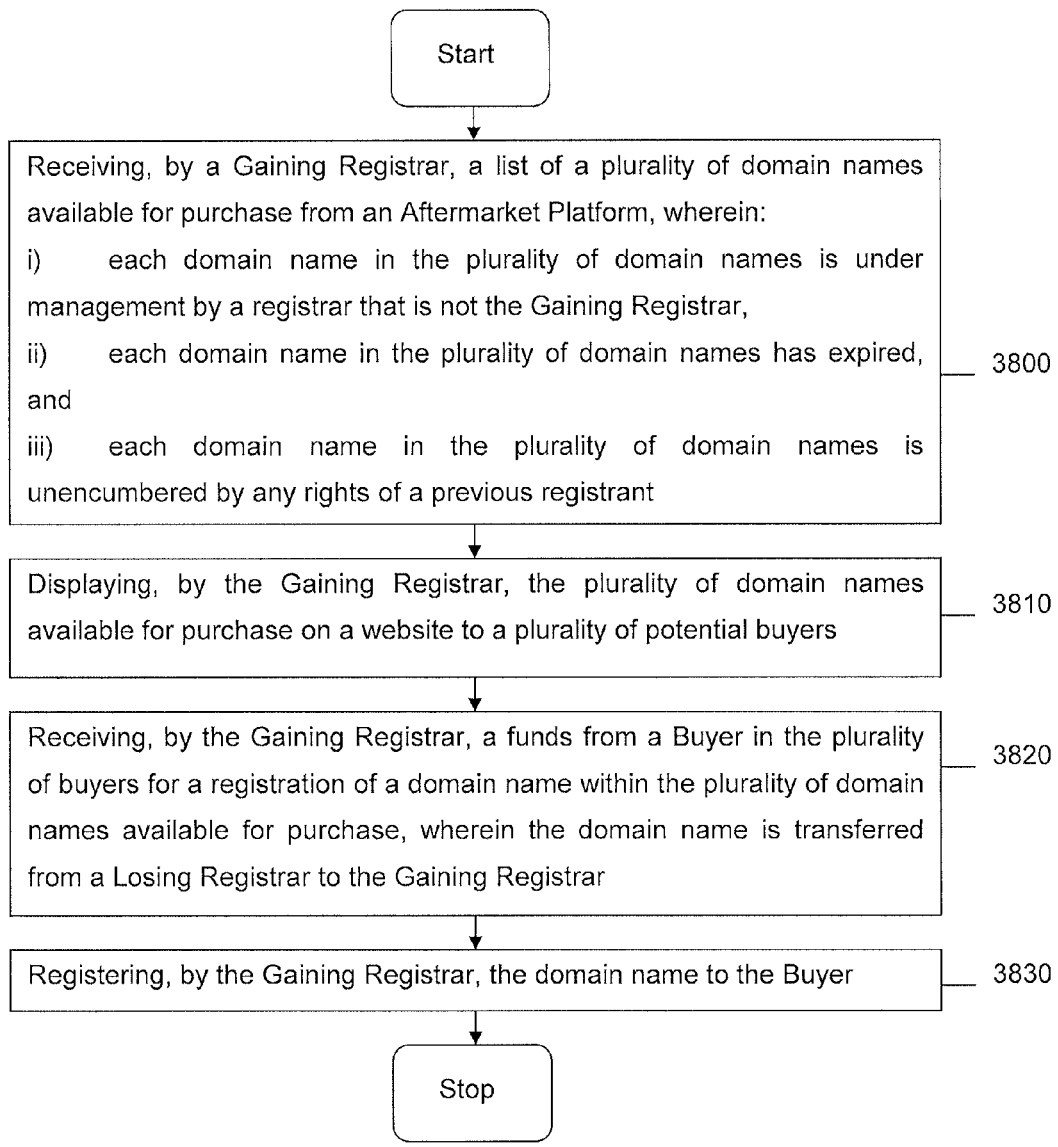
FIG. 38 is a flow diagram of a process for a Gaining Registrar to participate in an expired domain name auction across multiple registrars.
Figure 39:
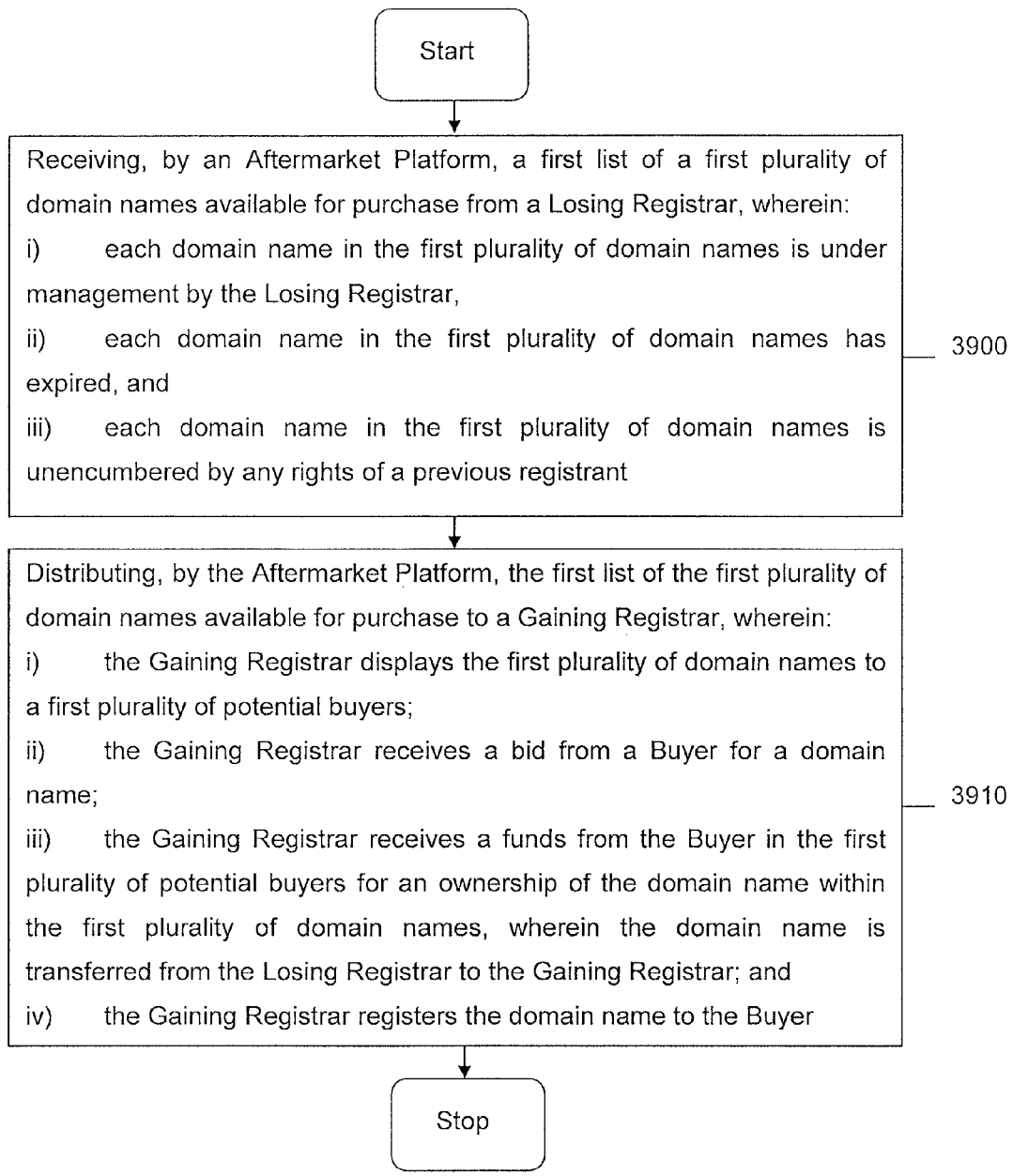
FIG. 39 is a flow diagram of a process for an Aftermarket Platform to participate in an expired domain name auction across multiple registrars.

With reference to FIG. 23 and as a non-limiting example, a process for facilitating by an Aftermarket Platform 100 a domain name to be transferred from a Seller controlled account 600 of a Losing Registrar 210 to a Buyer controlled account 610 of a Gaining Registrar 220 and the facilitating by the Aftermarket Platform 100 the collection of funds from the Buyer and a disbursement of funds to the Seller after the purchase of the domain name by the Buyer from the Seller will now be described. A domain name may be transferred from a Seller controlled account 600 to an Aftermarket Platform 100. (Step 2300) Funds may be transferred or entered, preferably either from a Gaining Registrar 220 or an Aftermarket Platform 100, to the Aftermarket Platform 100. (Step 2310) The transfer of the domain name to the Aftermarket Platform 100 and the transfer of the funds to the Aftermarket Platform 100 may occur in either order. After, and preferably only after, the Aftermarket Platform 100 has both the domain name and the funds (Step 2320), the Aftermarket Platform 100 may transfer the domain name to a Buyer controlled account 610 in a Gaining Registrar 220 (Step 2330) and the Aftermarket Platform 100 may transfer the funds from the Aftermarket Platform 100 to the Seller 110 (Step 2340). The transfer of the domain name from the Aftermarket Platform 100 to the Buyer controlled account 610 in the Gaining Registrar 220 and the transfer of the funds from the Aftermarket Platform 100 to the Seller 110 may occur in either order.

In this embodiment, in the event the domain name is not transferred to the Aftermarket Platform 100 after, for example, a predetermined period of time, the Aftermarket Platform 100 and/or the Gaining Registrar 220 may return the funds to the Buyer 120. In this embodiment, in the event the funds are not transferred to the Aftermarket Platform 100 after, for example, a predetermined period of time, the Aftermarket Platform 100 and/or Losing Registrar 210 may return the domain name to the Seller controlled account 600 in the Losing Registrar 210. (Step 2350) This embodiment has the advantage of reducing the risk the Seller 110 will lose the domain name without receiving the funds and the risk the Buyer 120 will lose the funds without receiving the domain name.

Referring to FIGS. 1-7, a Seller 110 may execute an agreement that permits a domain name registered to the Seller 110 to be transferred from a Seller controlled account 600 at a Losing Registrar 210 to a Buyer controlled account 610 at a Gaining Registrar 220 upon purchase by a Buyer 120. The agreement may be executed, i.e., agreed to, on a website controlled by the Losing Registrar 210 or an Aftermarket Platform 100. The agreement preferably allows the domain name to be transferred without further action by the Seller 110. The domain name may be listed, i.e., offered for sell, on a plurality of Registrars' websites to a plurality of potential Buyers 120 after the Seller 110 executes the agreement. The domain name may be monitored (preferably by the Losing Registrar 210) and delisted, i.e., disabled from being purchased by a Buyer 120 from any Registrar 700-703, if the domain name becomes nontransferable from the Seller controlled account 600. The Buyer 120 and Seller 110 may make any number of offers and counteroffers for the domain name.

Aftermarket Platform—Fast Transfer

Referring to FIGS. 1-7 and 10, the present invention provides methods for an Aftermarket Platform 100 to receive an agreement executed by a Seller 110. The agreement may permit a domain name registered to the Seller 110 to be transferred, only after a Buyer 120 has agreed to purchase or purchased the domain name and without further action from the Seller 110, from a Seller controlled account 600 of a Losing Registrar 210 to a Buyer controlled account 610 of a Gaining Registrar 220. The agreement is preferably executed by the Seller 110 prior to making the domain name available to the Buyer 120 for purchase. (Step 1000)

The Aftermarket Platform 100 may receive a communication from the Gaining Registrar 220 that the Buyer 120 desires to purchase the domain name. (Step 1010) The Aftermarket Platform 100 may facilitate the transfer of the domain name from the Seller controlled account 600 of the Losing Registrar 210 to the Buyer controlled account 610 of the Gaining Registrar 220. (Step 1020) In addition, the Aftermarket Platform 100 may facilitate or assist in the collection of funds from the Buyer 120 (preferably with the cooperation of the Gaining Registrar 220) and the disbursement of funds to the Seller 110 (preferably with the cooperation of the Losing Registrar 210). (Step 1030)

Aftermarket Platform—Fast Transfer/Domain Listing Service

Referring to FIGS. 1-7 and 11, in another embodiment an Aftermarket Platform 100 may receive an agreement executed by a Seller 110. The agreement may permit a domain name registered to the Seller 110 to be transferred, only after a Buyer 120 has agreed to purchase the domain name and without further action from the Seller 110, from a Seller controlled account 600 of the Losing Registrar 210 to a Buyer controlled account 610 of the Gaining Registrar 220. The agreement is preferably executed by the Seller 110 prior to making the domain name available to the Buyer 120 for purchase. (Step 1000)

The Aftermarket Platform 100 may communicate a notification to a plurality of Registrars that triggers one or more Registrars in the plurality of Registrars to list the domain name on one or more websites as available for purchase to a plurality of potential Buyers 120. (Step 1100)

The Aftermarket Platform 100 may receive a communication from the Gaining Registrar 220 that the Buyer 120 desires to purchase the domain name. (Step 1010) The Aftermarket Platform 100 may facilitate the transfer of the domain name from the Seller controlled account 600 of the Losing Registrar 210 to the Buyer controlled account 610 of the Gaining Registrar 220. (Step 1020) The Aftermarket Platform 100 may also facilitate the collection of funds from the Buyer 120 (preferably with the cooperation of the Gaining Registrar 220) and the disbursement of funds to the Seller 110 (preferably with the cooperation of the Losing Registrar 210). (Step 1030)

Aftermarket Platform—Monitor Transferability of Domain Name

Referring to FIGS. 1-7 and 12, in another embodiment an Aftermarket Platform 100 may receive an agreement executed by a Seller 110 that permits a domain name registered to the Seller 110 to be transferred, only after a Buyer 120 has agreed to purchase the domain name and without further action from the Seller 110, from a Seller controlled account 600 of a Losing Registrar 210 to a Buyer controlled account 610 of a Gaining Registrar 220. In preferred embodiments the agreement is executed by the Seller 110 prior to making the domain name available to the Buyer 120 for purchase. (Step 1000)

The Aftermarket Platform 100 may communicate a notification to a plurality of Registrars that triggers one or more Registrars in the plurality of Registrars to list the domain name on one or more website as available for purchase to a plurality of potential Buyers 120. (Step 1100) The Aftermarket Platform 100 may receive a notification from the Losing Registrar 210 that the domain name is nontransferable from the Seller controlled account 600. (Step 1200) Based on the notification, the Aftermarket Platform 100 may prevent the Buyer 120 from purchasing the domain name, possibly by sending a communication to the plurality of Registrars to stop listing the domain name as available for purchase. (Step 1210)

Losing Registrar—Fast Transfer

Referring to FIGS. 1-7 and 13, in another embodiment a Losing Registrar 210 may register a domain name to a Seller 110. (Step 1300) The Losing Registrar 210 may manage the domain name in a Seller controlled account 600, wherein the Seller 110 has executed an agreement that permits the domain name to be transferred, only after a Buyer 120 has agreed to purchase the domain name and without further action from the Seller 110, from the Seller controlled account 600 of the Losing Registrar 210 to a Buyer controlled account 610 of a Gaining Registrar 220. In a preferred embodiment, the agreement is executed prior to making the domain name available to the Buyer 120 for purchase. (Step 1310)

The Losing Registrar 210 may receive a communication from an Aftermarket Platform 100 or a Gaining Registrar 220 that a Buyer 120 has purchased the domain name from the Seller 110. (Step 1320) The Losing Registrar 210 may facilitate the transfer of the domain name from the Seller controlled account 600 of the Losing Registrar 210 to the Buyer controlled account 610 of the Gaining Registrar 220. (Step 1330) The Losing Registrar 210 may also facilitate the collection of funds from the Buyer 120 (preferably with the cooperation of the Gaining Registrar 220) and the disbursement of funds to the Seller 110. (Step 1340)

Losing Registrar—Fast Transfer/Domain Name Listing Service

Referring to FIGS. 1-7 and 14, in another embodiment a Losing Registrar 210 may register a domain name to a Seller

110. (Step 1300) The Losing Registrar 210 may manage the domain name in a Seller controlled account 600. In a preferred embodiment, the Seller 110 executes an agreement that permits the domain name to be transferred, only after a Buyer 120 has agreed to purchase the domain name and without further action from the Seller 110, from the Seller controlled account 600 of the Losing Registrar 210 to a Buyer controlled account 610 of a Gaining Registrar 220. The agreement may be executed prior to making the domain name available to the Buyer 120 for purchase. (Step 1310)

The Losing Registrar 210 may communicate the agreement to an Aftermarket Platform 100 that triggers the Aftermarket Platform 100 to communicate a notification to a plurality of Registrars. That in turn may trigger one or more Registrars in the plurality of Registrars to list the domain name on one or more websites as available for purchase to a plurality of potential Buyers 120. (Step 1400)

The Losing Registrar 210 may receive a communication from an Aftermarket Platform 100 or a Gaining Registrar 220 that a Buyer 120 has purchased the domain name from the Seller 110. (Step 1320) The Losing Registrar 210 may facilitate the transfer of the domain name from the Seller controlled account 600 of the Losing Registrar 210 to the Buyer controlled account 610 of the Gaining Registrar 220. (Step 1330) The Losing Registrar 210 may also facilitate the collection of funds from the Buyer 120 (preferably with the cooperation of the Gaining Registrar 220) and the disbursement of funds to the Seller 110. (Step 1340)

Losing Registrar—Monitor Transferability of Domain Name

Referring to FIGS. 1-7 and 15, in another embodiment a Losing Registrar 210 may register a domain name to a Seller 110. The Seller 110 may manage the domain name from a Seller controlled account 600 of a Losing Registrar 210 and the Seller 110 may have executed an agreement. The agreement may permit the domain name to be transferred, only after a Buyer 120 has agreed to purchase the domain name and without further action from the Seller 110, from the Seller controlled account 600 of a Losing Registrar 210 to a Buyer controlled account 610 of a Gaining Registrar 220. The agreement is preferably executed prior to making the domain name available to the Buyer 120 for purchase. (Step 1500)

The Losing Registrar 210 may communicate the agreement to an Aftermarket Platform 100 that triggers the Aftermarket Platform 100 to communicate a notification to a plurality of Registrars. The notification to the plurality of Registrars may trigger one or more Registrars in the plurality of Registrars 700-703 to list the domain name on one or more websites as available for purchase to a plurality of potential Buyers 120. (Step 1400)

The Losing Registrar 210 may monitor the transferability of the domain name from the Seller controlled account 600. (Step 1510) The domain name may become nontransferable, as non-limiting examples, if the Seller 110 cancels the listing of the domain name in the Domain Name Aftermarket 130, the domain name expires or is no longer registered to the Seller 110, a legal order from a court is received ordering the domain name to be held, the domain name becomes part of a legal proceeding, fraudulent or vice activity is detected associated with the domain name and/or the domain name is transferred to another account or to another Registrar 700-703. If the domain name becomes nontransferable from the Seller controlled account 600, the Losing Registrar 210 may notify an Aftermarket Platform 100 that the domain name is nontransferable. The notification to the Aftermarket Platform 100 may trigger the Aftermarket Platform 100 to prevent the Buyer 120 from purchasing the domain name, possibly by sending a communication to the plurality of Registrars 700-703 to stop listing the domain name as available for purchase to the plurality of potential Buyers 120. (Step 1520)

Gaining Registrar—Fast Transfer

Referring to FIGS. 1-7 and 16, in another embodiment a Gaining Registrar 220 may receive a domain name transferred from a Seller controlled account 600 of a Losing Registrar 210 to a Buyer controlled account 610 of a Gaining Registrar 220. (Step 1600) The domain name may be registered to a Seller 110 by the Losing Registrar 210. (Step 1610) The Seller 110 may execute an agreement that permits the domain name to be transferred, only after a Buyer 120 has agreed to purchase the domain name and without further action from the Seller 110, from a Seller controlled account 600 of the Losing Registrar 210 to the Buyer controlled account 610 of the Gaining Registrar 220. In preferred embodiments, the agreement is executed prior to making the domain name available to the Buyer 120 for purchase. (Step 1620) The Gaining Registrar 220 may register the domain name to the Buyer 120 (Step 1630) and receive instructions from the Buyer 120 to manage the domain name in the Buyer controlled account 610 (Step 1640).

Gaining Registrar—Fast Transfer/Domain Name Listing Service

Referring to FIGS. 1-7 and 17, in another embodiment a Gaining Registrar 220 may receive a notification from an Aftermarket Platform 100 to list a domain name on a websites as available for purchase to a plurality of potential Buyers 120. (Step 1700) The Gaining Registrar 220 may receive the domain name transferred from a Seller controlled account 600 of a Losing Registrar 210 to a Buyer controlled account 610 of the Gaining Registrar 220. (Step 1600) The domain name may have been registered to the Seller 110 by the Losing Registrar 210. (Step 1610) The Seller 110 may have executed an agreement that permits the domain name to be transferred, only after a Buyer 120 has agreed to purchase the domain name and without further action from the Seller 110, from a Seller controlled account 600 of the Losing Registrar 210 to the Buyer controlled account 610 of the Gaining Registrar 220. In a preferred embodiment, the agreement is executed prior to making the domain name available to the Buyer 120 for purchase. (Step 1620) The Gaining Registrar 220 may register the domain name to the Buyer 120 (Step 1630) and receive instructions from the Buyer 120 to manage the domain name in the Buyer controlled account 610 (Step 1640).

Referring to FIGS. 1-7 and 18, in another embodiment a Gaining Registrar 220 may receive a first notification from an Aftermarket Platform 100 to list a domain name on a websites as available for purchase to a plurality of potential Buyers 120. (Step 1800) The Gaining Registrar 220 may list the domain name on the website as available for purchase to the plurality of potential Buyers 120. (Step 1810) The Gaining Registrar 220 may receive a second notification from the Aftermarket Platform 100 that the domain name is no longer available for purchase or is nontransferable. (Step 1820) The Gaining Registrar 220 may then remove the domain name on the website as available for purchase to the plurality of potential Buyers 120. (Step 1830)

Aftermarket Platform—Domain Name Offer

Referring to FIGS. 1-7 and 19, in another embodiment, an Aftermarket Platform 100 may communicate a notification to a plurality of Registrars 700-703 that triggers one or more Registrars in the plurality of Registrars 700-703 to list a domain name on one or more websites as available for purchase to a plurality of potential Buyers. The domain name may be registered to a Seller by a Losing Registrar and the domain name may have expired, but remains in the control of the Losing Registrar. (Step 1900) The Aftermarket Platform 100 may receive directly or via a Gaining Registrar 220 an offer from a Buyer 120 for the domain name. (Step 1910) The Aftermarket Platform 100 may communicate directly or via the Losing Registrar 210, the offer to the Seller 110. (Step 1920) The Aftermarket Platform 100 may receive directly or via the Losing Registrar 210, an acceptance from the Seller 110 to the offer from the Buyer 120. (Step 1930) The Aftermarket Platform 100 may facilitate the transfer of the domain name from the Seller controlled account 600 of the Losing Registrar 210 to a Buyer controlled account 610 of the Gaining Registrar 220. (Step 1940) The Aftermarket Platform 100 may also facilitate the collection of funds from the Buyer 120 (preferably with the cooperation of the Gaining Registrar 220) and the disbursement of funds to the Seller 110 (preferably with the cooperation of the Losing Registrar 210) corresponding to the offer from the Buyer 120 to the Seller 110. (Step 1950)

Aftermarket Platform—Domain Name Offer-Counteroffer

Referring to FIGS. 1-7 and 20, in another embodiment an Aftermarket Platform 100 may communicate a notification to a plurality of Registrars 700-703 that triggers one or more Registrars in the plurality of Registrars 700-703 to list a domain name on one or more websites as available for purchase to a plurality of potential Buyers. The domain name may be registered to a Seller by a Losing Registrar and the domain name may have expired, but remains in the control of the Losing Registrar. (Step 1900) The Aftermarket Platform 100 may receive directly or via a Gaining Registrar 220, an offer from a Buyer 120 for the domain name. (Step 1910) In some embodiments, additional offers may be received (possibly via different potential Gaining Registrars 220) from additional potential Buyers 120. The Aftermarket Platform 100 may communicate directly or via the Losing Registrar 210 the offer(s) to the Seller 110. (Step 1920) The Aftermarket Platform 100 may communicate directly or via the Gaining Registrar 220, a counteroffer from the Seller 110 to the Buyer 120. (Step 2000) Any number of counteroffers may be exchanged between the Seller 110 and the Buyer 120. Either the Seller 110 or the Buyer 120 (or in some cases neither) may accept the last counteroffer from the other party. As a non-limiting example, the Aftermarket Platform 100 may receive directly or via the Gaining Registrar 220, an acceptance from the Buyer 120 to the last counteroffer from the Seller 110. (Step 2010) The Aftermarket Platform 100 may facilitate the transfer of the domain name from the Seller controlled account 600 of the Losing Registrar 210 to a Buyer controlled account 610 of the Gaining Registrar 220. (Step 1940) The Aftermarket Platform 100 may also facilitate the collection of funds from the Buyer 120 (preferably with the cooperation of the Gaining Registrar 220) and the disbursement of funds to the Seller 110 (preferably with the cooperation of the Losing Registrar 210) corresponding to the last counteroffer from the Buyer 120 to the Seller 110. (Step 1950)

Losing Registrar—Domain Name Offer

Referring to FIGS. 1-7 and 21, in another embodiment a Losing Registrar 210 registers a domain name to a Seller 110. (Step 2100) The Losing Registrar 210 may communicate to an Aftermarket Platform 100 that the domain name has expired, but is preferably still under the control of the Losing Registrar 210. (Step 2110) The Losing Registrar 210 may receive an offer from a Buyer 120 to purchase the domain name from the Seller 110 which may be presented to the Seller 110. (Step 2120) In some embodiments, additional offers may be received (possibly via different potential Gaining Registrars 220) from additional potential Buyers 120. The Losing Registrar 210 may receive an acceptance from the Seller 110 to the offer from the Buyer 120. (Step 2130) The Losing Registrar 210 may facilitate the transfer of the domain name from a Seller controlled account 600 of the Losing Registrar 210 to a Buyer controlled account 610 of the Gaining Registrar 220. (Step 2140) The Losing Registrar 210 may also facilitate a collection of funds from the Buyer 120 (preferably with the cooperation of the Gaining Registrar 220) and a disbursement of funds to the Seller 110 corresponding to the offer. (Step 2150)

Losing Registrar—Domain Name Offer-Counteroffer

Referring to FIGS. 1-7 and 22, in another embodiment a Losing Registrar 210 registers a domain name to a Seller 110. The Losing Registrar 210 may communicate to an Aftermarket Platform 100 that the domain name has expired, but is preferably still under the control of the Losing Registrar 210. The Losing Registrar 210 may receive an offer from a Buyer 120 to purchase the domain name from the Seller 110 which may be communicated to the Seller 110. In some embodiments, additional offers may be received (possibly via different potential Gaining Registrars 220) from additional potential Buyers 120. The Losing Registrar 210 may receive a counteroffer from the Seller 110 to purchase the domain name by the Buyer 120. Any number of counteroffers may be exchanged between the Seller 110 and the Buyer 120. Either the Seller 110 or the Buyer 120 (or in some cases neither) may accept the last counteroffer from the other party. As a non-limiting example, the Losing Registrar 210 may receive an acceptance from the Buyer 120 to the last counteroffer from the Seller 110 which may be communicated to the Seller 110. The Losing Registrar 210 may facilitate the transfer of the domain name from a Seller controlled account 600 of the Losing Registrar 210 to a Buyer controlled account 610 of the Gaining Registrar 220. The Losing Registrar 210 may also facilitate a collection of funds from the Buyer 120 (preferably with the cooperation of the Gaining Registrar 220) and the disbursement of funds to the Seller 110 corresponding to the last counteroffer.

Payment Methods for a Domain Name Aftermarket

Referring to FIGS. 24, 25, 26, 27 and 28, a buyer funds may be collected from a Buyer 120 by a plurality of hardware servers. (Step 2800) These hardware servers may comprise, as non-limiting examples, a Gaining Registrar 220, an Aftermarket Platform 100 or a Reseller Site 2500. The Gaining Registrar 200 may use a Registrar Merchant Account 2400, the Aftermarket Platform 100 may use an Aftermarket Platform Merchant Account 2420 and the Reseller Site 2500 may use a Registrar Merchant Account 2400. These merchant accounts may be used to collect a funds from the Buyer 120 for a domain name. One or more Payment Processors 2410, 2415 may be used by the Registrar Merchant Account 2400, the Aftermarket Platform Merchant Accounts 2420 and the Registrar Merchant Accounts 2400 to process the transactions and the settlement of the transaction. Ownership of the domain name may be transferred from a Seller 110 to a Third Party. (Step 2810) Ownership may be changed through a Registry 200 responsible for a top-level domain (TLD) of the domain name and the WHOIS database may be changed to reflect the Third Party as the new registrant of the domain name. Ownership of the domain name may be transferred from the Third Party to the Buyer 120. (Step 2820) The WHOIS database may be changed to reflect the Buyer 120 as the new registrant of the domain name. A seller funds may be disbursed to the Seller 110 by a Losing Registrar 210 or an Aftermarket Platform 100 preferably if, and only if, the domain name was successfully transferred to the Buyer 120. (Step 2830) The Third Party may be the Aftermarket Platform 100 or another legal entity different from the Losing Registrar 210 and the Gaining Registrar 220. The seller funds may be the buyer funds with any commissions or fees removed from the buyer funds. The Gaining Registrar 220 and the Losing Registrar 210 may be the same or different registrars.

With reference to FIGS. 24, 25, 26, 27 and 29, a buyer funds may be collected from a Buyer 120 by a Gaining Registrar 220. Ownership of a domain name may be transferred from a Seller 110 to a Third Party by one or more hardware servers. (Step 2900) The WHOIS database may be changed to reflect the Third Party as the new registrant/owner of the domain name. Ownership of the domain name may be transferred from the Third Party to the Buyer 120. The WHOIS database may be again changed to reflect the Buyer 120 as the new registrant of the domain name. The Losing Registrar 210 or the Aftermarket Platform 100 may disburse a seller funds to the Seller 110, preferably if, and only if, the ownership of the domain name was successfully transferred to the Buyer 120. The Gaining Registrar 220 and the Losing Registrar 210 may be the same or different registrars.

In another embodiment, the ownership of a domain name may be transferred from a Seller 110 to a Third Party, wherein a Gaining Registrar 220 may collect a buyer funds from a Buyer 120 purchasing the domain name. A registrant in the WHOIS database may be changed from the Seller 110 to the Third Party to reflect the new ownership. The ownership of the domain name may be transferred from the Third Party to the Buyer 120, wherein a Losing Registrar 210 or an Aftermarket Platform 100 may disburse a seller funds to the Seller 110 selling the domain name. The registrant in the WHOIS database may be changed from the Third Party to the Buyer 120 to reflect the new ownership. In a preferred embodiment, the Losing Registrar 210 or the Aftermarket Platform 100 disburses the seller funds to the Seller 110 if, and only if, the domain name was successfully transferred from the Seller 110 to the Third Party and/or successfully transferred from the Third Party to the Buyer 120. The Gaining Registrar 220 and the Losing Registrar 210 may be the same or different registrars. In preferred embodiments, the Third Party is not the Gaining Registrar 220 or the Losing Registrar 210.

With reference to FIGS. 24, 25, 26, 27 and 30, an electronic shopping cart may collect a funds from a Buyer 120. The funds may comprise: 1) only a non-escrow funds, 2) only the non-escrow funds and an escrow funds, or 3) only the escrow funds. Non-escrow funds are collected by a Gaining Registrar 220 from a Buyer 120 in exchange for a product or service from the Gaining Registrar 220. Escrow funds are collected by the Gaining Registrar 220 from the Buyer 120 in exchange for a transfer of ownership of the domain name from the Seller 110 to the Buyer 120. (Step 3000) If, and only if, the funds comprise only non-escrow funds, then transfer the non-escrow funds to the Gaining Registrar 220. (Step 3010) If, and only if, the funds comprise only non-escrow funds and escrow funds, then transfer the funds to a Third Party where the Third Party transfers the non-escrow funds to the Gaining Registrar 220 and the Losing Registrar 210 or an Aftermarket Platform 100 disburses the escrow funds to the Seller 110. (Step 3020) If, and only if, the funds comprise only escrow funds, then transfer the funds to the Third party and the Losing Registrar 210 or the Aftermarket Platform 100 disbursing the escrow funds to the Seller 110. (Step 3030) In preferred embodiments, the domain name may be transferred from a Seller controlled account with the Losing Registrar 210 to a Buyer controlled account with the Gaining Registrar 220. In other preferred embodiments, a registrant in the WHOIS database for the domain name may be changed from the Seller 110 to the Third Party and then from the Third Party to the Buyer 120. In other preferred embodiments, the Losing Registrar 210 or Aftermarket Platform 100 disburses the escrow funds to the Seller 110 of the domain name, if, and only if, the ownership of the domain name is transferred successfully to the Buyer 120. In these embodiments, the Gain Registrar and the Losing Registrar 210 may be the same or different registrars. In these embodiments, the Third Party is preferably not the Gaining Registrar 220 or the Losing Registrar 210.

Expired Domain Name Auction Across Multiple Registrars

Figure 43:
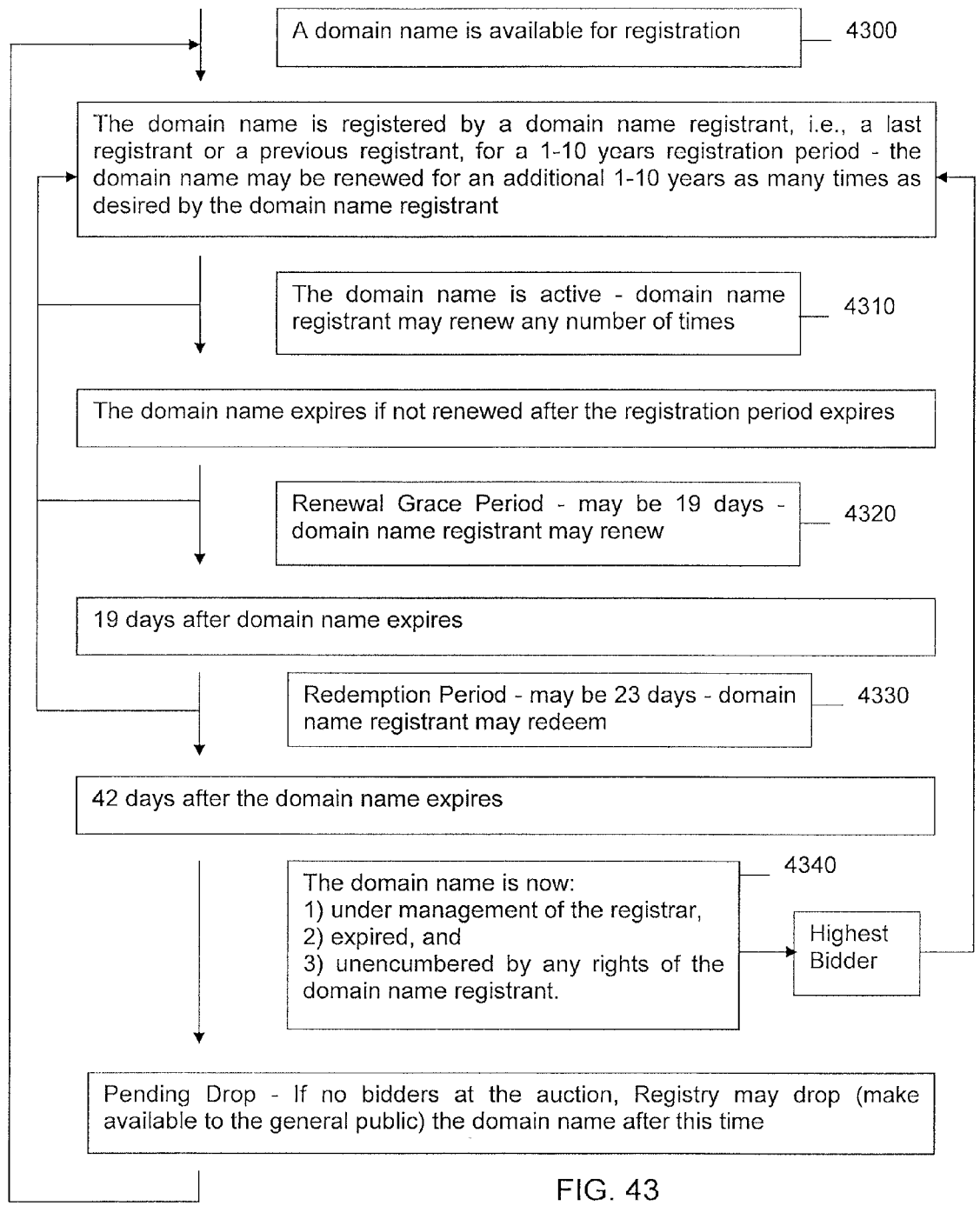
FIG. 43 is a non-limiting example of a life cycle of a domain name.

With reference to FIG. 43, a non-limiting example of a domain name life cycle will be described. This is only an example as the life cycle of a domain name may change from registrar to registrar, top-level domain to top-level domain and time to time. A domain names typically starts out as available. (Step 4300) A domain name registrant, also referred to as a last registrant or a previous registrant, may register the available domain name for, as a non-limiting example, 1-10 years. The domain name registrant may renew the domain name for an additional 1-10 years as many times as desired by the domain name registrant. (Step 4310) If the domain name registrant does not renew the domain name before the end of the registration period, the domain name may become expired. The domain name registrant may be able to renew the domain name during a renewal grace period (which may last for 19 days as a non-limiting example) (Step 4320) or redeem the domain name during a redemption period (which may last for 23 days as a non-limiting example) (Step 4330). If the domain name registrant renews or redeems the domain name, the domain name registrant retains rights in the domain name. While a renewal grace period and a redemption period were shown and discussed for the domain name registrant to renew/redeem the domain name, other embodiments may include fewer, the same or more periods for the domain name registrant to retain rights in the domain name. Also, other embodiments may use different lengths of time for the periods in the life cycle of the domain name than those given in this example.

If the domain name registrant lets the domain name expire and the domain name registrant does not renew or redeem the domain name, the domain name may enter a time period where the domain name is still under management of the registrar (Losing Registrar 210), the domain name has expired and the domain name is unencumbered by any rights of the domain name registrant (last registrant or previous registrant). (Step 4340) The domain name is unencumbered by any rights of a domain name registrant (or last registrant or previous registrant) if the domain name registrant cannot reclaim, redeem or otherwise regain ownership of the domain name using rights belonging exclusively to the registrant of the domain name. During this time period, but before the domain name is dropped by a Registry, an auction may be held for the expired domain name. The expired domain name may be listed for purchase/bidding on websites operated by a plurality of domain name registrars. An Aftermarket Platform 100 may coordinate the lists of available expired domain names from a plurality of registrars and the plurality of bids from a plurality of potential buyers at the plurality of registrars. The domain name may be renewed and transferred from the Losing Registrar 210 to a Gaining Registrar 220 if a Buyer 120, from the Gaining Registrar 220, enters a highest bid for the domain name. If no buyers bid on the domain name, then the domain name may be dropped by the Registry 200 and become available for registration.

Losing Registrar Expired Domain Name Auction

With reference to FIGS. 31A, 31B, 31C, 31D, 32, 33, 34, 35, 36 and 37, a Losing Registrar 210 may assist in creating an auction for expired domain names across multiple domain name registrars. The Losing Registrar 210 may start by registering a domain name to a last registrant. (Step 3700) The Losing Registrar 210 may communicate the domain name as available for purchase to an Aftermarket Platform 100 when the domain name is: 1) under management of the Losing Registrar 210, 2) expired and 3) unencumbered by any rights of the last registrant. (Step 3710) The Losing Registrar 210 may receive a list of a plurality of domain names that are available for purchase from the Aftermarket Platform 100. Each domain name in the plurality of domain names is preferably 1) under management by a registrar that is not the Losing Registrar 210, 2) expired and 3) unencumbered by any rights of a previous registrant. (Step 3720) The Losing Registrar 210 may display the domain name and the plurality of domain names that are available for purchase/bidding on a website to a plurality of potential buyers. (3730) The Losing Registrar 210 may receive one or more bids for the domain name or for a one or more domain names in the plurality of domain names. If a Buyer 120 selects the domain name for purchase using a website operated by a Gaining Registrar 220 and the Buyer 120 has entered the highest bid at the end of the auction, the Losing Registrar 210 may transfer the domain name to the Gaining Registrar 220 (Step 3740).

With reference to FIGS. 31A, 31B, 31C, 31D, 32, 33, 34, 35, 36 and 40, a Losing Registrar 210 may assist in creating an auction for expired domain names across multiple domain name registrars 700. The Losing Registrar 210 may comprise a registrar function 3620, a communication system 3630 and one or more servers 3640. The registrar function 3620 may be able to register a domain name to a domain name registrant, i.e., a last registrant or a previous registrant 3600. Later, the registrar function 3620 may be able to renew the domain name when: 1) the domain name is under management of the Losing Registrar 210, 2) the domain name has expired, 3) the domain name is unencumbered by any rights of the domain name registrant and 4) a Buyer 120 has bid on the domain name. The registrar function 3620 may also be able to transfer the domain name to a Gaining Registrar 220. The communication system 3630 may be able to send a list of domain names that are available for purchase to an Aftermarket Platform 100. The domain names are preferably: 1) under management of the Losing Registrar 210, 2) have expired and 3) are unencumbered by any rights of a last registrant. The communication system 3630 may also be able to receive a list of domain names that are available for purchase from the Aftermarket Platform 100. The domain names are preferably: 1) under management by the Gaining Registrar 220, 2) have expired and 3) are unencumbered by any rights of a previous registrant. The one or more servers 3640 may display the list of domain names from the Aftermarket Platform 100 on a website 3650 to a plurality of potential buyers, receive one or more bids from the plurality of potential buyers, and transmit the one or more bids to the Aftermarket Platform 100.

Gaining Registrar Expired Domain Name Auction

With reference to FIGS. 31A, 31B, 31C, 31D, 32, 33, 34, 35, 36 and 38, a Gaining Registrar 220 may assist in creating an auction for expired domain names across multiple domain name registrars. The Gaining Registrar 220 may receive a list of a plurality of domain names that are available for purchase from an Aftermarket Platform 100. Each domain name in the plurality of domain names is preferably: 1) under management by a registrar that is not the Gaining Registrar 220, 2) expired and 3) unencumbered by any rights of a previous registrant. (Step 3800) The Gaining Registrar 220 may display the plurality of domain names available for purchase on a website to a plurality of potential buyers. (Step 3810) The Gaining Registrar 220 may receive a plurality of bids for one or more domain names in the plurality of domain names and a highest bid at the end of the auction from a Buyer 120 for a domain name. The Gaining Registrar 220 may collect a funds from the Buyer 120 for the purchase of the domain name. (Step 3820) A Losing Registrar 210 may renew and transfer the domain name to the Gaining Registrar 220. The Gaining Registrar 220 may take the domain name under management and register the domain name to the Buyer 120. (Step 3830) Alternatively, the Losing Registrar 210 may have registered the domain name to the Buyer 120 before transferring the domain name to the Gaining Registrar 220.

With reference to FIGS. 31A, 31B, 31C, 31D, 32, 33, 34, 35, 36 and 41, a Gaining Registrar 220 may assist in creating an auction for expired domain names across multiple domain name registrars. The Gaining Registrar 220 may comprise a communication system 3635, one or more servers 3645 running a website and a registrar function 3625. The communication system 3635 may communicate a first list of a first plurality of domain names that are available for purchase to an Aftermarket Platform 100. The first plurality of domain names are: 1) under management of the Gaining Registrar 220, 2) expired and 3) are unencumbered by any rights of a last or a previous registrant. The communication system 3635 may also receive a second list of a second plurality of domain names. The second plurality of domain names may be: 1) under management by a Losing Registrar 210 and possibly other registers, 2) expired and 3 are unencumbered by any rights of a previous registrant. The one or more servers 3645 running the website may: 1) display the second plurality of domain names to a plurality of potential buyers, 2) receive one or more bids for one or more domain names from the plurality of potential buyers, 3) receive a highest bid from a Buyer 120 for a domain name in the second plurality of domain names, 4) transmit the one or more bids and the highest bid to the Aftermarket Platform 100, and 5) collect funds for the purchase of the domain name from the Buyer 120. The registrar function 3625 may be configured to receive the domain name transferred from the Losing Registrar 210 (the Losing Registrar 210 may renew the domain name) and register the domain name to the Buyer 120. Alternatively, the Losing Registrar 210 may register the domain name to the Buyer 120 before transferring the domain name to the Gaining Registrar 220.

Aftermarket Platform Expired Domain Name Auction

With reference to FIGS. 31A, 31B, 31C, 31D, 32, 33, 34, 35, 36 and 39, an Aftermarket Platform 100 may assist in creating an auction for expired domain names across multiple domain name registrars. The Aftermarket Platform 100 may receive a list of available domain names from a Losing Registrar 210 (and optionally from a Gaining Registrar 220 as well as other registrars). Each domain name in the list is preferably: 1) under management of a registrar, 2) has expired and 3) is unencumbered by any rights of a previous registrant or last registrant. (Step 3900) The Aftermarket Platform 100 may distribute the list of domain names available for purchase to a Gaining Registrar 220 (and optionally the Losing Registrar 210 as well as other registrars). The Gaining Registrar 220 may display on a website the domain names to a plurality of potential buyers. The Gaining Registrar 220 may receive one or more bids from potential buyers and a highest bid from a Buyer 120 for a domain name before the close of the auction. The Gaining Registrar 220 may collect a funds from the Buyer 120 for the ownership of the domain name. The Losing Registrar 210 may renew the domain name and transfer the domain name to the Gaining Registrar 220. The Gaining Registrar 220 may register the domain name to the Buyer 120. (Step 3910) Alternatively, the Losing Registrar 210 may register the domain name to the Buyer 120 before transferring the domain name to the Gaining Registrar 220.

With reference to FIGS. 31A, 31B, 31C, 31D, 32, 33, 34, 35, 36 and 42, an Aftermarket Platform 100 may assist in creating an auction for expired domain names. The Aftermarket Platform 100 may comprise a communication system 3660, an auction system 3670 and notification system 3680. The communication system 3660 may receive one or more lists comprising a plurality of domain names available for purchase, wherein the plurality of domain names comprises one or more domain names from one or more registrars in a plurality of registrars. Each domain name in the plurality of domain names is: 1) under management by a registrar in the plurality of registrars, 2) expired and 3) unencumbered by any rights of a previous registrant. The communication system 3660 may communicate the one or more lists comprising the plurality of domain names available for purchase to the plurality of registrars 700. The auction system 3670 may be configured to receive one or more bids from a plurality of bidders for each domain name in the plurality of domain names. The auction system 3670 may also, for each domain name in the plurality of domain names, determine: 1) a highest bidder in the plurality of bidders, a Gaining Registrar 220 in the plurality of registrars used by the highest bidder and a Losing Registrar 210 in the plurality of registrars that has each domain name under management. The notification system 3680 may be configured to notify the Losing Registrar 210 to renew each domain name and transfer each domain name to the Gaining Registrar 220 for each domain name in the plurality of domain names that has been purchased and/or bid upon. The notification system 3680 may also be configured to notify the Gaining Registrar 220 for each domain name in the plurality of domain names to: 1) collect a funds from the highest bidder, 2) receive each domain name transferred from the Losing Registrar 210 and 3) register each domain name to the highest bidder. Alternatively, the Losing Registrar 210 may register each domain name to the Buyer 120 before transferring each domain name to the Gaining Registrar 220.

Selling Never Before Registered Domain Names at Variable Prices

New gTLD (general Top-Level Domains) holders, i.e., an entity or individual that has exclusive rights to register domain names having the new gTLD to registrants, possibly through a Registry 200 and one or more Gaining Registrars 220, may identify a number of high value domain names. As a non-limiting range, a new gTLD holder may identify anywhere between 2,500 to 1,000,000 high value premium domain names comprising the same gTLD. While this may be a typical range, some new gTLDs may have more or fewer high value premium domain names. These domain names may be referred to as registry premium domain names or premium domain names. In some embodiments, each of these domain names may be listed for sale (registration) at a high value registry creation cost, i.e., price point, registration fee, list price, or purchase price and a high value renewal cost for each subsequent year. In these embodiment, domain names comprising the gTLD, but not identified as a premium domain name may be sold, listed and/or registered for a lower value registry creation cost (a default purchase price) and a lower renewal cost (a default renewal cost).

In other embodiments, multiple tiers (price points) may be created and high value domain names comprising the gTLD may be assigned to one of the tiers. The more desirable the domain name, the higher the tier and the price point for the domain name. Domain names that are not high value domain names may be assigned, preferably near the time of registration of the domain name, to the lowest tier for the purchase price and the renewal cost.

In another embodiment, each domain name comprising a gTLD may be individually evaluated for desirability and assigned a customized registry creation cost and a customized renewal cost. The customized registry creation cost (which may also be referred to as the purchase price, list price and/or registration price in all embodiments) preferably is related to the amount of Internet traffic the domain name is likely to generate. The higher the likely generated future Internet traffic, market valuation, how easy it is to remember, or how easy it is to brand, the more desirable is the domain name and the higher the registry creation cost and renewal cost for the domain name.

These embodiments create a variation in registry creation cost for domain names that have never been registered, but have the same top-level domain. These embodiments differ from previous cost models for a Registry 200 in which the registry creation cost and renewal cost are tied exclusively to the TLD, but not the domain name comprising the TLD or the second-level domain of the domain name.

For example, .com may have a registry creation cost of $8.03 at the time of registration and an $8.03 renewal cost for each subsequent year regardless of the actual domain name or second-level domain being registered. In contrast, as a non-limiting example, the gTLD .attorney may have 10,000-20,000 domain names that vary in price. As an example, the never before registered domain name boston attorney (due to its desirability and the likelihood of generating high future Internet traffic) may have a registry creation cost of $5,000 at the time of registration and a $200 renewal cost for each subsequent year, while henry12345.attorney may have a registry creation cost of $200 and a $10 renewal cost for each subsequent year due to its lack of desirability.

Gaining Registrars 220 that support the registration of new gTLDs may be required to support the cost structure set out by the Registry 200 (or gTLD holder). Additionally, a subset of the Registry 200 integration points, e.g., creation of a domain name or transfer of a domain name, may require the Gaining Registrar 220 to submit the cost with each domain name registration request to the Registry 200 or submit the cost to the Aftermarket Platform 100 that will then submit the cost to the Registry 200.

In another embodiment, the Aftermarket Platform 100 may be used to list for sale premium domain names on a plurality of different websites operated by a corresponding plurality of Registrars 700-703. To accomplish this, the Aftermarket Platform 100 may communicate to the plurality of Registrars 700-703 the premium domain names and their corresponding registry creation cost and renewal cost.

The plurality of Registrars 700-703 trying to sell the never before registered premium domain names having the same gTLD, but with variable registry creation costs may list or display on a website 3655 the domain names for sale with the registry creation cost as the premium list price. The plurality of Registrars 700-703 are preferably updated no less than daily by the Registry 200 or the Aftermarket Platform 100 as to the availability of the premium domain names. For example, premium domain names that are registered to Buyers 120 are removed from the list of premium domain names before being sent to the Aftermarket Platform 100 and/or the plurality of Registrars 700-703.

The Aftermarket Platform 100 may process the domain names through a domain name integrity check as previously described. This may require a modification to the registration check where the Aftermarket Platform 100 will mock the service to respond as registered with a Gaining Registrar 220 (static registrar of record) for the account previously used or a specific set of domain names.

After the Aftermarket Platform 100 domain name integrity check has the defined Gaining Registrar 220 (registrar of record), the Aftermarket Platform 100 may request that the Registry 200 initiate an opt-in process. The Registry 200 may mock this end point, or complete a check on availability, and if the domain is available for registration, respond with a success.

The Aftermarket Platform 100 may be extended to support a select premium promotion for the mock Gaining Registrar 220 previously returned.

The Aftermarket Platform 100 may be extended to support the fast transfer of the new gTLDs for the Gaining Registrar 220 previously returned. This may mean that any domain names listed and not registered with a Registrar 700-703 that supports premium promotion for that TLD may receive a request to move to a different Registrar 700-703. If there is no public Gaining Registrar 220, then the move messaging may be modified.

After a domain name is requested to be opted-in, the Registry 200 may send an opt-in to the Aftermarket Platform 100. The Registry 200 may mock this end point, or complete a check on availability, and if the domain is available for registration, respond with a success.

The Aftermarket Platform 100 may complete a nightly full synchronization with the Gaining Registrar 220 to maintain the proper list of names opted-in to premium promotion. This may address fault tolerance risks of the domain name availability and pricing in the Registry or gTLD holder portfolio, as outlined in earlier steps.

After a domain name is registered and no longer available for sale, the Registry 200 may send an opt-out notification to inform the Aftermarket Platform 100 or a plurality of Registrars 700-703 that the domain name is no longer available for sale. The Registry 200 may do so when the domain name is not sold through the Aftermarket Platform 100. The Aftermarket Platform 100 may request a Form of Authorization (FOA) from the Registry 200. The FOA may be a template for that portfolio and not be required to be implemented by the Registry 200.

Embodiments for a Registry 200 and a Gaining Registrar 220 will now be discussed for displaying on a website 3655 and selling never before registered domain names that have the same top-level domain, but having different registry creation costs (which should be broadly interpreted to include registration fees, list prices and/or purchase prices) and/or different renewal costs. These domain names may be displayed on websites 3655 operated by a plurality of Registrars 700-703, to a plurality of potential buyers. A Buyer 120 may select one or more of these domain names on a website 3655 operated by the Gaining Registrar 220, in the plurality of Registrars 700-703. The Gaining Registrar 220 may collect a purchase price and, with the cooperation of the Registry 200, register the selected one or more domain names to the Buyer 120.

In another embodiment, a Buyer 120 may search for a domain name at a Gaining Registrar 220. The Gaining Registrar 220 may search against an Aftermarket Platform 100 for premium domain names and possibly receive an exact match and/or spin results (domain names related in some manner to a search query entered by the Buyer 120). The Gaining Registrar 220 may have the option to go to the Registry 200 for an exact match. In these cases, the Aftermarket Platform 100 may continue to spin the results to produce alternate domain names that may be in the list of premium domain names. The Gaining Registrar 220 may be able to handle multiple results coming from two sources, i.e., the Registry 200 and the Aftermarket Platform 100 and spin one or both results for even more alternative domain names, wherein at least one of the alternative domain names is in the list of premium domain names (never before registered domain names with the same gTLD, but with variable purchase prices across the gTLD).

The Buyer 120 may add (select) a domain name from the premium domain names to the Buyer's shopping cart. The Gaining Registrar 220 may check the domain name availability with the Aftermarket Platform 100. The Aftermarket Platform 100 may check in the local inventory in substantially real-time to verify the added domain name is available.

The Buyer 120 may complete the payment with the Gaining Registrar 220. The Gaining Registrar 220 may place the domain name on hold with the Aftermarket Platform 100 to secure the sale. The Aftermarket Platform 100 may place the domain name on hold locally. The domain name may have, as a non-limiting example, a default 5 day hold, but that default hold time may vary with different registrars. In some embodiments, the check availability may happen before the domain name is put in the cart. The hold may happen when the domain name is put in the cart while the purchase is being finalized. The purchase may happen after the payments has been completed and the funds are collected.

The Aftermarket Platform 100 may check the availability and hold the domain name with the Registry 200. The Registry 200 preferably provides a mechanism to check the availability to validate registration state and place the domain name on hold to secure registration for the Gaining Registrar 220, and ultimately their Buyer 120.

When the Registry 200 receives a hold request from the Aftermarket Platform 100, the Registry 200 may place a temporary registration on the selected domain name. Typically, a Registry 200 will only support a 5 or 10 calendar day hold. This may be an issue for Gaining Registrars 220 that have a hold that extend beyond 5 days, as some may be up to 10 days in some embodiments. The Aftermarket Platform 100 may not be able to offer that hold as the Registry 200 might not be able to support this. The Registry 200 is preferably responsible for deleting the registration at the end of the 5 days unless the Aftermarket Platform 100 requests to unlock the domain name at a time of fast transfer prior to the 5 days.

The Gaining Registrar 220 may complete a purchase of the domain name with the Aftermarket Platform 100 and may fulfill the order as a fast-transfer. After the Gaining Registrar 220 successfully purchases the domain name, the Aftermarket Platform 100 may schedule a fast transfer to a Buyer 120. The Registry 200 may receive a hold and create a temporary registration.

The Aftermarket Platform 100 may submit an unlock and set an authentication code to the Registry 200. The Registry 200 may complete a registration delete. The Registry 200 may provide an unlock end point to delete the temporary registration, and mock the set authentication code end point.

The Aftermarket Platform, 100 may submit a request transfer to the Gaining Registrar 220 with the authentication code. When the Aftermarket Platform 100 submits a request transfer (requestTransfer), the Gaining Registrar 220 may proxy the request to the Registry 200. The Registry 200 may require a flag during the request transfer (requestTansfer) to the Registry 200 to enable the Registry 200 to intercept the request, check if the request is a Registry 200 premium domain name still available for registration, and complete a creation of domain for the Gaining Registrar 220.

After the Aftermarket Platform 100 receives a success on the request transfer (requestTransfer), the Aftermarket Platform 100 may send an acknowledgement (ack) to the Registry 200. The Registry 200 may check if the creation was complete and, if it was complete, return success.

After the Aftermarket Platform 100 receives a successful acknowledgement (ack) from the Registry 200, the Aftermarket Platform 100 may send a transfer complete (transferComplete) to the Gaining Registrar 220. The Gaining Registrar 220 may check to see if the transfer is complete with the Registry 200.

After the Gaining Registrar 220 confirms the registration, or "transfer", is complete, the Gaining Registrar 220 may update the WhoIs information and/or move the domain name into a Buyer controlled account 610. This may require input from a registrar and the Registry 200 to determine the sequence as the WhoIs information may be required during creation. The new gTLD holder or representative may receive funds post sale and after the transfer is complete.

Figure 44:
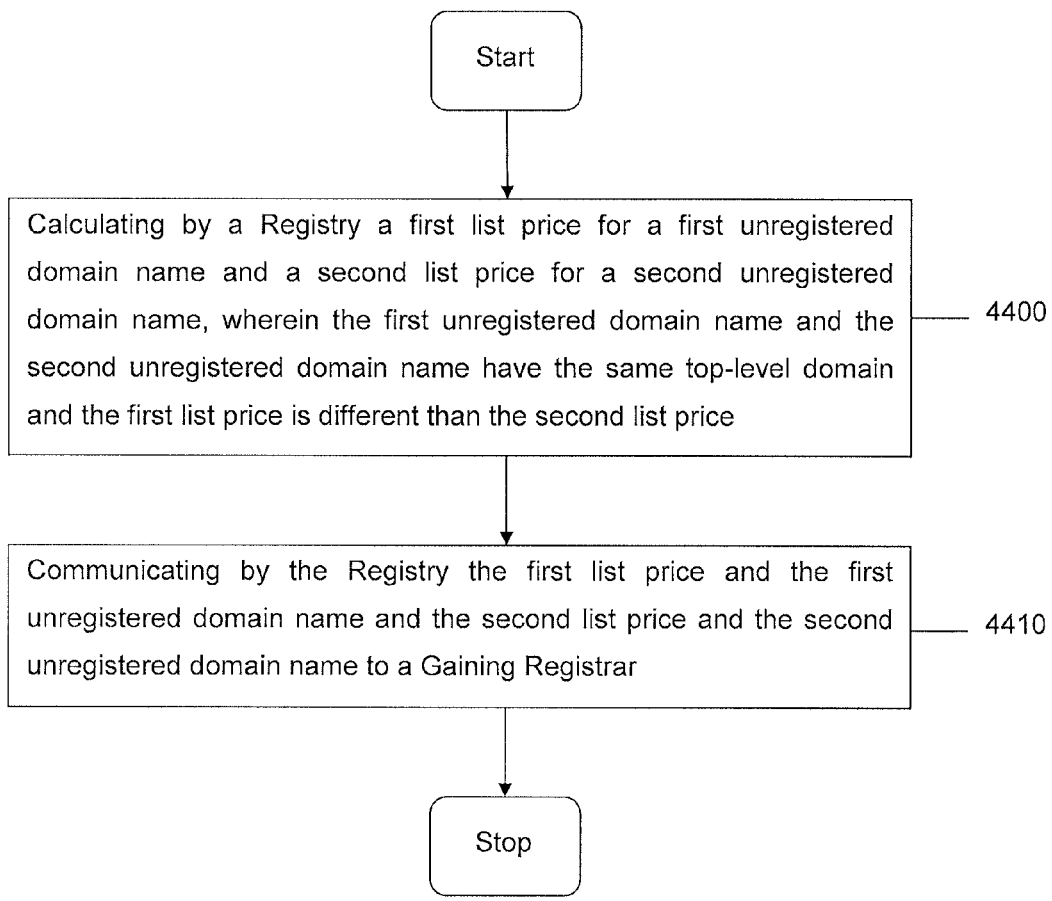
FIG. 44 is a flow diagram of a process for a Registry selling never before registered domain names with the same top-level domain at variable prices.

In another embodiment illustrated in FIG. 44, a Registry 200 (the Registry 200 may include a new gTLD holder) may calculate or determine different Registry creation costs for two or more domain names having the same top-level domain. (Step 4400) In preferred embodiments, the two or more domain names have never before been registered to a registrant and/or registered in the WHOIS database. The calculation may be based on the desirability of the domain name and not just the TLD. Never before registered domain names that are more likely to generate higher levels of Internet traffic may be priced higher than other never before registered domain names that have the same gTLD. As a non-limiting example, the historical Internet traffic of a second level domain combined with different TLDs may be used to determine the likely traffic for the second level domain combined with the new gTLD. The Registry 200 may communicate (typically via the Internet) the domain names and their corresponding different purchase prices to a plurality of Registrars 700-703. (Step 4410) The plurality of Registrars 700-703 may eventually include a Gaining Registrar 220. The Registry 200 may periodically resend different domain names and their corresponding list prices (or may send only changes and/or updates) to the plurality of Registrars 700-703 and preferably removes domain names that are no longer available and/or may change/edit/update purchase prices (Registry creation costs). The plurality of Registrars 700-703 may then display (list) one or more of the plurality of domain names on one or more websites 3655. Each Registrar 700-703 will typically operate one or more websites 3655 in order to display and sale the domain names to Buyers 120, i.e., domain name registrants. Registrars in the plurality of Registrars 700-703 that sale a domain name become the Gaining Registrar 220 for that domain name. The Gaining Registrar 220 may collect funds from the Buyer 120 and disburse the funds (or some part of the funds) to the Registry 200 and/or the new gTLD holder. The Registry 200 may register the purchased domain name to the Buyer 120. The Registry 200 may list the domain name and possibly the Buyer 120 in the WHOIS database.

Figure 45:
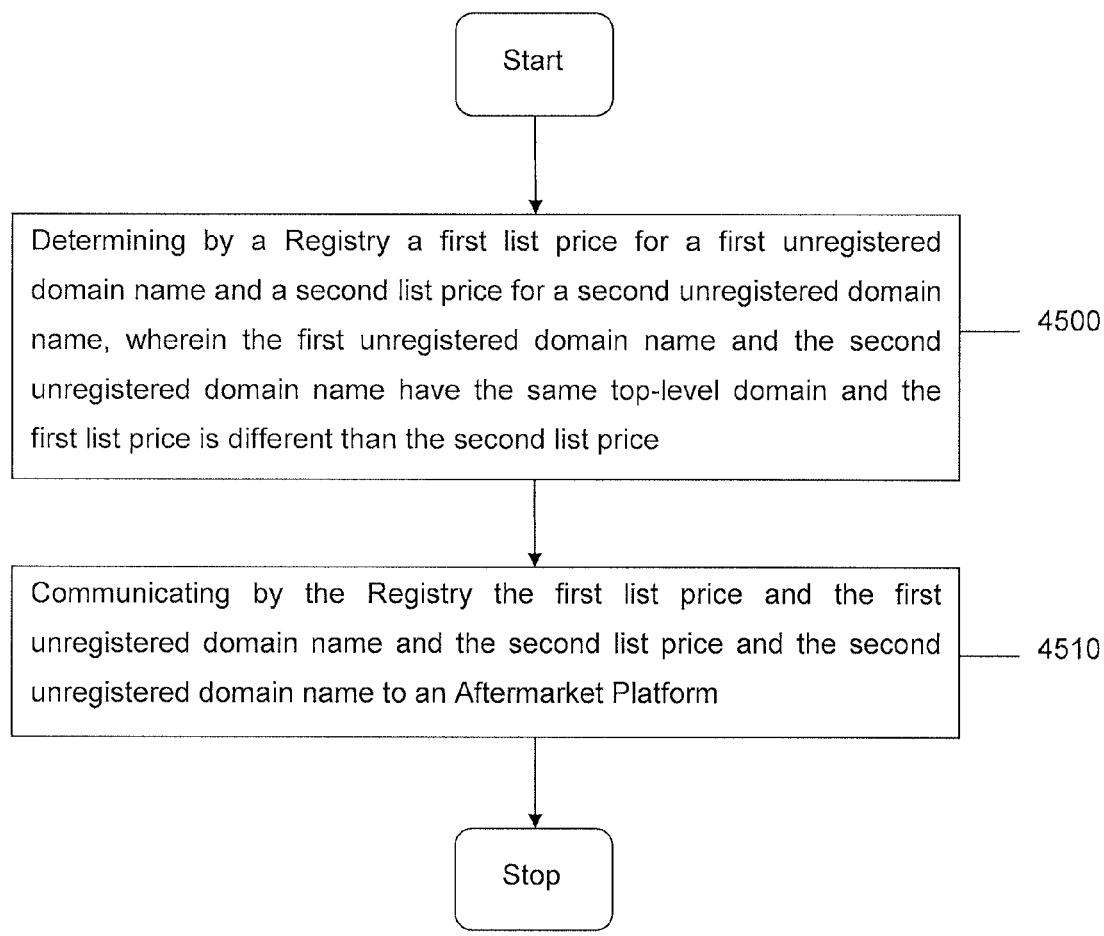
FIG. 45 is a flow diagram of a process for a Registry selling never before registered domain names with the same top-level domain at variable prices.

In another embodiment illustrated in FIG. 45, a Registry 200 (the Registry 200 may include a new gTLD holder) may determine or calculate different list prices for two or more domain names, having the same top-level domain, that have never been registered before. (Step 4500) The Registry 200 may communicate the domain names and their corresponding different list prices to an Aftermarket Platform 100. (Step 4510) The Registry 200 may periodically send an updated list of domain names and their corresponding different list prices with no longer available domain names removed from the list. Alternatively to resending all the information, only changes may be sent. The Aftermarket Platform 100 may communicate the domain names and their corresponding different list prices (with periodic updates) to a plurality of Registrars 700-703. As in the previous embodiment, the plurality of Registrars 700-703 may display the domain names and their corresponding prices on one or more websites 3655. A plurality of potential buyers may visit the websites 3655 and see the domain names and their corresponding prices. A Buyer 120 may purchase one or more of the domain names at a Gaining Registrar 220 in the plurality of Registrars 700-703. The Gaining Registrar 220 and Registry 200 may register the one or more purchased domain names to the Buyer 120 by adding the domain name and the Buyer 120 (or proxy information) to the WHOIS database. The Registry 200 may communicate to the Aftermarket Platform 100 that the one or more domain names are unavailable for registration. The Aftermarket Platform 100 may communicate to the plurality of Registrars 700-703 that the one or more registered domain names are unavailable for registration. The communications from the Registry 200 to the Aftermarket Platform 100 and from the Aftermarket Platform 100 to the plurality of Registrars 700-703 may be substantially in real-time (allowing for computer processing time and Internet communication delays) or all changes to the list of domain names and their corresponding purchase prices over a period of time may be accumulated and periodically communicated from the Registry 200 to the Aftermarket Platform 100 and/or from the Aftermarket Platform 100 to the plurality of Registrars 700-703.

Figure 46:
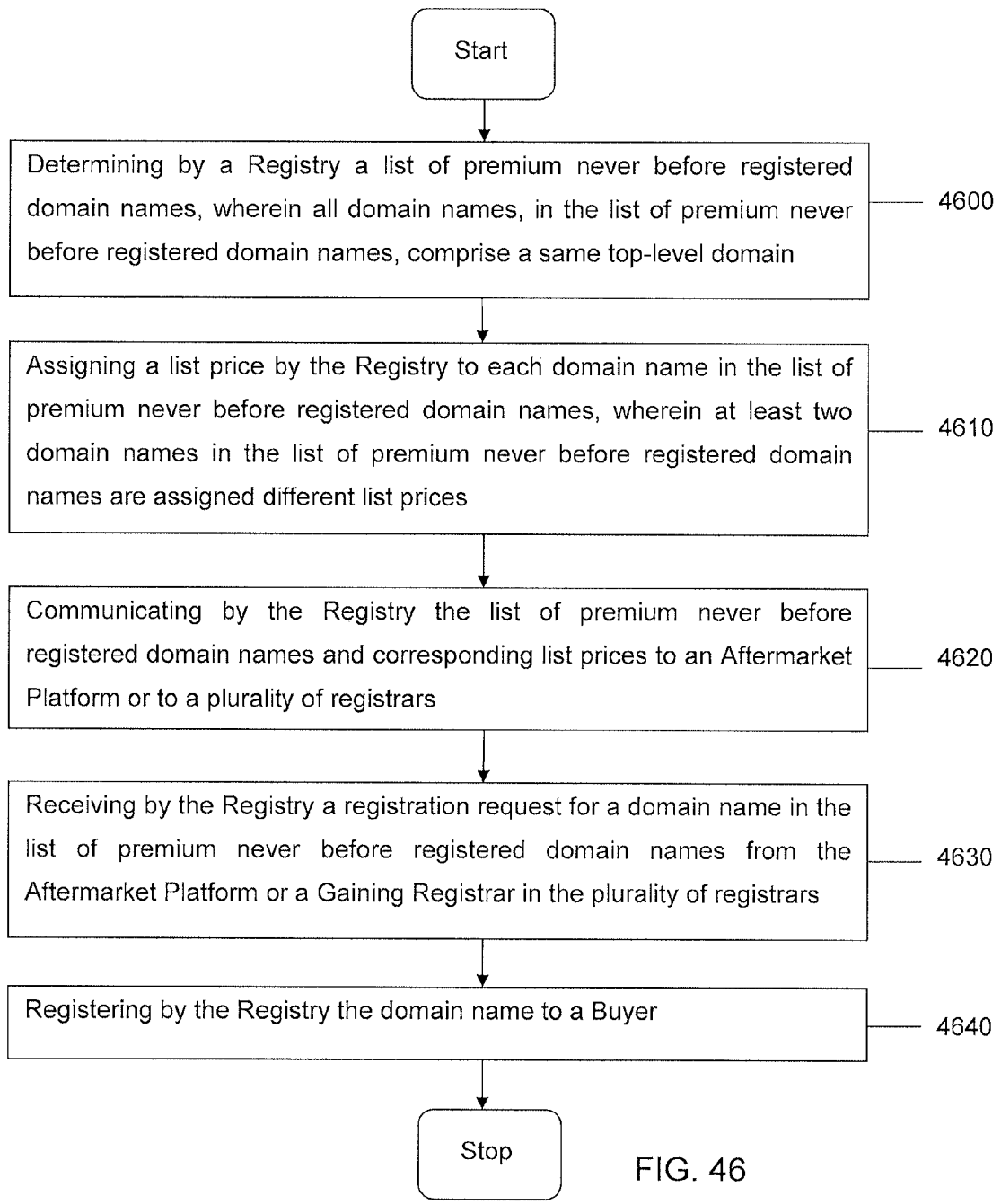
FIG. 46 is a flow diagram of a process for a Registry selling never before registered domain names with the same top-level domain at variable prices.

In another embodiment illustrated in FIG. 46, a Registry 200 (which may include a new gTLD holder) may determine a list of premium never before registered domain names, wherein all of the premium never before registered domain names comprise the same top-level domain. (Step 4600) The Registry 200 may assign a Registry creation cost, i.e., a purchase price or list price, to each domain name in the list of premium never before registered domain names with at least two domain names in the list of premium never before registered domain names being assigned different Registry creation costs and/or renewal costs. (Step 4610) The Registry 200 may communicate the list of premium never before registered domain names and their corresponding Registry creation costs to an Aftermarket Platform 100 and/or to a plurality of Registrars 700-703. (Step 4620) The plurality of Registrars 700-703 may list on websites 3655 one or more of the premium never before registered domain names to a plurality of potential buyers. The Registry 200 may receive a request from a Gaining Registrar 220 or the Aftermarket Platform 100 to register a domain name in the list of premium never before registered domain names to a Buyer 120. (Step 4630) The Registry 200 may register the domain name, preferably in the WHOIS database, to the Buyer 120. (Step 4640) The Registry 200 or the Aftermarket Platform 100 may communicate to the plurality of Registrars 700-703 that the domain name is no longer available for registration.

In another embodiment, the assigned list price by the Registry 200 to each domain name in the list of premium never before registered domain names comprises selecting two or more tier levels with each tier level having a different tier level list price and assigning each domain name in the list of premium never before registered domain names to one of the two or more tier levels.

In another embodiment, a second-level domain for each domain name in the list of premium never before registered domain names is used to calculate the Registry creation cost (purchase price, list price, etc.) for each domain name in the list of premium never before registered domain names.

In another embodiment, only never before registered domain names are displayed to potential buyers by a Gaining Registrar 220. In other embodiments, never before registered domain names and previously registered, but available, domain names are displayed to potential buyers by the Gaining Registrar 220.

Figure 47:
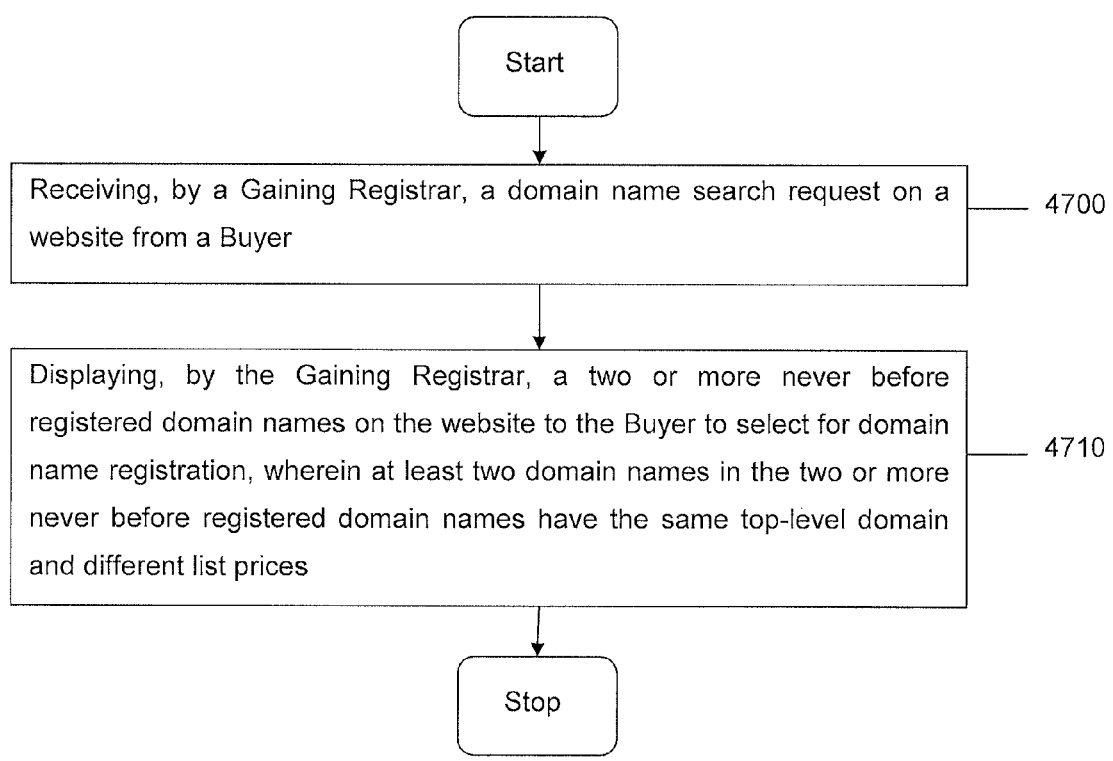
FIG. 47 is a flow diagram of a process for a Gaining Registrar selling never before registered domain names with the same top-level domain at variable prices.

In another embodiment illustrated in FIG. 47, a Gaining Registrar 220 may receive a domain name search request on a website 3655 from a Buyer 120. (Step 4700) The Gaining Registrar 220 may display one or more never before registered domain names on the website 3655 to the Buyer 120. The one or more never before registered domain names may have the same top-level domain, but have different Registry creation costs (list prices, purchase price, registration prices, etc.). (Step 4710) In some embodiments, the Gaining Registrar 220 may receive a plurality of never before registered domain names and a Registry creation cost for each domain name in the plurality of never before registered domain names from a Registry 200 and/or new gTLD holder. The Gaining Registrar 220 may receive a selection from the Buyer 120 on the website 3655 to register one or more domain names from the displayed one or more never before registered domain names. The Gaining Registrar 220 may collect funds for registering the one or more domain names selected by the Buyer 120. The Gaining Registrar 220 and Registry 200 may register the selected one or more domain names to the Buyer 120, preferably in the WHOIS database. The Gaining Registrar 220 may disburse funds to the Registry 200 for domain names registered to one or more Buyers 120. The Gaining Registrar 220 may also check an availability of the one or more never before registered domain names with an Aftermarket Platform 100 or with a Registry 200 before displaying the one or more never before registered domain names on the website 3655 to the Buyer 120. The Gaining Registrar 220 preferably only displays available domain names on the website 3655 to the Buyer 120 and not domain names that are not available for registration.

Figure 48:
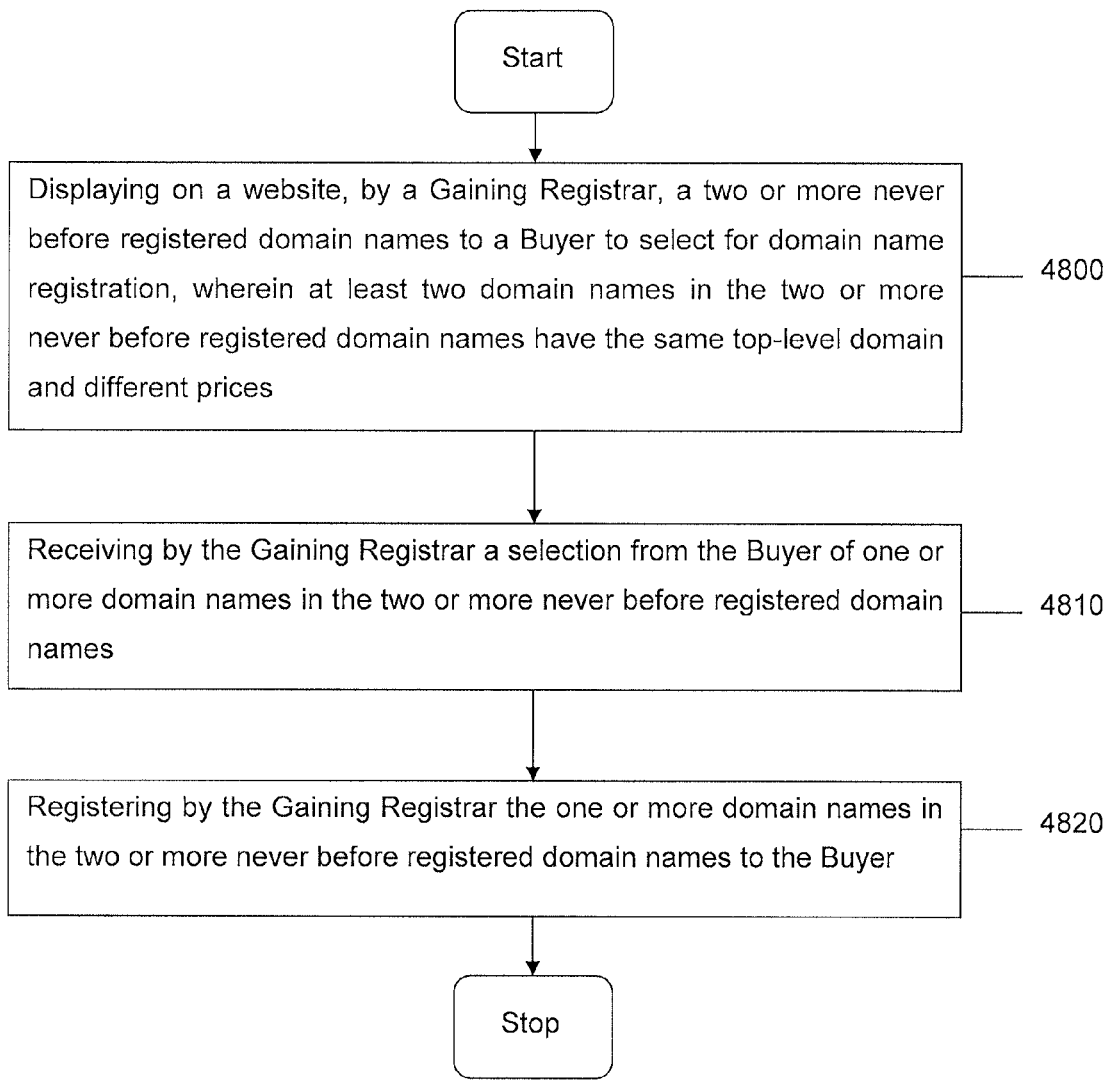
FIG. 48 is a flow diagram of a process for a Gaining Registrar selling never before registered domain names with the same top-level domain at variable prices.

In another embodiment illustrated in FIG. 48, a Gaining Registrar 220 may display on a website 3655 two or more never before registered domain names to a Buyer 120 to select for domain name registration. Two or more of the two or more domain names may have the same top-level domain and have different Registry creation costs. (Step 4800) The Gaining Registrar 220 may receive a selection from the Buyer 120 for one or more domain names in the two or more never before registered domain names (having the same top-level domain, but different Registry creation costs). (Step 4810) The Gaining Registrar 220 (in cooperation with a Registry 200) may register the selected one or more domain names to the Buyer 120, for example, in the WHOIS database. (Step 4820) In some embodiments, the Gaining Registrar 220 may receive a plurality of never before registered domain names (including the two or more never before registered domain names displayed to the Buyer 120) and a Registry creation cost for each domain name in the plurality of never before registered domain names from the Registry 200. The Gaining Registrar 220 may also collect funds for registering the one or more domain names to the Buyer 120 and the Gaining Registrar 220 may disburse the funds or a portion of the funds to the Registry 200. Funds disbursed by the Gaining Registrar 220 to the Registry 200 may represent funds for any number (one or more) of domain names registered by the Gaining Registrar 220 with the Registry 200. In some embodiments, two or more of the never before registered domain names with the same gTLD and different Registry creation costs may be displayed on a plurality of websites 3655 operated by a plurality of Registrars 700-703. In other embodiments, the Gaining Registrar 220 checks the availability of the two or more never before registered domain names with an Aftermarket Platform 100 or with the Registry 200 and only displays the two or more never before registered domain names on the website 3655 to the Buyer 120 if the domain names are still available for registration.

Figure 49:
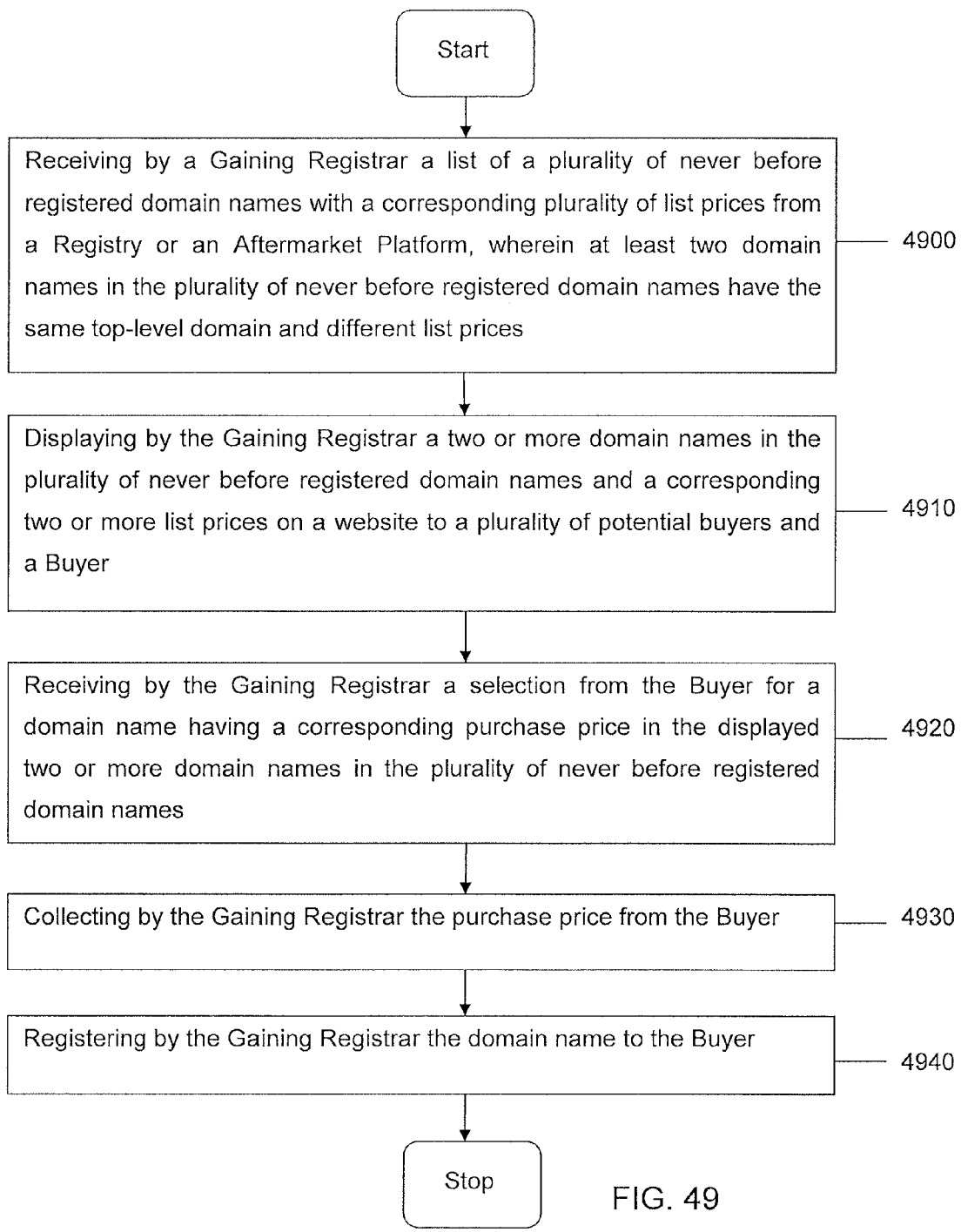
FIG. 49 is a flow diagram of a process for a Gaining Registrar selling never before registered domain names with the same top-level domain at variable prices.
Figure 50:
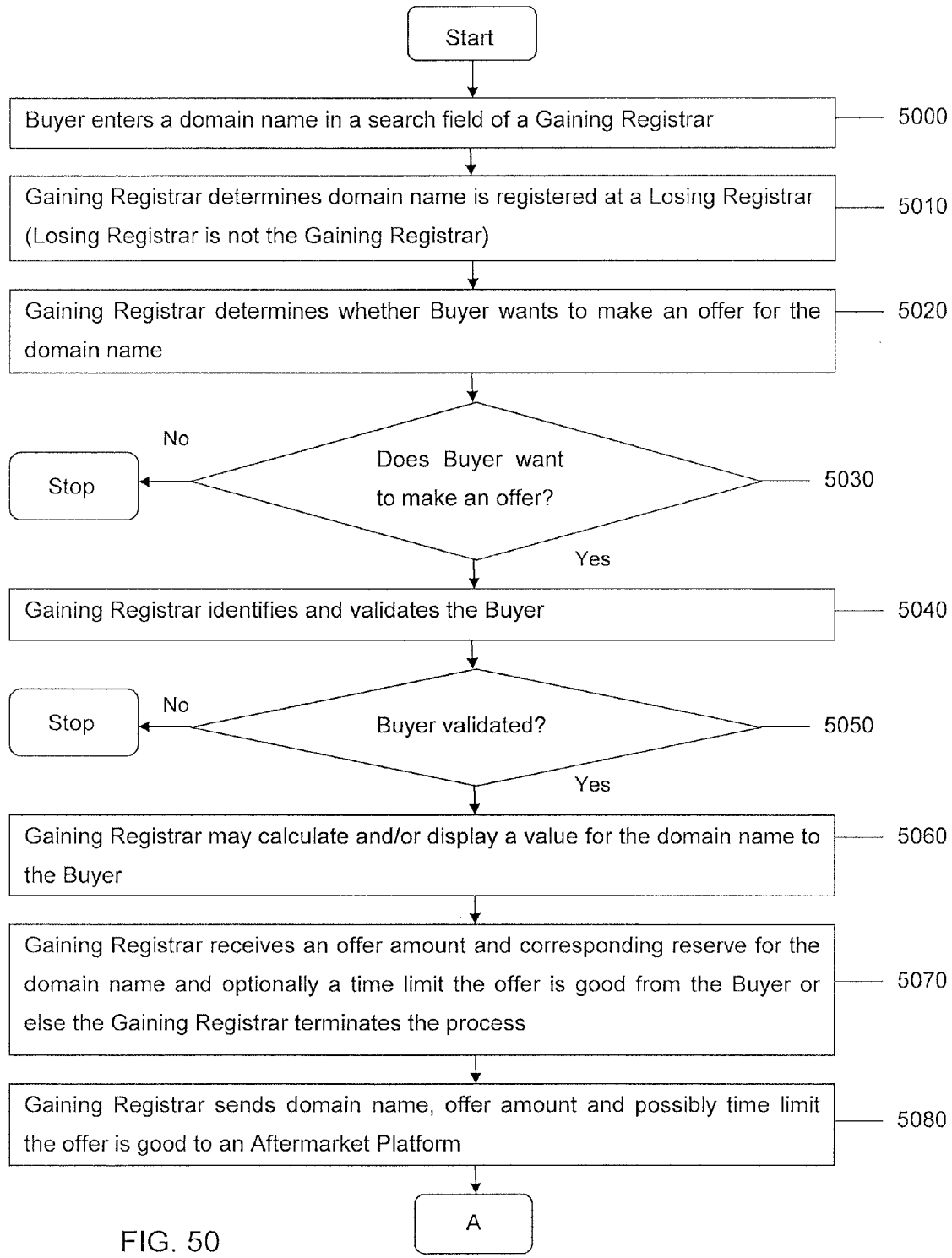
FIGS. 50-51 are a flow diagram of a process for a Losing Registrar and a different Gaining Registrar to transfer a domain name from a Seller to a Buyer.
Figure 51:
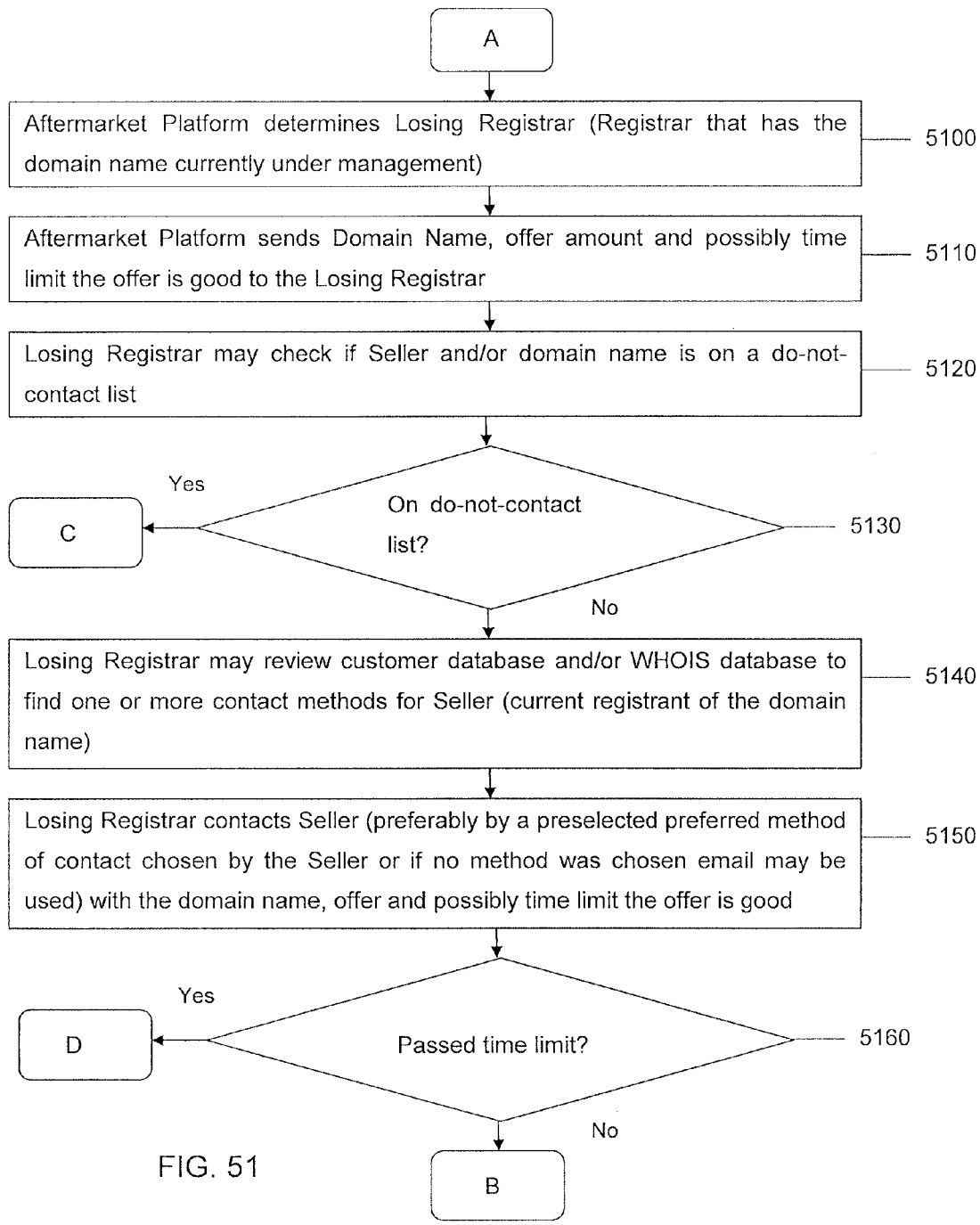
Figure 52:
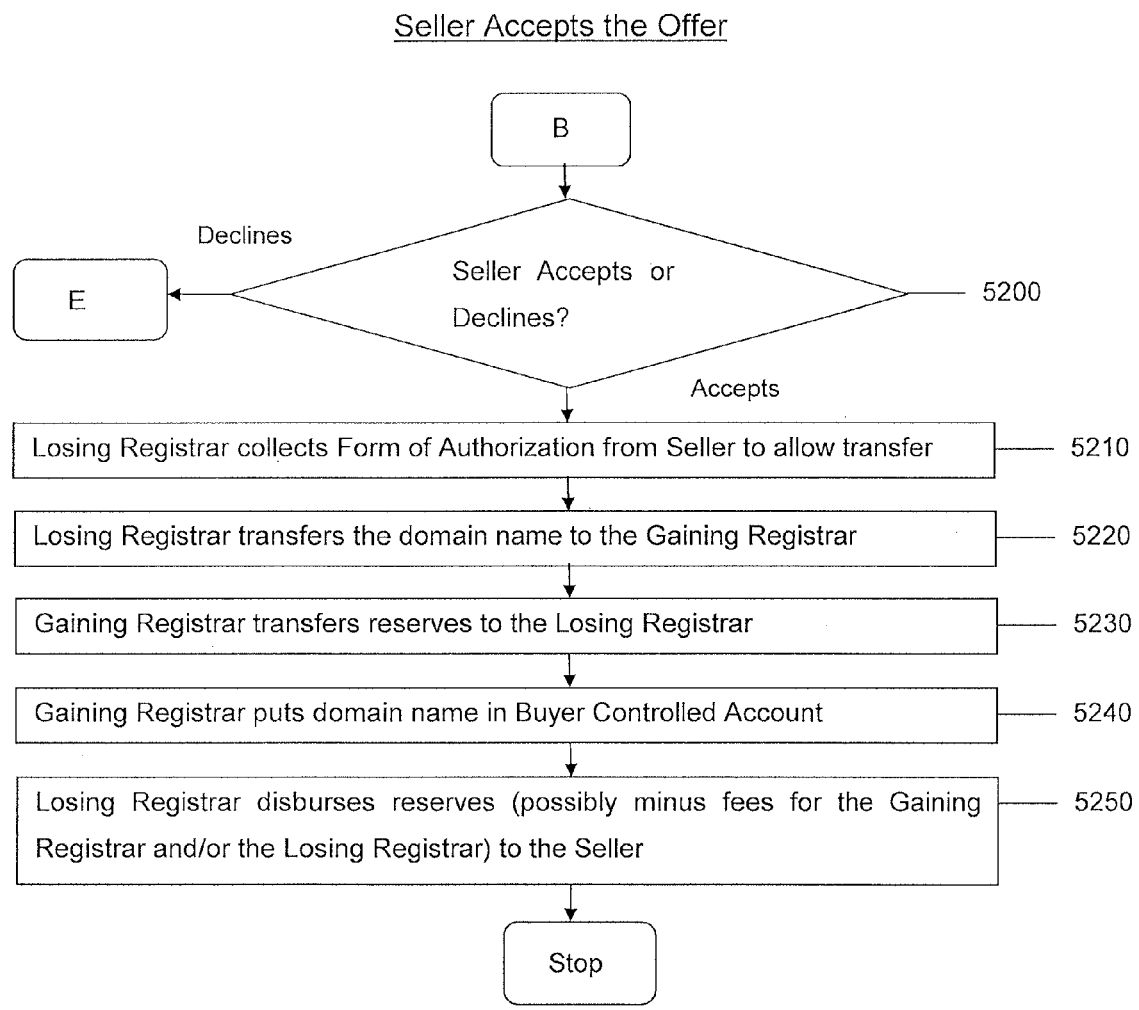
FIG. 52 is a continuation of the process illustrated in FIGS. 50-51 illustrating what happens when a Seller accepts an offer from a Buyer.
Figure 53:
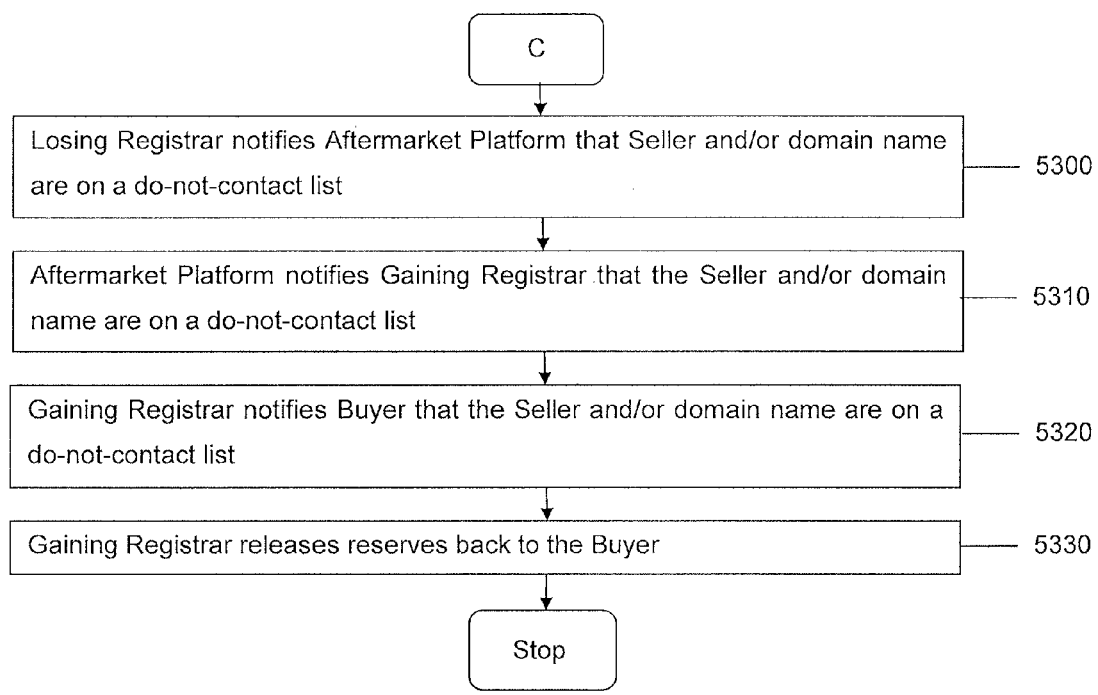
FIG. 53 is a continuation of the process illustrated in FIGS. 50-51 illustrating what happens when a Seller and/or a domain name are on a do not contact list.
Figure 54:
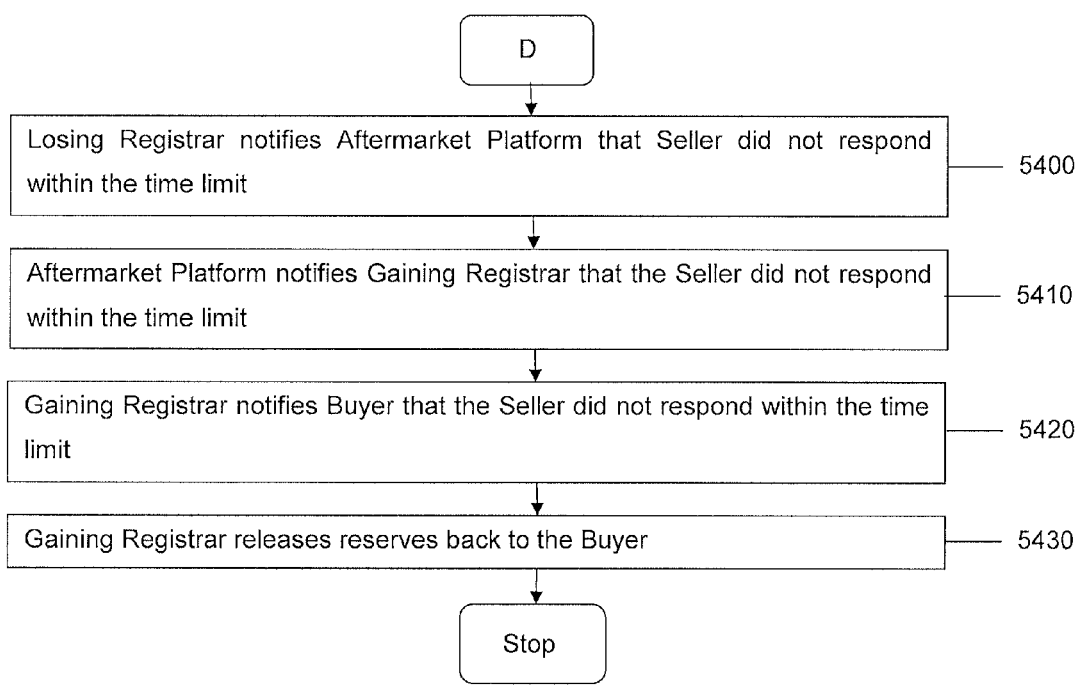
FIG. 54 is a continuation of the process illustrated in FIGS. 50-51 illustrating what happens when a time limit on an offer from a Buyer expires.
Figure 55:
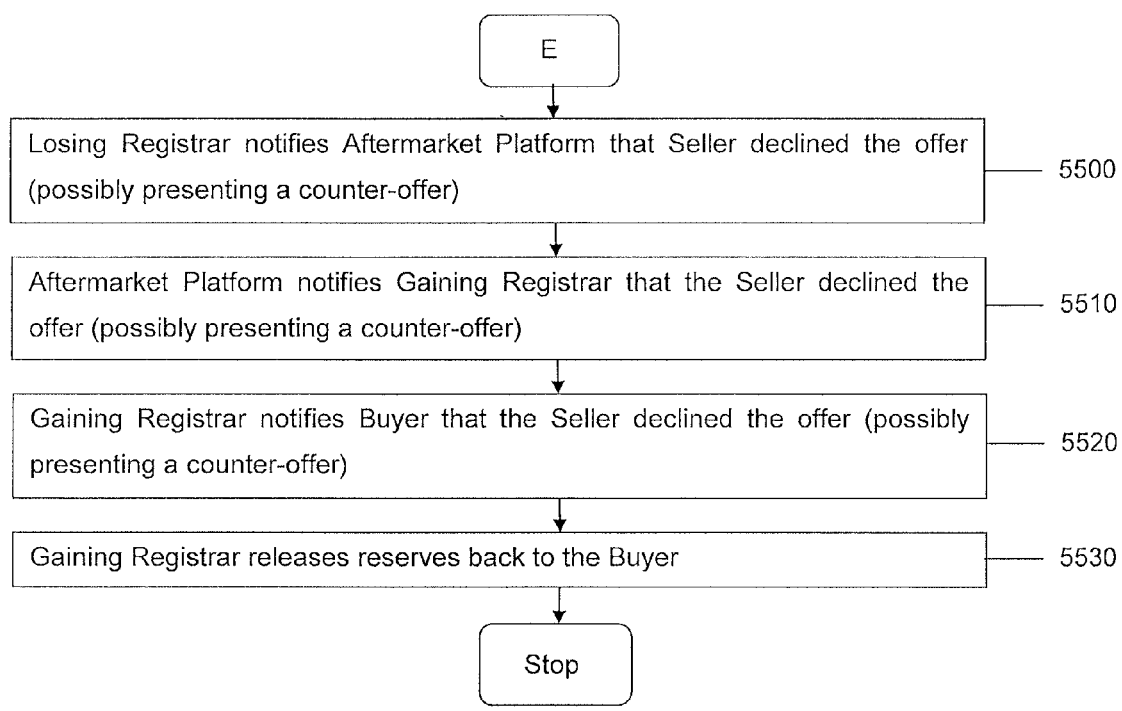
FIG. 55 is a continuation of the process illustrated in FIGS. 50-51 illustrating what happens when a Seller declines an offer from a Buyer.

In another embodiment illustrated in FIG. 49, a Gaining Registrar 220 may receive a list of a plurality of never before registered domain names with a corresponding plurality of list prices from a Registry 200 or an Aftermarket Platform 100. In preferred embodiments, at least two domain names in the plurality of never before registered domain names have the same top-level domain and different list prices. (Step 4900) The Gaining Registrar 220 may display a two or more domain names in the plurality of never before registered domain names and a corresponding two or more purchase prices, i.e. domain name registration fees, on a website to a plurality of potential buyers and a Buyer 120. (Step 4910) The Gaining Registrar 220 may receive a selection from the Buyer 120 for a domain name, having a corresponding Registry creation cost, i.e., list price, purchase price, registration fee, from the displayed two or more domain names in the plurality of never before registered domain names. (Step 4920) The Gaining Registrar 220 may collect the Registry creation cost from the Buyer 120 (Step 4930) and register the domain name to the Buyer 120 in cooperation with a Registry 200 (Step 4930). In some embodiments, the Gaining Registrar 220 may disburse the Registry creation cost to the Registry 200. In preferred embodiments, the Gaining Registrar 220 combines Registry creation costs for two or more domain names before disbursing the combined Registry creation costs to the Registry 200. The displayed and collected Registry creation costs from the Buyer 120 may be the same as the disbursed Registry creation costs, or the Gaining Registrar 220 may retain a Gaining Registrar 220 fee from the displayed and collected Registry creation costs before transmitting the remainders (list prices) to the Registry 200. The displayed two or more domain names to the Buyer 120 may be in response and be related to a domain name search request or other search request received from the Buyer 120 on the website 3655. Each Registry creation cost may be determined based on a second-level domain for each domain name in the plurality of never before registered domain names.

For the various above described embodiments, selling a domain name to a Buyer 120 is synonymous with registering (through a Registry 200) the domain name to the Buyer 120. A registry creation cost, registration price, purchase price and/or list price may or may not include a fee amount owed to a Gaining Registrar 220 by a Registry 200 for registering a domain name.

In another embodiment illustrated in FIGS. 50-55, a process for a Buyer 120 at a Gaining Registrar 220 to purchase a domain name from a Seller 110 at a Losing Registrar 210 is disclosed. The Buyer 120 may enter a domain name or a search string in a search field in a webpage operated by the Gaining Registrar 220. (Step 5000) The Gaining Registrar 220 may determine (such as by comparing with a list of known registered domain names, domain name zone files or by interacting with a Registry) one or more domain names that are already registered (possibly with other domain names that are available) that are the same or related to the entered domain name and/or search string. The Gaining Registrar 220 may determine whether the already registered domain names are registered with the Gaining Registrar 220 or with a different Losing Registrar 210. (Step 5010)

The Gaining Registrar 220 may compare the registrant for each already registered domain name and the domain names themselves against a do not contact list that may be stored with the Gaining Registrar 220, Aftermarket Platform 100 or Losing Registrar 210. Any domain name on the do not contact list or any domain name registered to a registrant on the do not contact list is preferably not presented to the Buyer 120. The Gaining Registrar 220 may present the one or more registered domain names (not on the do not contact list) to the Buyer 120 on a webpage and ask the Buyer 120 if the Buyer 120 would like to make an offer on one or more of the registered domain names. The following process will discuss an offer to buy a single domain name, but the process may be repeated for any number of registered domain names on which the Buyer 120 desires to make one or more offers. The Gaining Registrar 220 receives feedback from the Buyer 120 on whether the Buyer 120 would like to make an offer on an already registered domain name. (Step 5020)

If the Buyer 120 does not want to make an offer on the already registered domain name, the process may stop. (Step 5030) If the Buyer 120 does want to make an offer the Gaining Registrar 220 should check to see if the Buyer 120 has been previously identified and/or validated. (Step 5040) If the Buyer 120 has not been previously identified and/or validated, the Gaining Registrar 220 should confirm and validate the Buyer 120 to reduce the chance that the Buyer 120 has stolen the identity (account number, password, email account, etc.) of the real Buyer 120 associated with the Buyer 120 account. If the Buyer 120 has not been validated in the past, cannot be currently validated or is known to be untrustworthy (possibly by being associated with past attempts at fraud or other untrustworthy conduct), the process is preferably stopped to prevent a possible fraudulent transaction. If the Buyer 120 has been validated and preferably known to be trustworthy, the process may continue. (Step 5050)

In a preferred embodiment, the Gaining Registrar 220 may calculate and display an estimated value for the domain name to the Buyer 120. (Step 5060) The Gaining Registrar 220 may use any desired method for calculating the value of the domain name. Non-limiting examples of calculating the value of the domain name include previously paid amounts for the same or similar domain names, determining a current or predicted future level of traffic associated with the domain name (more traffic equals higher value), the length of the domain name (shorter domain names are more valuable than longer domain names) and/or does the domain name comprise common or generic word(s) (the fewer and more common the words, the more valuable the domain name.) An estimated value for the domain name may use one or more of these factors in its calculation.

The Gaining Registrar 220 may receive an offer amount and a reserve for the domain name from the Buyer 120. Prepayment of the reserve by the Buyer 120 and validation of the reserve also helps reduce the chance of fraud. A notice may be sent by any desired communication method. As non-limiting examples, the notice may be sent by a telephone call, a text message, a mobile app or an email message (as previously selected by the Buyer 120) may also be sent to the Buyer 120 to confirm the transaction. The Buyer 120 may also select a time period, possibly from time periods displayed to the Buyer 120 on a webpage, that the offer is good. (Step 5070) In other embodiments, a default time period the offer is good may be used, such as three days from the time of the offer from the Buyer. The Gaining Registrar 220 may communicate the domain name, offer amount and/or the time limit the offer is good to an Aftermarket Platform 100 or the Losing Registrar 210 where the domain name is currently registered. (Step 5080)

If the Gaining Registrar 220 sent the domain name, offer amount and the time limit the offer is good to the Aftermarket Platform 100, the Aftermarket Platform 100 may determine which Registrar has the domain name under management and is thus the Losing Registrar 210. (Step 5100) The Aftermarket Platform 100 may then send the domain name, offer amount and the time limit to the Losing Registrar 210. (Step 5110)

The Losing Registrar 210 may check if the Seller 110 (registrant of the domain name) and/or the domain name are on a do-not-contact list. (Step 5120) The Seller 110 will typically be a customer of the Losing Register at least for the reason that the Seller's domain name is registered with the Losing Registrar 210. The Losing Registrar 210 may ask, possibly on a webpage at any time desired by the Seller 110 and/or possibly as part of creating an account with the Losing Registrar 210, whether or not the Seller 110 wishes to be placed on a do not contact list and/or whether or not the Seller 110 wishes to place one or more domain names registered to the Seller 110 on the do not contact list. The Seller 110 may place none, some portion or all of the Seller's registered domain names on the do not contact list.

If the Seller 110 is on the do not contact list, the Seller 110 is preferably not contacted regarding offers to sell any of the Seller's domain names. If a domain name is on the do not contact list, the Seller 110 is not contacted regarding offers to sell the specific domain name(s) that are on the do not contact list. (Step 5130) The Losing Registrar 210 may notify the Aftermarket Platform 100 (Step 5300) (who would then notify the Gaining Registrar 220 (Step 5310)) and/or the Gaining Registrar 220 that the Seller 110 and/or the domain name are on a do not contact list or that the offer was not accepted. The Gaining Registrar 220 may notify the Buyer 120 that the Seller 110 and/or domain name was on a do not contact list or that the offer was rejected. (Step 5320) The Gaining Registrar 220 may release any held reserves back to the Buyer 120. (Step 5330)

In some embodiments, the Seller 110 may also define an amount for the Seller 110 in general or for offers on one or more registered domain names. In this case, the Seller 110 is not contacted unless the offer is at or above the amount defined by the Seller 110. This would prevent the Seller 110 from being bothered by offers that were below what the Seller 110 would consider in selling one of the Seller's domain names, but still allow the Seller 110 to receive notice of serious offers from Buyer 120.

In some embodiments, the Losing Registrar 210 may make the do not contact list available to the Gaining Registrar 220 and the Aftermarket Platform 100. This allows the Gaining Registrar 220 and/or the Aftermarket Platform 100 to terminate the process for Sellers and/or domain names on the do not contact list.

The Losing Registrar 210 may also ask and receive from the Seller 110, at the time of account creation or at anytime desired by the Seller 110, what the Seller's preferred method of contact is (SMS, telephone call, email, social media notice, some combination, etc.) when the Seller 110 is contacted. The preferred contact method is then available to the Losing Register and should be used by the Losing Registrar 210 when contacting the Seller 110. (Step 5140) The Losing Registrar 210, if the Seller 110 and domain name are not on the do not contact list, may communicate the domain name, the offer amount and the time the offer is good, preferably by the method(s) selected by the Seller 110, to the Seller 110. (Step 5150)

In some embodiment, the Losing Registrar 210 may calculate and display an estimated value of the domain name to the Seller 110. The Losing Registrar 210 may use any desired method for calculating the value of the domain name. Non-limiting examples of calculating the value of the domain name include previously paid amounts for the same or similar domain names, determining a current or predicted future level of traffic associated with the domain name (more traffic equals higher value), the length of the domain name (shorter domain names are more valuable than longer domain names) and/or does the domain name comprise common or generic word(s) (the fewer and more common the words, the more valuable the domain name.) An estimated value for the domain name may use one or more of these factors in its calculation.

Once the Seller 110 has the domain name, offer amount and the time the offer is good (such as a specific time and date after which the offer cannot be accepted) and possibly an estimated value of the domain name, the Seller 110 may either accept the offer, refuse the offer, put the domain name on the do not contact list, put the Seller 110 on the do not contact list or allow the time the offer is good to expire.

Seller Accepts the Offer

If the Seller 110 accepts the offer within the time the offer is good (Step 5200), the Losing Registrar 210 may collect a Form of Authorization from the Seller 110 to allow the transfer. (Step 5210) The Form of Authorization may have been collected by the Losing Registrar 210 from the Seller 110 at any time before the transfer of the domain name and the Form of Authorization does not have to be collected after accepting the offer from the Buyer 120. The Losing Registrar 210, if it has received a proper Form of Authorization from the Seller 110, may transfer the domain name to the Gaining Registrar 220. (Step 5220) These embodiments may work even when the Gaining Registrar 220 and Losing Registrar 210 are different domain name registrars. The Gaining Registrar 220 may transfer the reserve (possibly minus a fee held by the Gaining Registrar 220) to the Losing Registrar 210. (Step 5230) The Gaining Registrar 220 may register the domain name to the Buyer 120 and put the domain name in a Buyer 120 controlled account. (Step 5240) The Losing Registrar 210 may disburse the reserve (again, possibly minus a fee held by the Losing Registrar 210) to the Seller 110. (Step 5250) Fees between Losing Registrars and Gaining Registrars do not have to be sent at the time of each transaction, and may be accumulated over time and periodically settled (perhaps monthly). A Losing Registrar 210 in one transaction might be a Gaining Registrar 220 in another transaction and a Gaining Registrar 220 in one transaction might be a Losing Registrar 210 in another transaction.

Time Offer is Good Expires

If the Seller 110 does not respond within the time the offer is good, the offer from the Buyer 120 can no longer be accepted by the Seller 110. The Losing Registrar 210 may notify the Aftermarket Platform 100 (Step 5400) (who would then notify the Gaining Registrar 220 (Step 5410)) or the Gaining Registrar 220. The Gaining Registrar 220 may notify the Buyer 120 that the time the offer was good has expired. (Step 5420) The Gaining Registrar 220 may release any held reserves back to the Buyer 120. (Step 5430) If the time the offer is good expires, the Seller 110 may still send a counter-offer to the Buyer 120, which the Buyer 120 may accept, reject or let the counter-offer expire by its time the counter-offer is good. The Buyer 120 may also request to be placed on a do not contact list for that particular domain name.

Seller Declined Offer

If the Seller 110 declines the offer, the Losing Registrar 210 may notify the Aftermarket Platform 100 that the Seller 110 declined the offer (Step 5500) and/or the Gaining Registrar 220. The Aftermarket Platform 100 may notify the Gaining Registrar 220, if the Losing Registrar 210 hasn't, that the Seller 110 declined the offer. (Step 5510) The Gaining Registrar 220 may notify the Buyer 120 (preferably via a method selected by the Buyer 120, e.g., webpage notification, text, SMS, email, social media, telephone or any other desired method of communication) that the Seller 110 declined the offer. (Step 5520). The Gaining Registrar 220 may release the reserve (possibly minus a fee) to the Buyer 120. (Step 5530)

In some embodiments, the Seller 110 may decline the offer, but present a counter-offer that is communicated (via the Losing Registrar 210, Aftermarket Platform 100 and/or the Gaining Registrar 220) to the Buyer 120 who then has the option to accept, reject, take no action or offer a counter-counter offer within a given time period. The process of making offers and counter-offers may be repeated as many times as desired until either an acceptance or one or both parties wish to terminate the process.

Intra-Registrar Move Hi-Jack Prevention Service

Figure 56:
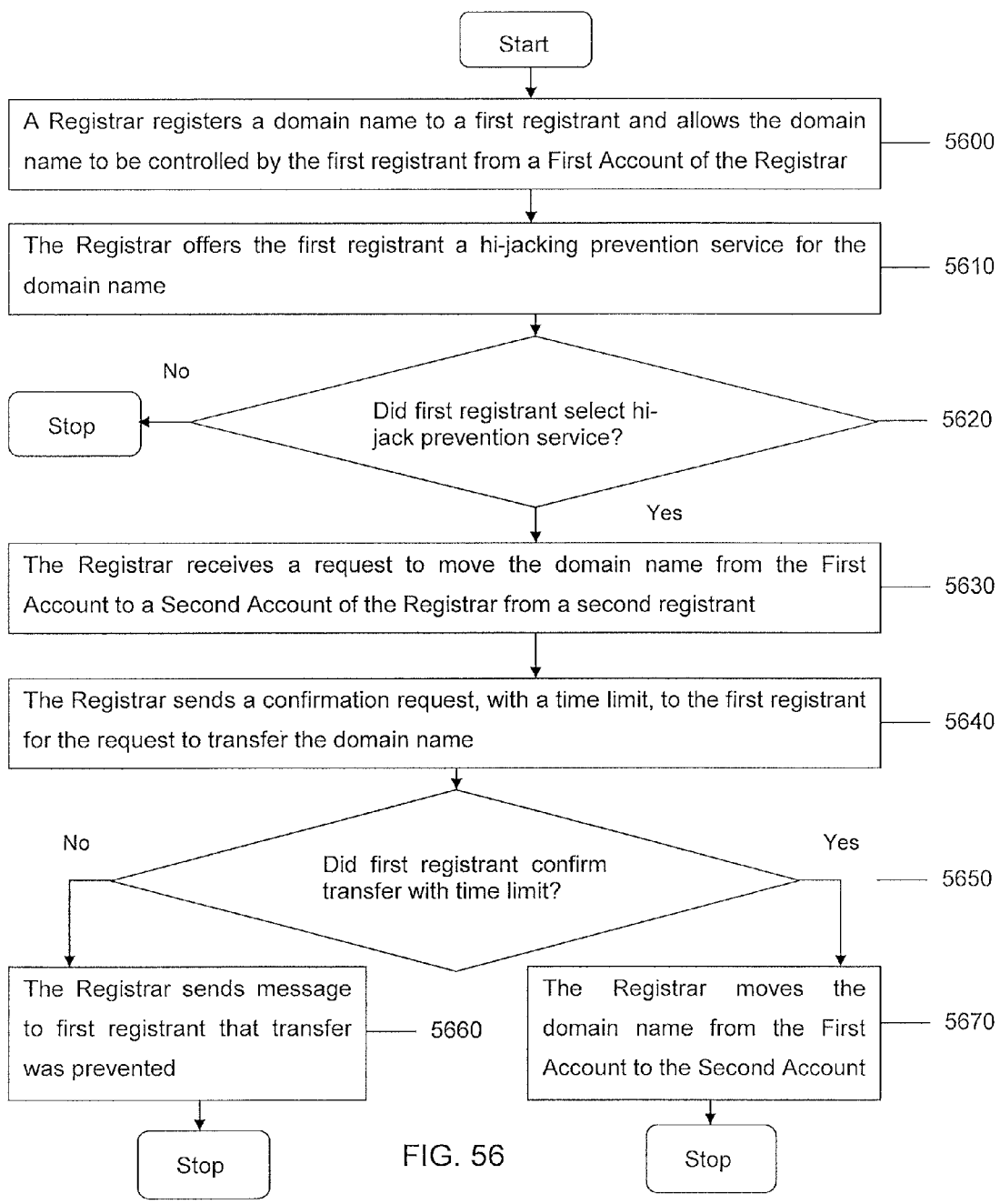
FIG. 56 is a flow diagram of a process for a hi-jack prevention service when moving a domain name from a first account to a second account within the same Registrar.

In another embodiment illustrated in FIG. 56, an intra-registrar move hi-jack prevention service is disclosed. In this embodiment, a Registrar 700 may register a domain name to a domain name registrant (hereafter registrant). The domain name may be placed in a first account controlled by the registrant at a website operated by the Registrar 700. (Step 5600)

The Registrar 700 may request and receive a preferred contact method for the registrant. The preferred contact method is preferably a device or account that is under the control of the registrant. Non-limiting examples would be a text message to a cell phone controlled by the registrant, an email account that the registrant controls, a mobile app on a cell phone controlled by the registrant or any other desired secure communication method.

The Registrar 700 may offer the registrant a hi-jack prevention service. (Step 5610) If the hi-jack prevention service is rejected by the registrant, the hi-jack prevention service is not enable and the domain name may be moved between accounts or transferred between Registrars using known methods. However, if the registrant selects the hi-jack prevention service, then additional steps may be required to move the domain name between accounts or to transfer the domain name between Registrars thereby providing additional levels of security for the domain name. (Step 5620)

The hi-jack prevention service may be active for as long as desired for the domain name. If a request to remove the hi-jack prevention service is received, the requester is preferably verified (asking for identification documents or verifying access to devices or accounts only the registrant has access to) before removing the hi-jack prevention service.

The Registrar 700 may receive a request to move the domain name from a first account managed by the Registrar 700 to a second account managed by the Registrar 700. (Step 5630) The source of the request should be verified to be the registrant and not from a domain name hi-jacker. To confirm the registrant, the Registrar 700 may send a confirmation request, preferably with a time limit, to the registrant using the preferred contact method. (Step 5640) The registrant, preferably also using the preferred contact method, may respond back to the Registrar 700 to either confirm or deny the domain name move within the time limit or not respond within the time limit which acts as a denial. (Step 5650)

If the registrant confirmed the domain name move, the Registrar 700 may move the domain name from the first account managed at the Registrar 700 to the second account also managed at the Registrar 700. (Step 5670) A confirmation message that the domain name move was successful (if it was successful) may be sent to the registrant using the preferred contact method. If the registrant denied the domain name move or did not respond within the time limit, a message that the domain name was not moved may be sent to the registrant using the preferred contact method. (Step 5660)

Third Party Move Hi-Jack Prevention Service

Figure 57:
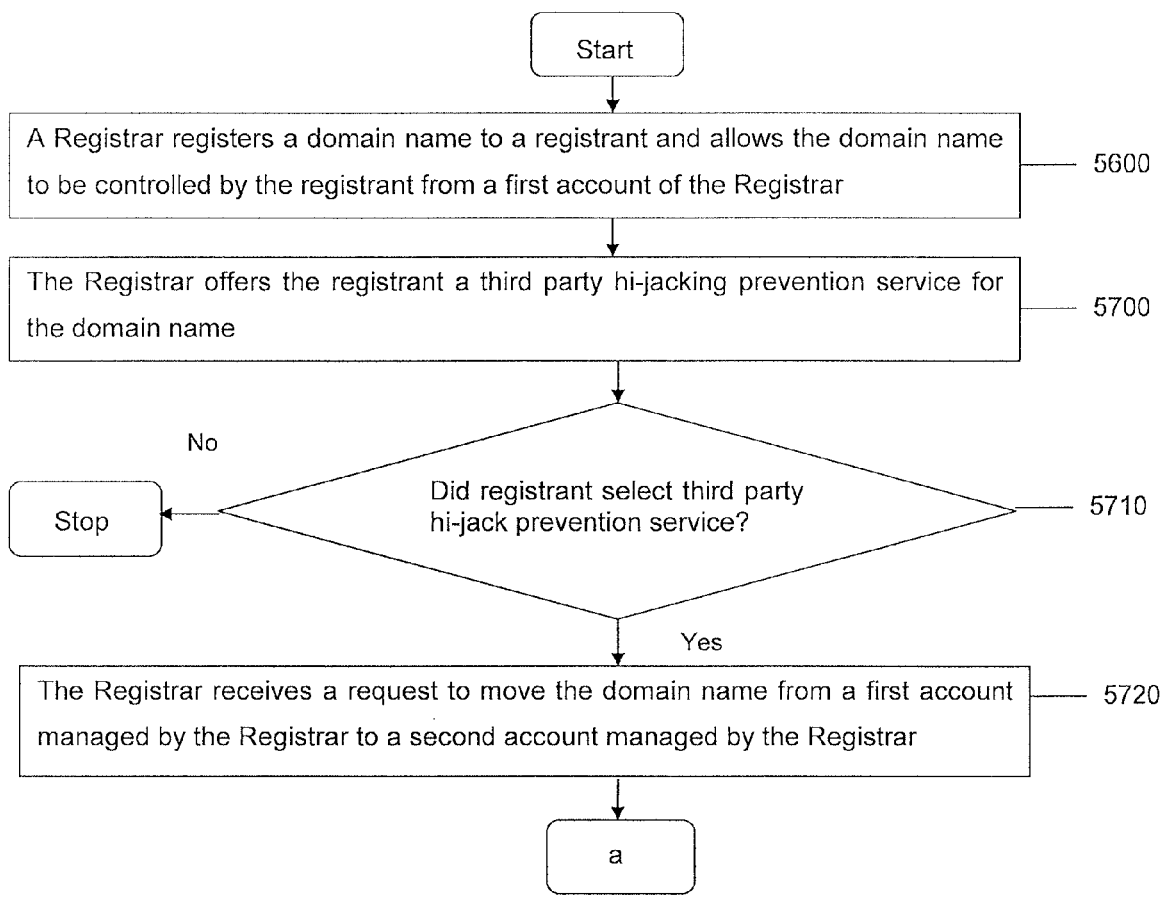
FIGS. 57-58 are flow diagrams of a process for a hi-jack prevention service using a third party platform when moving a domain name from a first account to a second account within the same Registrar.
Figure 58:
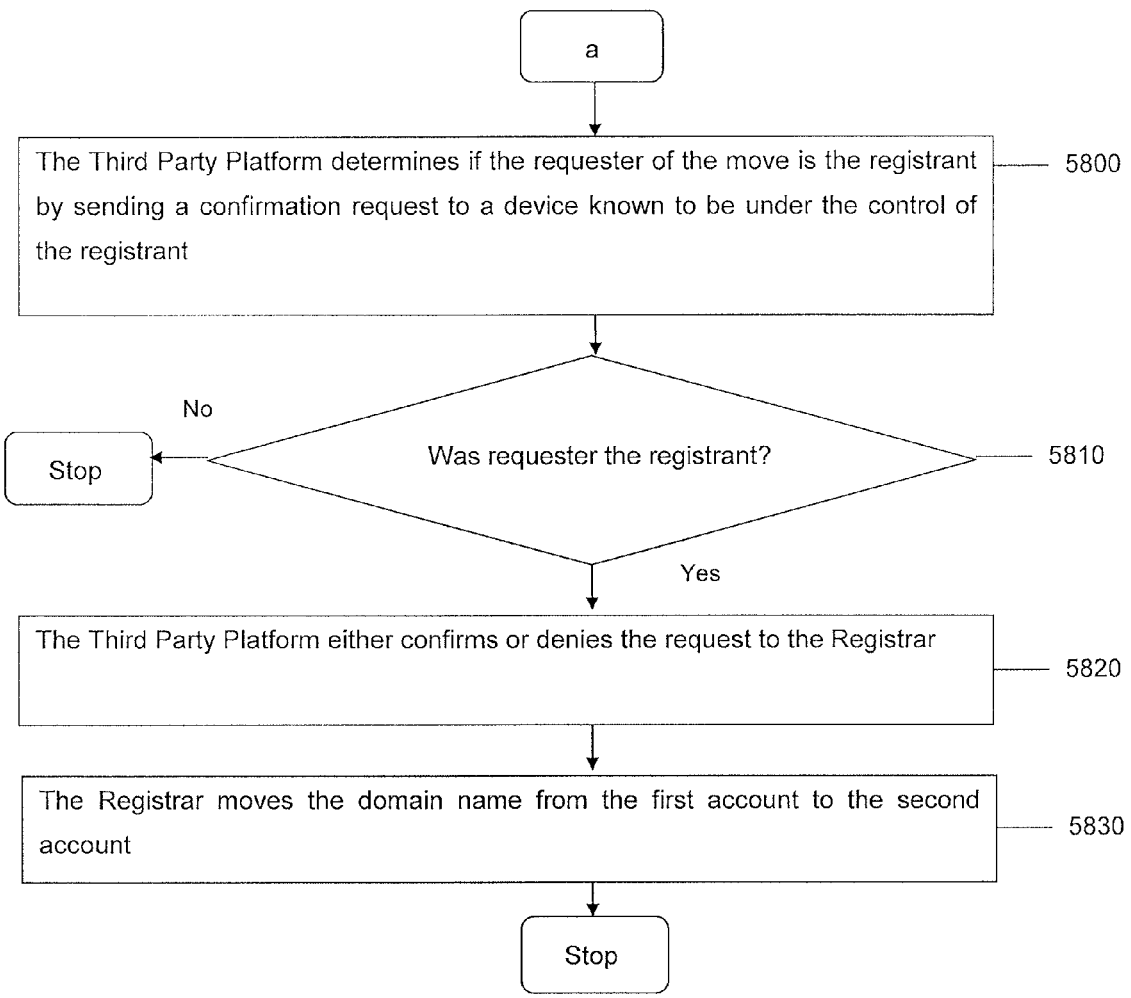

In another embodiment illustrated in FIGS. 57 and 58, a Registrar 700 may register a domain name to a domain name registrant (hereafter registrant). The domain name may be placed in a first account controlled by the registrant at a website operated by the Registrar 700. (Step 5600)

The Registrar 700 may offer a third party hi-jack prevention service to the registrant for one or more domain names registered to the registrant in the first account and/or for all domain names within the first account. (Step 5700) The registrant may select and agree to the third party hi-jack prevention service for the domain name. If the registrant does not accept the third party hi-jack prevention service for the domain name, the third party hi-jack prevention service is terminated. (Step 5710)

The Registrar 700 or third party platform may receive a request from a requester, representing to be the registrant, to move the domain name from the first account managed by the Registrar 700 to a second account managed by the Registrar 700. (Step 5720) The third party platform may perform any known or later developed method of remotely identifying the requester. (Step 5800) As non-limiting examples, control over a device (such as a cell phone), control over a social media account, knowledge of account names and/or passwords, biometrics, government identification documents or any other desired method may be used to verify that the requester is the registrant. (Step 5810) As a specific example, the third party platform may send a confirmation request of the move request to a cell phone known to be under the control of the registrant. (Step 5820) The registrant may either confirm or deny the request to move the domain name. If the requester confirms the request to move the domain name within a predetermined time period, the domain name may be moved from the first account managed by the Registrar 700 to the second account managed by the Registrar 700. (Step 5830) If the registrant does not confirm the request to move the domain name within the predetermined time period, the domain name is not moved from the first account to the second account.

Third Party Platform Inter-Registrar Transfer Hi-Jack Prevention Service

Figure 59:
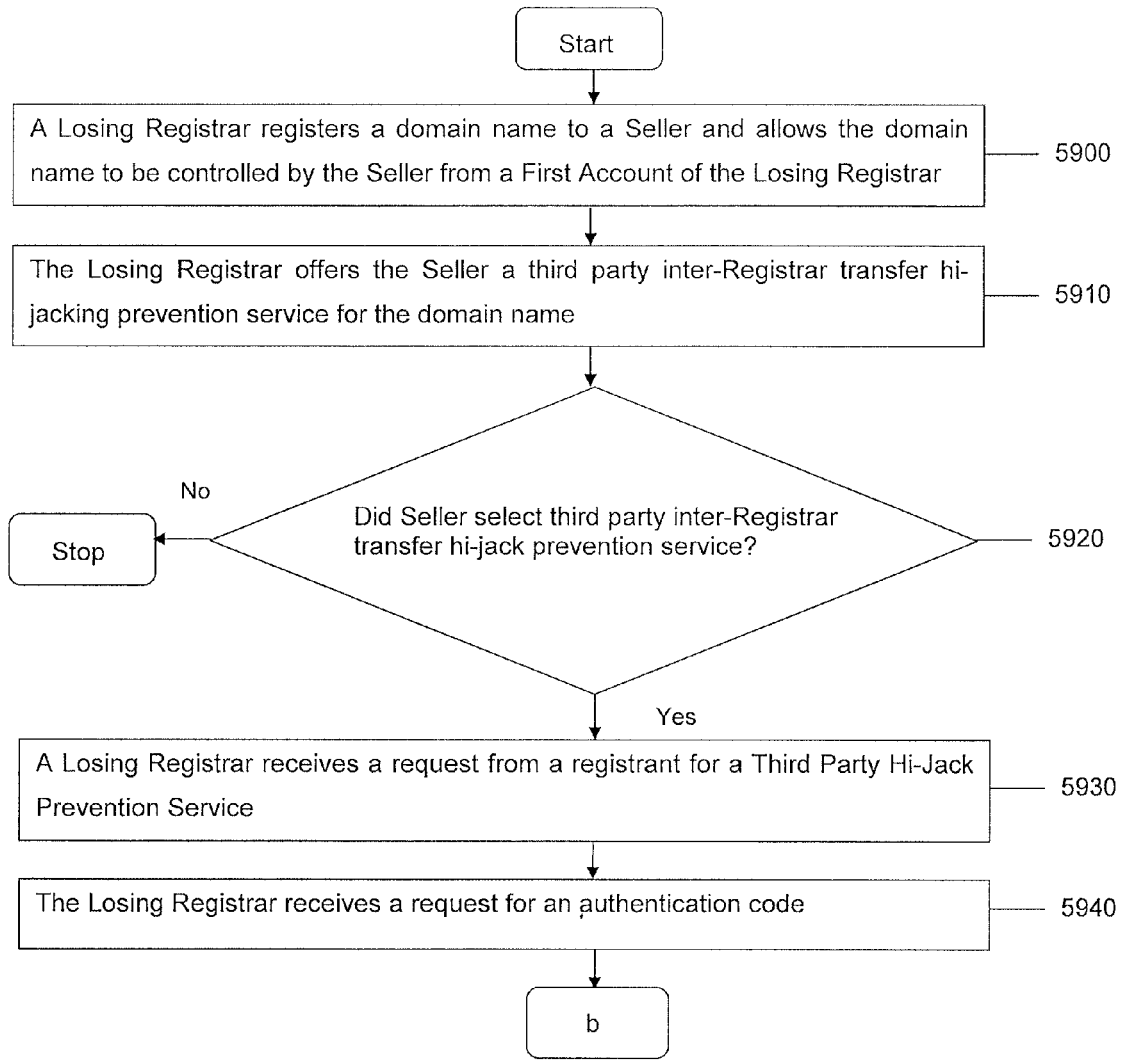
FIGS. 59-60 are flow diagrams of a process of a process for a hi-jack prevention service using a third party platform when transferring a domain name from a Losing Registrar to a Gaining Registrar.
Figure 60:
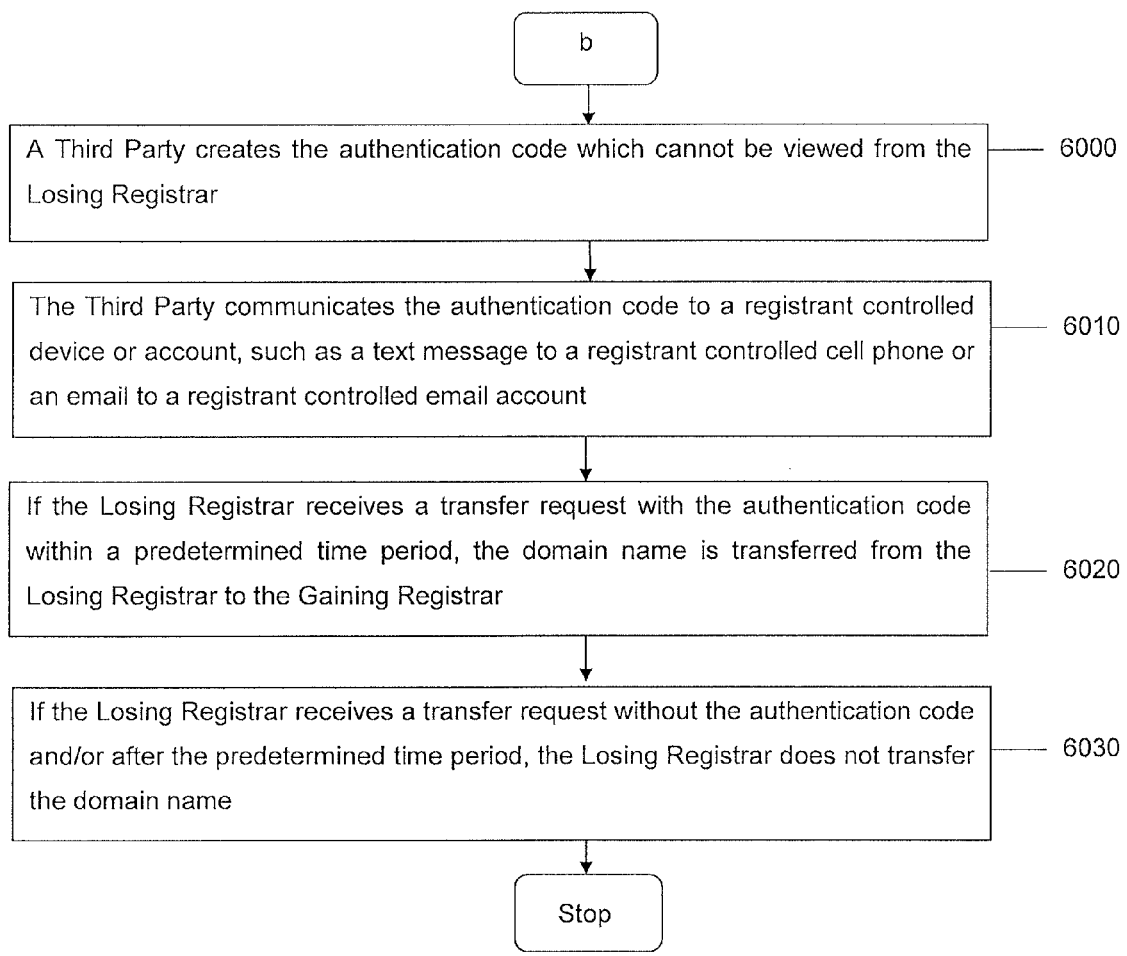

In another embodiment illustrated in FIGS. 59 and 60, a Losing Registrar 210 may register a domain name to a domain name registrant (hereafter registrant). The domain name may be placed in a first account controlled by the registrant at a website operated by the Losing Registrar 210. (Step 5900)

The Losing Registrar 210 may offer a third party hi-jack prevention service to the registrant for one or more domain names registered to the registrant in the first account and/or for all domain names within the first account. (Step 5910) The registrant may select and agree to the third party hi-jack prevention service for the domain name from the Losing Registrar 210. (Step 5930) If the registrant does not accept the third party hi-jack prevention service for the domain name, the third party hi-jack prevention service is terminated and not enable. (Step 5920)

Once the third party hi-jack prevention service is enabled, the Losing Registrar 210 or the third party platform may receive a request from a requester (who might or might not be the registrant) for an authentication code. (Step 5940) The authentication code (also known as a transfer secret or an authentication code EPP) may be required to transfer the domain name from the Losing Registrar 210 to the Gaining Registrar 220.

The Losing Registrar 210 may generate and communicate the authentication code to the third party platform or the third party platform may generate and communicate the authentication code to the Losing Registrar 210. (Step 6000) In some embodiments, the authentication code, when the third party transfer hi-jack prevention service is enable, will not be shared by the Losing Registrar 210 with the registrant. (Step 6010)

The third party platform may perform any known or later developed method of remotely identifying the requester. As non-limiting examples, control over a device (such as a cell phone), control over a social media account, knowledge of account names and/or passwords, biometrics, government identification documents or any other desired method may be used to verify that the requester is the registrant. As a specific example, the third party platform may send a text message containing the authentication code to a cell phone known to be under the control of the registrant.

The registrant may then enter the authentication code and a transfer request, within a predetermined time period after requesting the authentication code, into a website operated by the Gaining Registrar 220. This enables the Gaining Registrar 220 to reveal the authentication code to the Losing Registrar 210 so that the Losing Registrar 210 knows the Gaining Registrar 220 is operating on behalf of the registrant. If the Losing Registrar 210 receives the correct authentication code, the Losing Registrar 210 and the Gaining Registrar 220 may transfer the domain name from the Losing Registrar 210 to the Gaining Registrar 220. (Step 6020)

If the authentication code is not the same as the authentication code created by the Losing Registrar 210 or the third party platform, the requester's transfer request is denied. (Step 6030)

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A method for an intra-registrar hi-jack prevention service, comprising the steps of:
   a) a Registrar registering a domain name to a registrant;
   b) the Registrar receiving a preferred contact method from the registrant;
   c) the Registrar managing the domain name in a first account based on instructions received from the registrant;
   d) the Registrar receiving instructions from the registrant to enable a hi-jack prevention service;
   e) the Registrar receiving a request to move the domain name from the first account managed by the Registrar to a second account managed by the Registrar; and
   f) the Registrar sending a confirmation request for moving the domain name from the first account to the second account by the preferred contact method to the registrant,
   wherein the Registrar is configured so that upon the Registrar receiving an affirmative response in response to the confirmation request from the registrant before a predetermined time limit, the Registrar moving the domain name from the first account to the second account and
   wherein the Registrar is configured so that upon the Registrar not receiving the affirmative response in response to the confirmation request from the registrant before the predetermined time limit, the Registrar not moving the domain name from the first account to the second account.

2. The method of claim 1, wherein the preferred contact method is via a mobile device.

3. The method of claim 1, wherein the preferred contact method is to an email account.

4. The method of claim 1, further comprising the step of:
   i) upon the Registrar not receiving the affirmative response in response to the confirmation request before the predetermined time limit, the Registrar sending a message by the preferred contact method to the registrant that the domain name was not moved.

5. The method of claim 1, further comprising the step of:
   i) upon the Registrar receiving the affirmative response in response to the confirmation request before the predetermined time limit, the Registrar sending a message by the preferred contact method to the registrant that the domain name was moved.

6. The method of claim 1, further comprising the step of:
   i) upon the Registrar receiving instructions from the registrant to enable a hi-jack prevention service, the Registrar preventing the domain name from being moved from the first account to the second account until after the Registrar sends the confirmation request to the registrant by the preferred contact method and the Registrar receives the affirmative response in response to the confirmation request from the registrant before the predetermined time limit.

7. A method for a third party platform intra-registrar hi-jack prevention service, comprising the steps of:
   a) a Registrar registering a domain name to a registrant;
   b) the Registrar receiving a preferred contact method from the registrant;
   c) the Registrar managing the domain name in a first account based on instructions received from the registrant;
   d) the Registrar receiving instructions from the registrant to enable a hi-jack prevention service;
   e) the Registrar receiving a request to move the domain name from the first account managed by the Registrar to a second account managed by the Registrar; and
   f) a third party platform sending a confirmation request for moving the domain name from the first account to the second account by the preferred contact method to the registrant,
   wherein the third party platform is configured so that upon the third party platform receiving an affirmative response in response to the confirmation request from the registrant before a predetermined time limit, the Registrar moving the domain name from the first account to the second account and
   wherein the third party platform is configured so that upon the third party platform not receiving the affirmative response in response to the confirmation request from the registrant before the predetermined time limit, the Registrar not moving the domain name from the first account to the second account.

8. The method of claim 7, wherein the preferred contact method is via a mobile device.

9. The method of claim 7, wherein the preferred contact method is to an email account.

10. The method of claim 7, further comprising the step of:
    i) upon the third party platform not receiving the affirmative response in response to the confirmation request before the predetermined time limit, the Registrar or the third party platform sending a message by the preferred contact method to the registrant that the domain name was not moved.

11. The method of claim 7, further comprising the step of:
    i) upon the third party platform receiving the affirmative response in response to the confirmation request before the predetermined time limit, the Registrar or third party platform sending a message by the preferred contact method to the registrant that the domain name was moved.

12. The method of claim 7, further comprising the step of:
    i) upon the Registrar receiving instructions from the registrant to enable the hi-jack prevention service, the Registrar preventing the domain name from being moved from the first account to the second account until after the Registrar sends the confirmation request to the registrant by the preferred contact method and the Registrar receives the affirmative response in response to the confirmation request from the registrant before the predetermined time limit.

13. The method of claim 7, wherein the Registrar and the third party platform are different entities and only communicate via the Internet during the method.

14. A method for a third party platform inter-registrar hi-jack prevention service, comprising the steps of:
    a) a Losing Registrar registering a domain name to a registrant;
    b) the Losing Registrar receiving a preferred contact method from the registrant;

c) the Losing Registrar managing the domain name in a first account based on instructions received from the registrant;

d) the Losing Registrar receiving instructions from the registrant to enable a hi-jack prevention service;

e) the Losing Registrar receiving a request to transfer the domain name from the Losing Registrar to a Gaining Registrar; and f) a third party platform sending an authentication code for transferring the domain name from the Losing Registrar to the Gaining Registrar by the preferred contact method to the registrant, wherein the third party platform is configured so that upon the Gaining Registrar receiving the authentication code from the registrant before a predetermined time limit, transferring the domain name from the Losing Registrar to the Gaining Registrar and wherein the third party platform is configured so that upon the Gaining Registrar not receiving the authentication code from the registrant before the predetermined time limit, not transferring the domain name from the Losing Registrar to the Gaining Registrar.

15. The method of claim 14, wherein the preferred contact method is via a mobile device.

16. The method of claim 14, wherein the preferred contact method is to an email account.

17. The method of claim 14, further comprising the step of:

i) upon the Gaining Registrar not receiving the authentication code before the predetermined time limit, sending a message by the preferred contact method to the registrant that the domain name was not transferred.

18. The method of claim 14, further comprising the step of:

i) upon the Gaining Registrar receiving the authentication code before the predetermined time limit, sending a message by the preferred contact method to the registrant that the domain name was transferred.

19. The method of claim 14, further comprising the step of:

i) upon the Losing Registrar receiving instructions from the registrant to enable the hi-jack prevention service, the Losing Registrar preventing the domain name from being transferred from the Losing Registrar to the Gaining Registrar until after the third party platform sends the authentication code to the registrant by the preferred contact method and the Gaining Registrar receives the authentication code from the registrant before the predetermined time limit.

20. A method for a third party platform inter-registrar hi-jack prevention service, comprising the steps of:

a) a Losing Registrar registering a domain name to a registrant;

b) the Losing Registrar receiving a preferred contact method from the registrant;

c) the Losing Registrar managing the domain name in a first account based on instructions received from the registrant;

d) the Losing Registrar receiving instructions from the registrant to enable a hi-jack prevention service;

e) the Losing Registrar receiving a request to transfer the domain name from the Losing Registrar to a Gaining Registrar; and f) a third party platform disabling the authentication code with the Losing Registrar, wherein the third party platform is configured so that upon the third party platform validating the registrant, the third party platform enabling the authentication code with the Losing Registrar and wherein the third party platform is configured so that upon the third party platform not validating the registrant, the third party platform not enabling the authentication code with the Losing Registrar.

* * * * *